US012771927B2

(12) United States Patent
Yi et al.

(10) Patent No.: US 12,771,927 B2
(45) Date of Patent: Oct. 20, 2026

(54) RECORDING METHOD AND APPARATUS, AND STORAGE MEDIUM

(71) Applicant: Honor Device Co., Ltd., Shenzhen (CN)

(72) Inventors: Jie Yi, Shenzhen (CN); Yufei Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 157 days.

(21) Appl. No.: 18/693,089

(22) PCT Filed: Apr. 28, 2023

(86) PCT No.: PCT/CN2023/091653
§ 371 (c)(1),
(2) Date: Mar. 18, 2024

(87) PCT Pub. No.: WO2023/226694
PCT Pub. Date: Nov. 30, 2023

(65) Prior Publication Data

US 2024/0388789 A1 Nov. 21, 2024

(30) Foreign Application Priority Data

May 25, 2022 (CN) ......................... 202210577624.4

(51) Int. Cl.
*H04N 23/63* (2023.01)
*G06F 3/0481* (2022.01)
*G06F 3/04845* (2022.01)

(52) U.S. Cl.
CPC ......... *H04N 23/632* (2023.01); *G06F 3/0481* (2013.01); *G06F 3/04845* (2013.01)

(58) Field of Classification Search
CPC ...... H04N 23/632; H04N 5/77; H04N 23/631; H04N 23/635; G06F 3/0481;
(Continued)

(56) References Cited

U.S. PATENT DOCUMENTS 5,867,584 A 2/1999 Hu et al.
9,521,328 B2 12/2016 Kim et al.
(Continued)

FOREIGN PATENT DOCUMENTS

CN 103907338 A 7/2014
CN 105519097 A 4/2016
(Continued)

*Primary Examiner* — Christopher K Peterson
(74) *Attorney, Agent, or Firm* — Slater Matsil, LLP

(57) ABSTRACT

Embodiments of this application provide a recording method and apparatus, and a storage medium. The method is applied to a terminal device including a first camera, and the method includes: displaying, by the terminal device, a first interface of a camera application, where the first interface includes a first window and a second window; at a first moment, when the terminal device detects that a first position of the first picture includes a first object, including the first object in the second picture; at a second moment, when the terminal device detects that a second position of the first picture includes the first object, including the first object in the second picture; and at a third moment, stopping, by the terminal device in response to a trigger operation of a user on a first button, the second window, and continuing to display the first window.

20 Claims, 41 Drawing Sheets

(58) Field of Classification Search

CPC ............. G06F 3/04845; G06F 3/04842; G06F 2200/1637; G06F 2203/04806; G06F 3/0488; G11B 27/031; G11B 27/34; H04M 1/72403; H04M 2250/52

See application file for complete search history.

(56) References Cited

U.S. PATENT DOCUMENTS

| | | | | |
|---|---|---|---|---|
| 9,973,722 | B2 | 5/2018 | Deng et al. | |
| 10,469,767 | B2 | 11/2019 | Shikata | |
| 10,887,542 | B1 | 1/2021 | Brandt et al. | |
| 11,765,463 | B2 | 9/2023 | Li et al. | |
| 11,849,211 | B2 | 12/2023 | Chen et al. | |
| 11,889,180 | B2 | 1/2024 | Shen et al. | |
| 11,949,978 | B2 | 4/2024 | Wu et al. | |
| 2013/0155308 | A1 | 6/2013 | Wu et al. | |
| 2016/0255268 | A1 * | 9/2016 | Kang | H04N 23/57 348/333.11 |
| 2021/0168300 | A1 | 6/2021 | Wang et al. | |
| 2022/0066990 | A1 | 3/2022 | Clingman et al. | |
| 2022/0159183 | A1 * | 5/2022 | Li | H04N 23/635 |
| 2022/0247857 | A1 | 8/2022 | Wang et al. | |
| 2023/0367441 | A1 | 11/2023 | Gao et al. | |

FOREIGN PATENT DOCUMENTS

| | | | |
|---|---|---|---|
| CN | 108520611 | A | 9/2018 |
| CN | 109831622 | A | 5/2019 |
| CN | 111866423 | A | 10/2020 |
| CN | 112130742 | A | 12/2020 |
| CN | 112714253 | A | 4/2021 |
| CN | 112954218 | A | 6/2021 |
| CN | 112954219 | A | 6/2021 |
| CN | 113261271 | A | 8/2021 |
| CN | 114443199 | A | 5/2022 |
| CN | 115484403 | A | 12/2022 |
| EP | 2852138 | A1 | 3/2015 |
| EP | 3190496 | A1 | 7/2017 |
| EP | 3866458 | A1 | 8/2021 |
| WO | 2020073959 | A1 | 4/2020 |
| WO | 2021244104 | A1 | 12/2021 |
| WO | 2021244455 | A1 | 12/2021 |
| WO | 2022048504 | A1 | 3/2022 |
| WO | 2022052772 | A1 | 3/2022 |

* cited by examiner

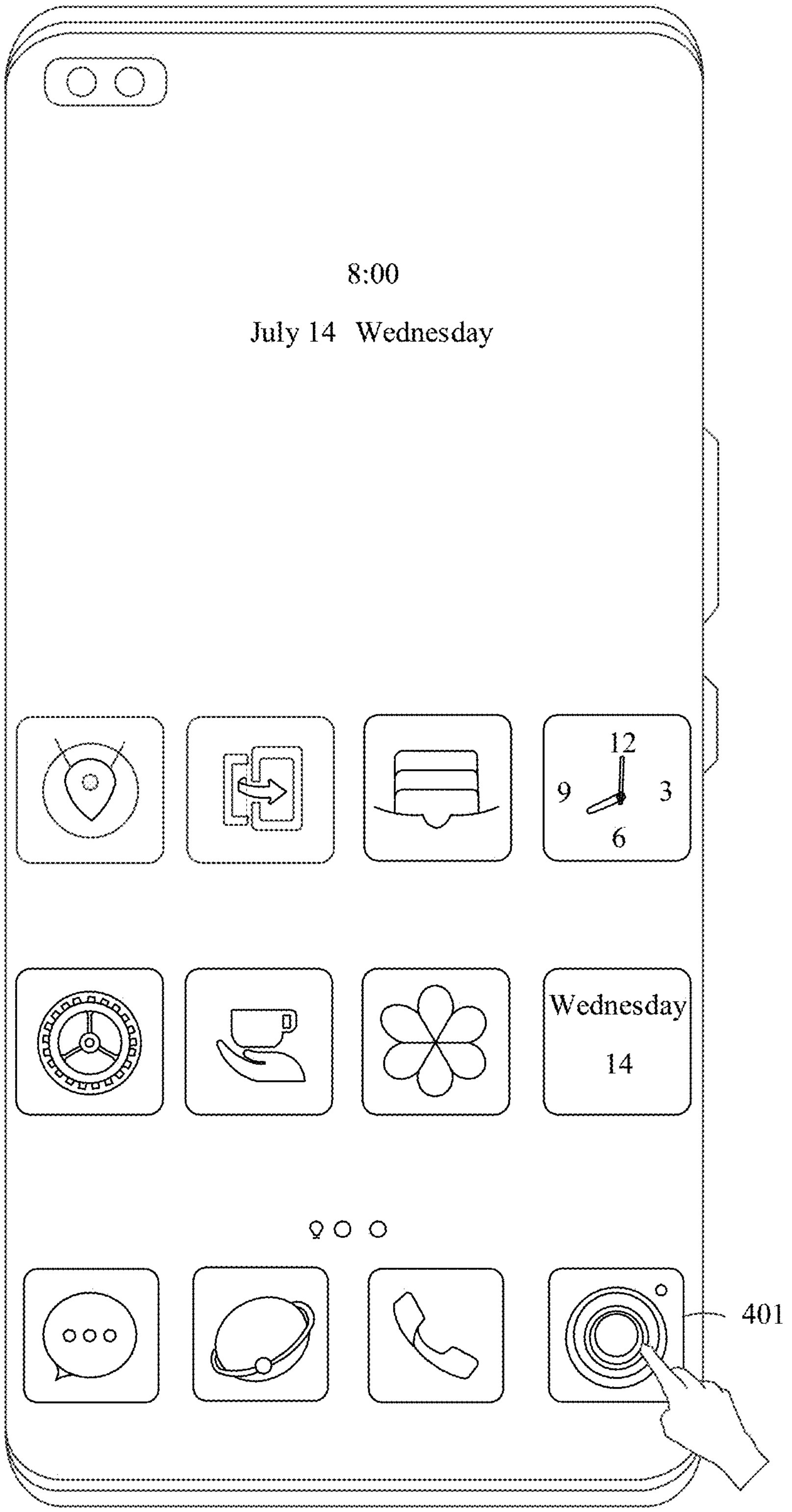
FIG. 4A(1)

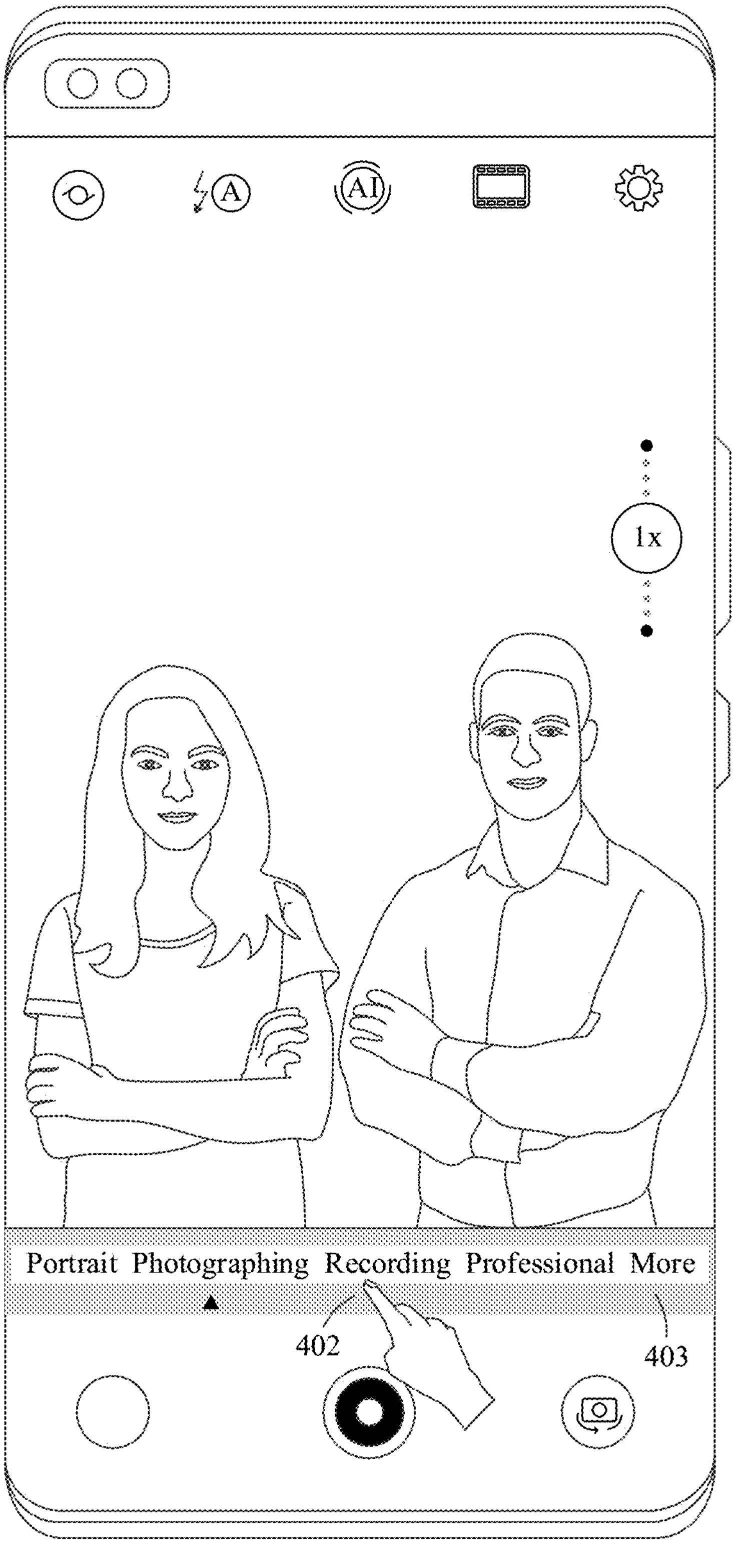
FIG. 4A(2)

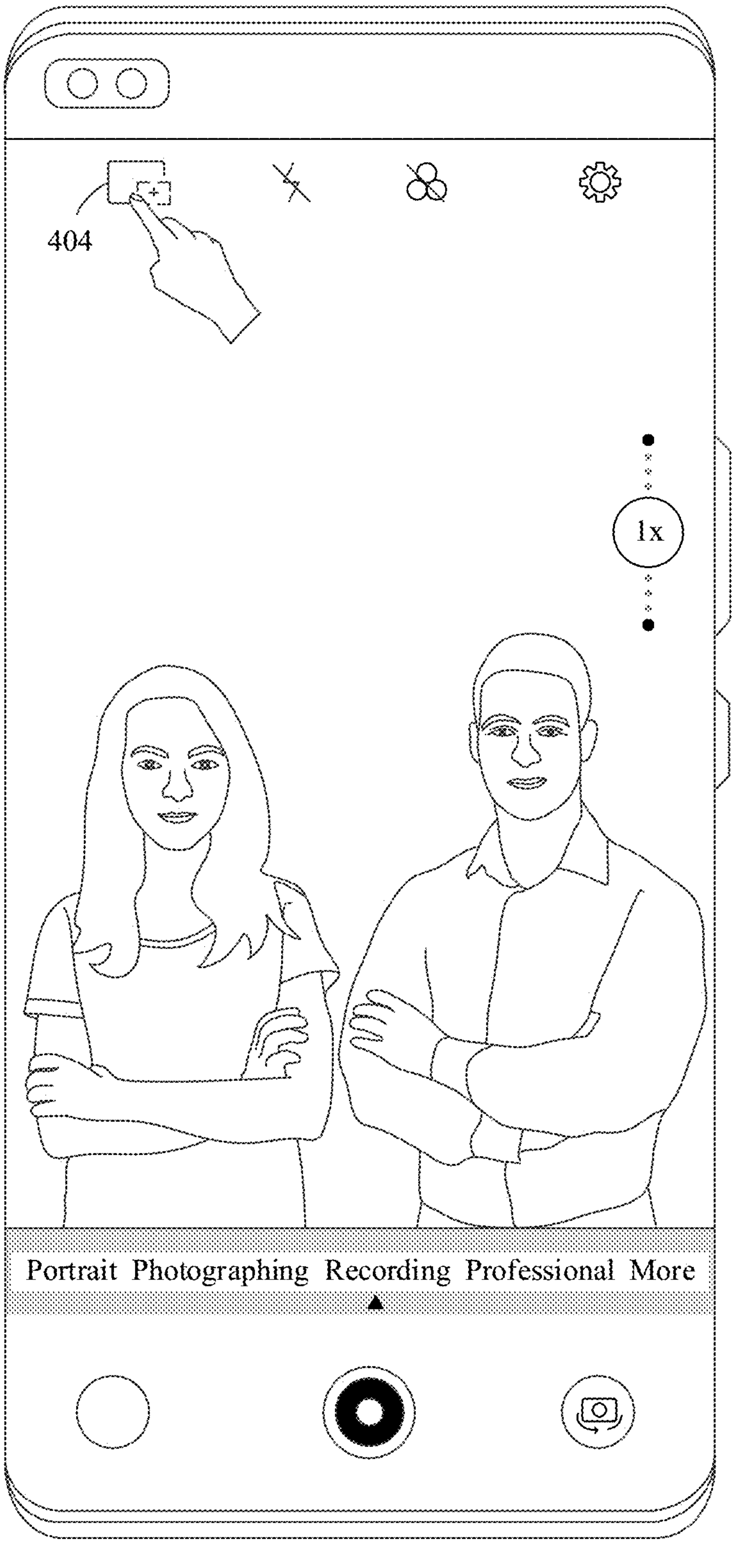
FIG. 4A(3)

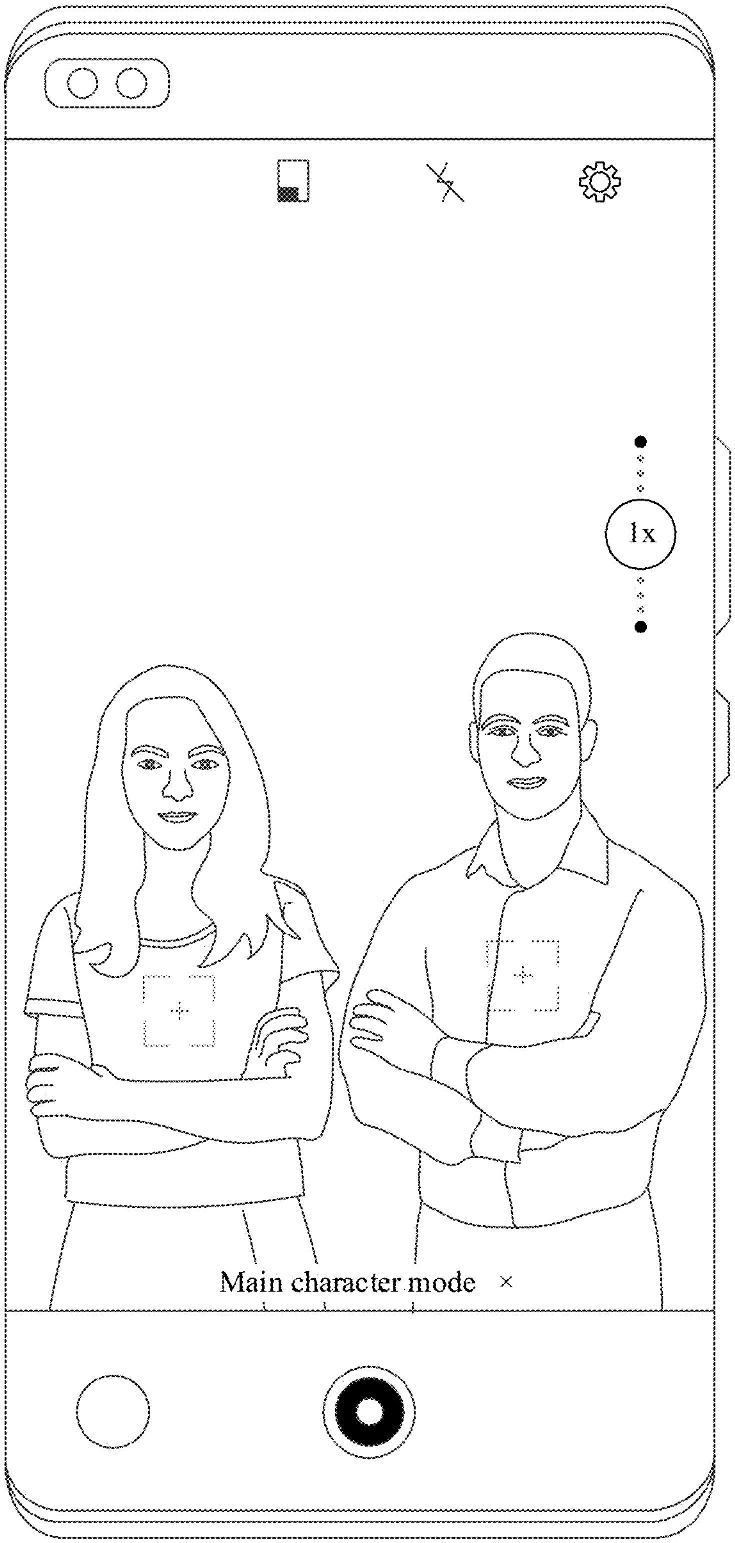
FIG. 4A(4)

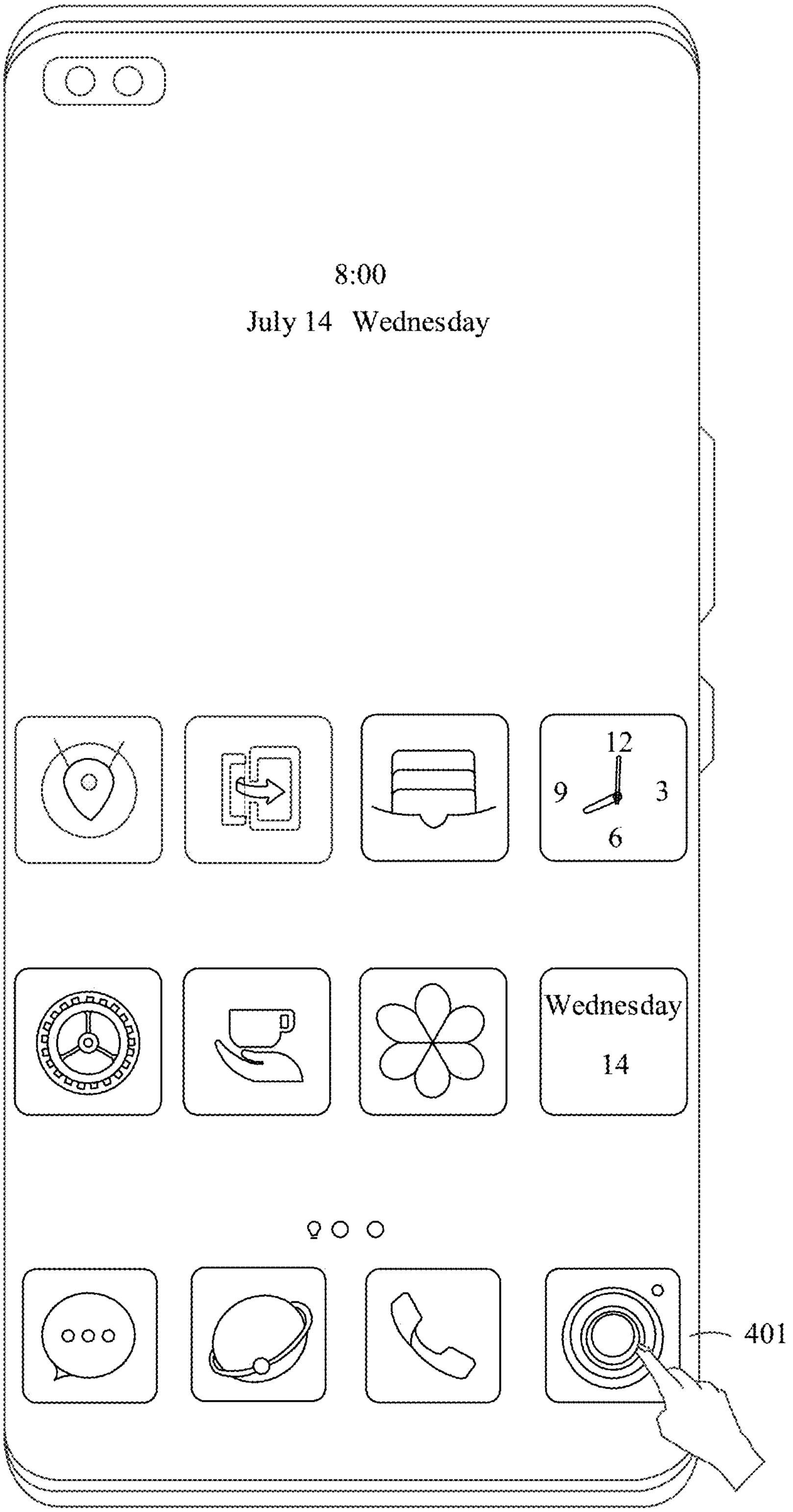
FIG. 4B(1)

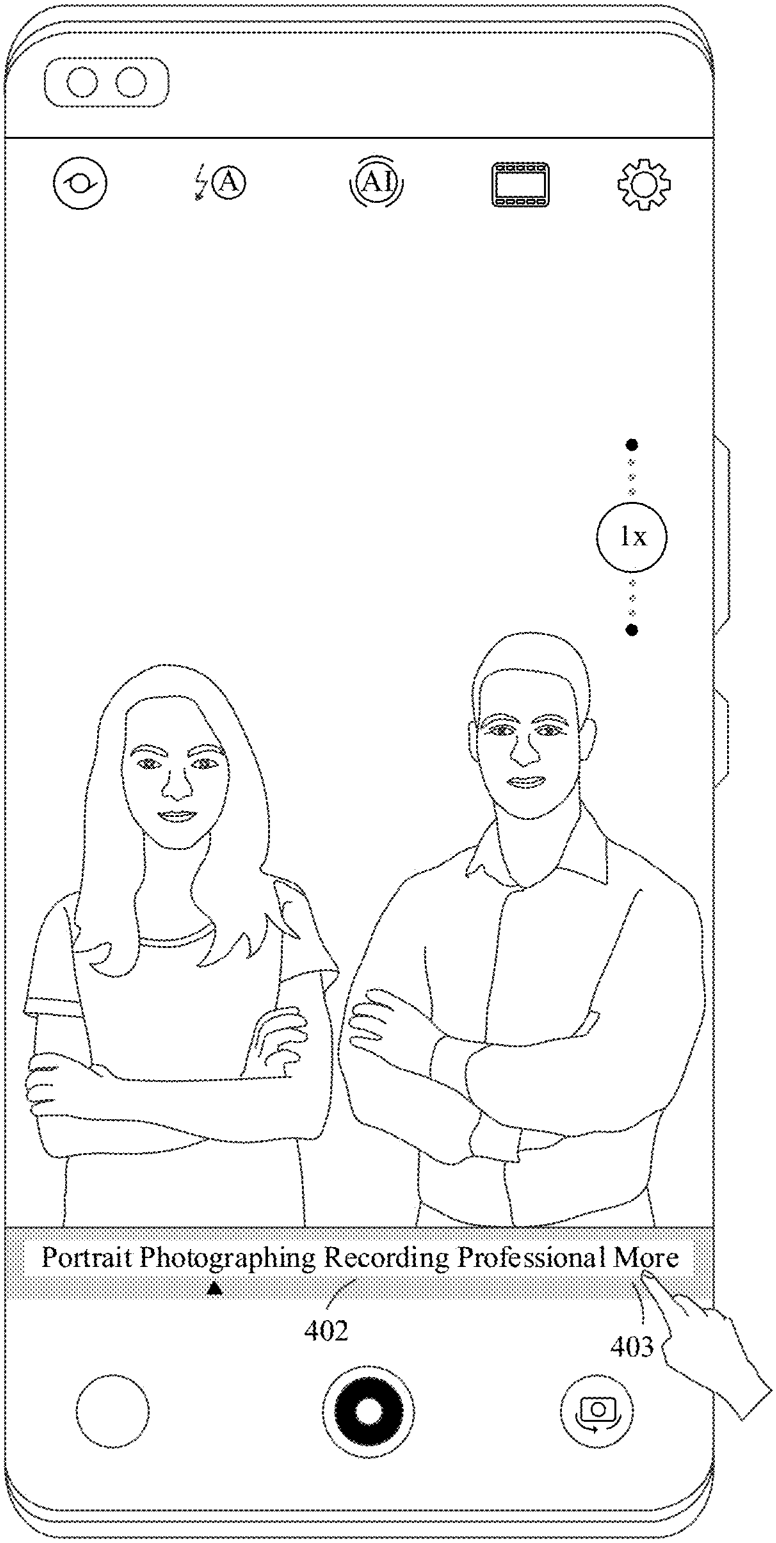
FIG. 4B(2)

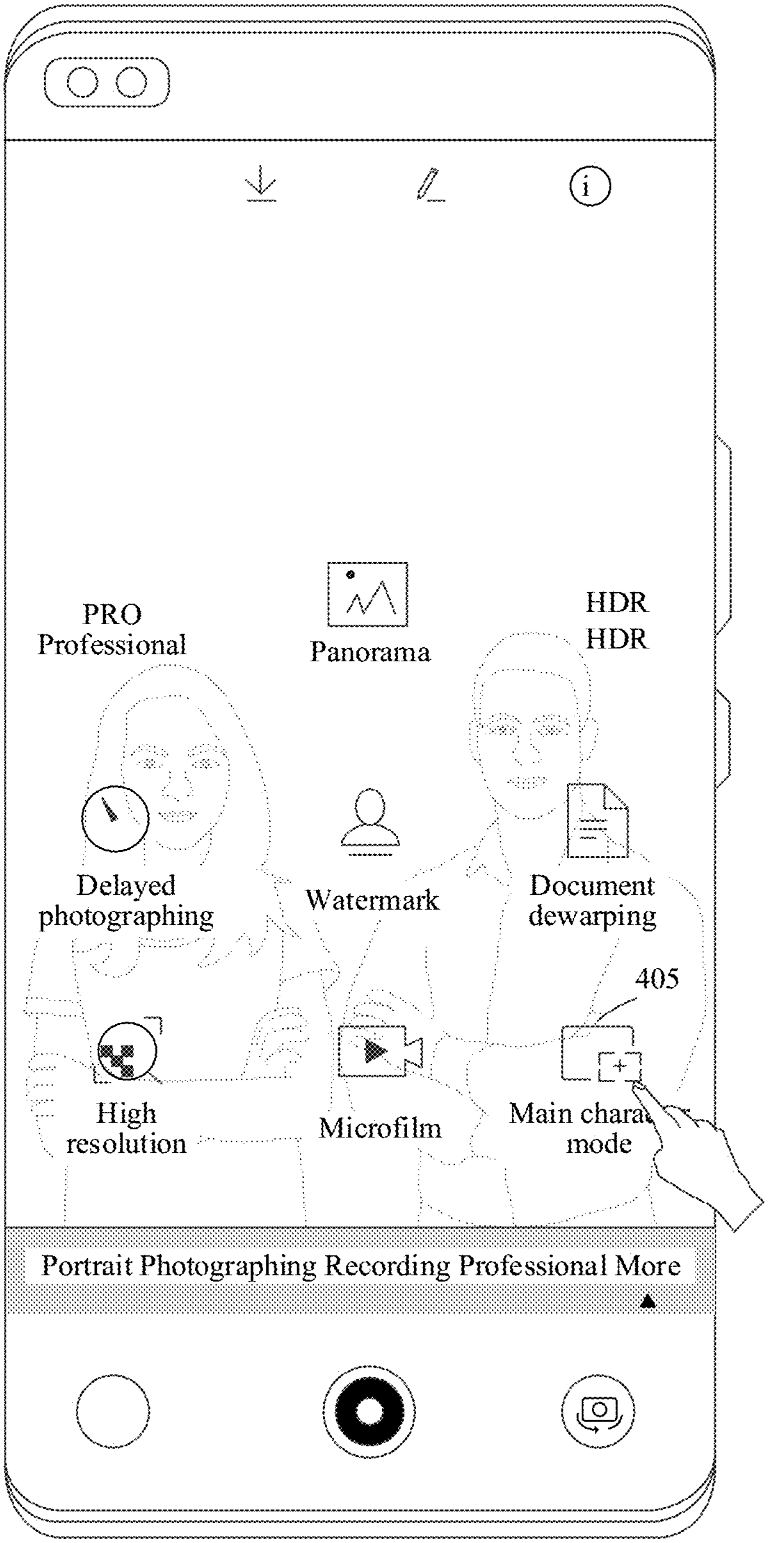
FIG. 4B(3)

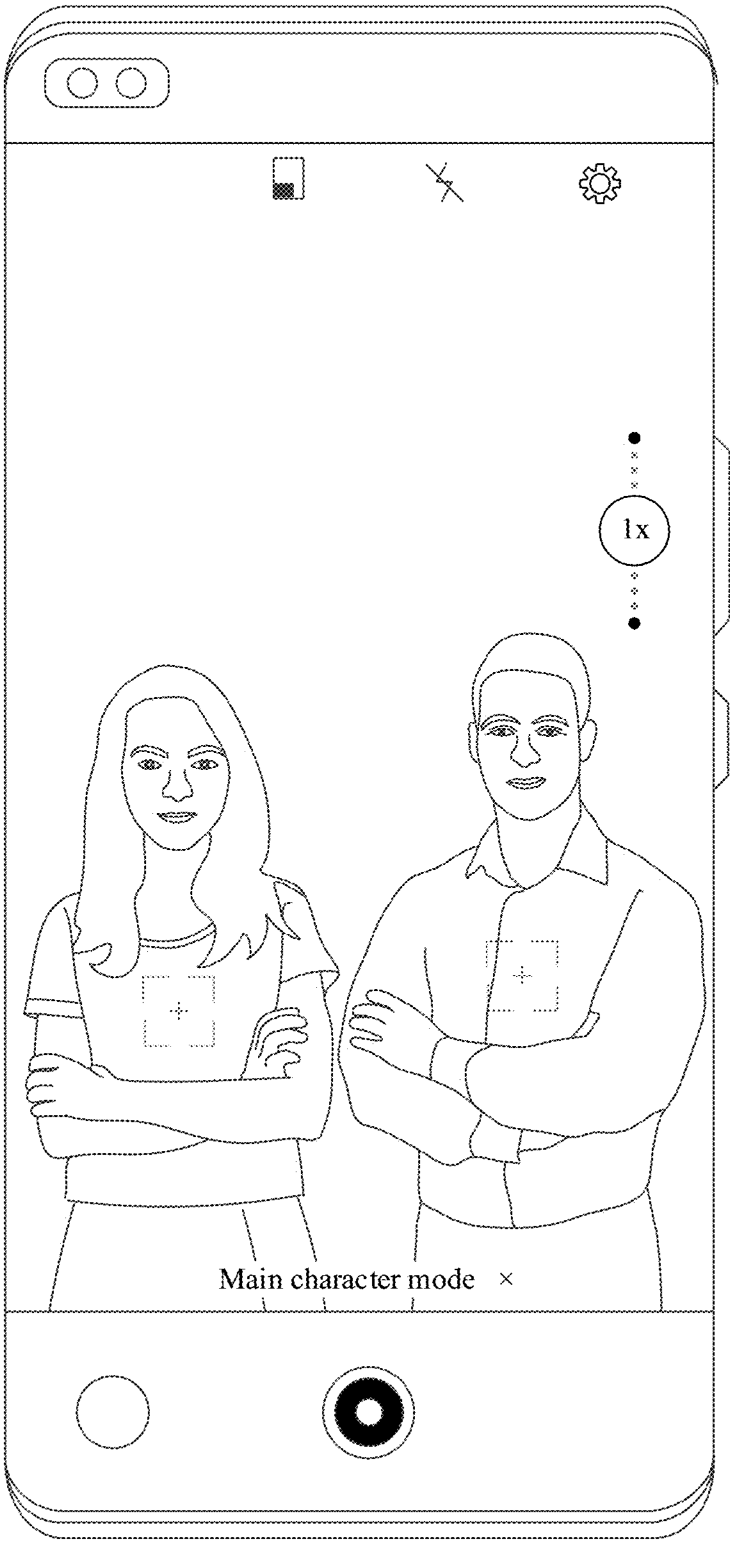
FIG. 4B(4)

RECORDING METHOD AND APPARATUS, AND STORAGE MEDIUM

CROSS-REFERENCE TO RELATED APPLICATIONS

This application is a national stage of International Application No. PCT/CN2023/o91653, filed on Apr. 28, 2023, which claims priority to Chinese Patent Application No. 202210577624.4, filed on May 25, 2022. The disclosures of both of the aforementioned applications are hereby incorporated by reference in their entireties.

TECHNICAL FIELD

This application relates to the field of terminal technologies, and in particular, to a recording method and apparatus, and a storage medium.

BACKGROUND

With the development of terminal technologies, functions of terminal devices are becoming increasingly diversified. A terminal device may be provided with a plurality of cameras, to provide a plurality of photographing modes for photographing and recording functions. For example, the terminal device may provide a front-facing photographing mode, a rear-facing photographing mode, or a front-facing and rear-facing photographing mode.

In a possible implementation, a user may use the terminal device to record a video of one or more characters. When the user intends to obtain a video of one target character, the user may perform manual editing processing on the video.

However, a manual editing processing method has complex operations and the photographing user needs to have a specific video editing technique, leading to poor user experience.

SUMMARY

Embodiments of this application provide a recording method and apparatus, and a storage medium, so that when a user performs recording on a plurality of people by using a terminal device, one multi-people video and a plurality of videos for a target character may be obtained, thereby improving the recording experience of the user.

According to a first aspect, an embodiment of this application provides a recording method, applied to a terminal device including a first camera, and the method including: displaying, by the terminal device, a first interface of a camera application, where the first interface includes a first window and a second window; and the first window displays a first picture collected by the first camera, the second window displays a second picture and a first button, and the second picture is a part of the first picture; at a first moment, when the terminal device detects that a first position of the first picture includes a first object, including the first object in the second picture; at a second moment, when the terminal device detects that a second position of the first picture includes the first object, including the first object in the second picture; and at a third moment, stopping, by the terminal device in response to a trigger operation of a user on the first button, displaying the second window, and continuing to display the first window, where the third moment is later than the second moment, and the second moment is later than the first moment. In this way, the terminal device may display the first object in a focus tracking manner. After setting a focus tracking object, the terminal device may additionally obtain and display a picture corresponding to the focus tracking object, further additionally obtain one or more focus tracking videos corresponding to the focus tracking object during video recording, and further reduce subsequent editing operations on the focus tracking object, thereby improving the editing efficiency and further improving the recording experience of the user.

The first interface may be a preview interface in a main character mode or a recording interface in the main character mode described in the embodiments of this application. When the first interface is a preview interface, for example, the first interface may be an interface in FIG. 3(*a*) and/or an interface in FIG. 3(*b*). An example in which the first interface is the interface in FIG. 3(*a*) is used, the first window may be a large window 301, and the second window may be a small window 302; the first object may be a male character; and the first moment may be a moment at which a scenario of the interface in FIG. 3(*a*) is located, and the second moment may be a moment at which a scenario of the interface in FIG. 3(*b*) is located. For another example, the first interface may be an interface in FIG. 6C(a), the first button may be a small window close button 306 in the interface in FIG. 6C(a), and the third moment may correspond to a moment of entering an interface in FIG. 6C(b) from the interface in FIG. 6C(a).

When the first interface is a recording interface, for example, the first interface may be an interface in FIG. 3(*c*) and/or an interface in FIG. 3(*d*). An example in which the first interface is the interface in FIG. 3(*c*) is used, the first window may be a large window, and the second window may be a small window; the first object may be a male character; and the first moment may be a moment at which a scenario of the interface in FIG. 3(*c*) is located, and the second moment may be a moment at which a scenario of the interface in FIG. 3(*d*) is located. For another example, the first interface may be an interface in FIG. 11A(a), and the first button may be a small window recording end button 315 in the interface in FIG. 11A(a); and the third moment may correspond to a moment of entering an interface in FIG. 11A(b) from the interface in FIG. 11A(a). It may be understood that, when the terminal device selects the focus tracking object, the small window may continuously display the focus tracking object in a focus tracking manner.

It should be noted that, the embodiments of this application exemplarily describe the step performed by the terminal device at an $N^{th}$ moment, and a specific moment is not limited in the embodiments of this application.

In a possible implementation, the first object is displayed in the center in the second picture. In this way, the terminal device may display the first object in a focus tracking manner, thereby improving the recording experience of the user.

In a possible implementation, the second window is floated on an upper layer of the first window, and the second window is smaller than the first window. In this way, the small window may be displayed in the large window, and the user may browse pictures of the large window and the small window simultaneously, thereby improving the recording experience of the user.

In a possible implementation, after the stopping, by the terminal device, displaying the second window, and continuing to display the first window, the method includes: displaying, by the terminal device, a third window on the first window, where the third window includes a third picture, the third picture is a part of the first picture, and a position of the third window in the first window is the same as a position of the second window in the first window. In this way, when the user normally closes or accidentally closes the small window and restarts the small window, the small window may follow a form when the small window is closed last time, thereby reducing a time for adjusting the small window, and improving the recording experience of the user.

The first window may be a large window in an interface in FIG. 6C(a), the second window may be a small window in an interface in FIG. 6C(a), and the third window may be a small window in an interface in FIG. 6C(c). It may be understood that, the second window and the third window are located at the same position.

In a possible implementation, the displaying, by the terminal device, a third window on the first window includes: displaying, by the terminal device, the third window on the first window when the terminal device detects a trigger operation of the user on a first tracking identifier of the first object in the first window; or displaying, by the terminal device, the third window on the first window when the terminal device detects a trigger operation of the user on a tracking identifier of any object in the first window. In this way, after the small window is closed, the user may select the first object or replace another object, thereby improving the recording experience of the user.

The first tracking identifier may be a tracking frame 311 in an interface in FIG. 6C(b), and the step of displaying, by the terminal device, a third window on the first window may correspond to a scenario of entering the interface in FIG. 6C(c) from the interface in FIG. 6C(b).

In a possible implementation, the displaying, by the terminal device, a third window on the first window includes: displaying, by the terminal device, the third window on the first window when the terminal device detects that a duration that the second window is not displayed is within a first time limit and/or a duration that the terminal device does not use a recording function is within a second time limit, where the position of the third window in the first window is the same as the position of the second window in the first window. In this way, when the user restarts the small window within a period of time, the user may use the form before the small window is closed last time, thereby improving the recording experience of the user.

In a possible implementation, when the terminal device displays the third window on the first window, a horizontal and vertical screen state of the third window is the same as a horizontal and vertical screen state of the second window, and/or a size of the third window remains the same as a size of the second window. In this way, the terminal device may set a memory mechanism for the small window, thereby reducing an adjustment time of the small window after the user restarts the small window, and improving the recording experience of the user.

In a possible implementation, the recording method further includes: detecting, by the terminal device, a scale or enlarge operation on the second window; and scaling or enlarging the size of the second window by the terminal device in response to the scale or enlarge operation on the second window. In this way, the user may adjust a size of the small window, thereby improving the recording experience of the user.

The enlarge or scale operation may be an operation of adjusting the size of the small window through two fingers shown in FIG. 6A. The enlarge or scale operation may be an operation of adjusting the size of the small window through two fingers shown in FIG. 11B.

In a possible implementation, when the terminal device scales or enlarges the size of the second window, content in the second picture remains unchanged, or content in the second picture is in direct proportion to the size of the second window. In this way, the user may adjust the size of the small window and adjust the content displayed in the small window, thereby improving the recording experience of the user.

In a possible implementation, the second window further includes a second button, and the terminal device further hides the first button and the second button in the second window in response to the scale or enlarge operation on the second window. In this way, the terminal device may set a hide mechanism, to hide functional buttons in the small window when the user taps the small window, thereby reducing accidental trigger operations of the user, and improving the recording experience of the user.

The second button may be a second horizontal and vertical screen switch button 305 shown in an interface in FIG. 3(*a*).

In a possible implementation, the recording method further includes: detecting, by the terminal device, a move operation on the second window; and moving, by the terminal device in response to the move operation on the second window, the second window along a movement track of the move operation. In this way, the user may adjust a display position of the small window on a display screen, thereby improving the recording experience of the user.

The move operation may be an operation of adjusting the display position of the small window through a single finger in a scenario shown in FIG. 6B; or the move operation may alternatively be an operation of adjusting the display position of the small window through a single finger in a scenario shown in FIG. 11C.

In a possible implementation, the terminal device further hides the first button and the second button in the second window in response to the move operation on the second window. In this way, the terminal device may set a hide mechanism, to hide functional buttons in the small window when the user taps the small window, thereby reducing accidental trigger operations of the user, and improving the recording experience of the user.

In a possible implementation, the second window in the first interface further includes a second button, and the method further includes: switching, in response to a trigger operation of the user on the second button, a display state of the second window in the first interface, where a window aspect ratio displayed in a display state before the switching of the second window is different from a window aspect ratio displayed in a display state after the switching. In this way, the terminal device may adjust a horizontal and vertical screen state of the small window based on a horizontal and vertical screen switch button in the small window, thereby improving the recording experience of the user.

The first interface may be an interface in FIG. 7A(a), and the second button may be a second horizontal and vertical screen switch button 305 in the interface in FIG. 7A(a).

In a possible implementation, the first window in the first interface further includes a third button, and the method includes: adding and displaying, in response to a trigger operation of the user on the third button, a fourth button in the first window in the first interface; and switching, in response to a trigger operation of the user on the fourth button, the second window in the first interface from a display state corresponding to the third button to a display state corresponding to the fourth button, where a window aspect ratio displayed in the display state corresponding to the third button of the second window is different from a window aspect ratio displayed in the display state corresponding to the fourth button. In this way, the terminal device may adjust the horizontal and vertical screen state of the small window based on a horizontal and vertical screen switch button in the large window, thereby improving the recording experience of the user.

The first interface may be an interface in FIG. 7B(a), the third button may be a first horizontal and vertical screen switch button 304 in the interface in FIG. 7B(a), and the fourth button may be a vertical screen display button 702 in an interface in FIG. 7B(b).

In a possible implementation, the second window is displayed in a region in the first window that does not block one or more object key parts. In this way, blocking of the small window to the focus tracking object in the large window may be reduced, thereby improving the recording experience of the user.

A region of the object key part may be a face region of the focus tracking object.

In a possible implementation, before the displaying, by the terminal device, a first interface of a camera application, the method further includes: displaying, by the terminal device, a second interface of the camera application, where the second interface includes the first window and the second window, the first window displays a fourth picture collected by the first camera and a fifth button, and the second window displays a part of the fourth picture; and detecting, by the terminal device, a trigger operation of the user on the fifth button; and the displaying, by the terminal device, a first interface of a camera application includes: displaying the first interface by the terminal device in response to a trigger operation of the user on the fourth button, where the first window further includes first recording duration information of the first window, the second window further includes second recording duration information of the second window, and the second recording duration information of the second window is the same as the first recording duration information of the first window. In this way, the user may start recording a video in the large window and a video in the small window simultaneously, thereby improving the use experience of the user.

The second interface may be an interface in FIG. 10A(a), and the fifth button may be a recording start button 303 in the interface in FIG. 10A(a). The first interface may be an interface in FIG. 10A(b).

In a possible implementation, before the displaying, by the terminal device, a first interface of a camera application, the method further includes: displaying, by the terminal device, a third interface of the camera application, where the third interface includes the first window but does not include the second window, and the first window displays a fifth picture collected by the first camera and a fifth button; detecting, by the terminal device, a trigger operation of the user on the fifth button; displaying, by the terminal device in response to the trigger operation of the user on the fifth button, a fourth interface of the camera application, where the fourth interface includes the first window, and the first window displays a sixth picture recorded by the first camera and first recording duration information of the first window; displaying, when the terminal device detects that the first window in the fourth interface includes the first object, the first tracking identifier associated with the first object in the first window; and detecting, by the terminal device, a trigger operation of the user on the first tracking identifier; and the displaying, by the terminal device, a first interface of a camera application includes: displaying the first interface by the terminal device in response to the trigger operation of the user on the first tracking identifier, where the second window in the first interface further includes second recording duration information of the second window, and the second recording duration information of the second window is different from the first recording duration information of the first window. In this way, the user may start recording in the small window at any time when recording a video in the large window, thereby improving the recording experience of the user.

The third interface may be an interface in FIG. 10B(a), and the fifth button may be a recording start button 303 in the interface in FIG. 10B(a). The fourth interface may be an interface in FIG. 10B(b) and an interface in FIG. 10B(c). The first tracking identifier may be a tracking frame 311 of a male character in the interface in FIG. 10B(c). The first interface may be an interface in FIG. 10B(d).

In a possible implementation, the recording method further includes: pausing recording in the second window when the terminal device detects that the first window does not include the first object, where the recording duration information of the first window is continuously updated, and updating of the recording duration information of the second window is paused. In this way, the small window may perform focus tracking on the focus tracking object automatically, and if the focus tracking object is lost during recording, the recording in the small window is not performed, so that the video recorded in the small window is recorded for the focus tracking object.

A scenario of the pausing recording in the second window when the terminal device detects that the first window does not include the first object may be shown in FIG. 14A.

In a possible implementation, when the recording in the second window is paused, the second window further includes a recording pause identifier and a sixth button, and after the pausing recording in the second window, the method further includes: detecting, by the terminal device, a trigger operation of the user on the sixth button; and stopping, in response to the trigger operation of the user on the sixth button, displaying the second window, and continuing to display the first window, where the recording duration information of the first window is continuously updated. In this way, when the recording in the small window is paused since the focus tracking object is lost, the user may close the small window, thereby reducing a time that the user browses the useless small window, and improving the recording experience of the user.

The sixth button may be a small window recording end button.

In a possible implementation, the first window in the first interface further includes a seventh button, and the method further includes: detecting, by the terminal device, a trigger operation of the user on the seventh button; and storing, by the terminal device in response to the trigger operation of the user on the seventh button, a first video and a second video, where the first video is associated with the first window, and the second video is associated with the second window. In this way, the terminal device may obtain the video recorded in the large window and the video recorded in the small window when the recording is ended, and the user may obtain two videos based on single recording, where one video is a normal recording video, and the other video is a video for the focus tracking object, thereby improving the recording experience of the user.

The seventh button may be a recording end button 314. The step of storing, by the terminal device in response to the trigger operation of the user on the seventh button, a first video and a second video may correspond to a scenario shown in FIG. 15.

In a possible implementation, when the display state of the second window during recording is switched, the stored second video also includes pictures in different display states. In this way, the terminal device may switch the display state of the small window during recording, to obtain a video including different display states of the small window before and after the switching. According to a second aspect, an embodiment of this application provides a terminal device. The terminal device may also be referred to as a terminal (terminal), user equipment (user equipment, UE), a mobile station (mobile station, MS), a mobile terminal (mobile terminal, MT), and the like. The terminal device may be a mobile phone (mobile phone), a smart television, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like.

The terminal device includes a processor, and the processor is configured to invoke a computer program in a memory to perform the method according to the first aspect.

According to a third aspect, an embodiment of this application provides a computer-readable storage medium. The computer-readable storage medium stores computer instructions, and the computer instructions, when run on a terminal device, cause the terminal device to perform the method according to the first aspect.

According to a fourth aspect, an embodiment of this application provides a computer program product. When the computer program product runs, a terminal device is caused to perform the method according to the first aspect.

According to a fifth aspect, an embodiment of this application provides a chip. The chip includes a processor, and the processor is configured to call a computer program in a memory to perform the method according to the first aspect.

It should be understood that the second aspect to the fifth aspect of this application correspond to the technical solution of the first aspect of this application, and the beneficial effects obtained in each aspect and the corresponding feasible implementations are similar. Details are not described herein again.

BRIEF DESCRIPTION OF THE DRAWINGS

FIG. 4A(1) to FIG. 4A(4) are a schematic diagram of interfaces of a terminal device entering a main character mode according to an embodiment of this application;

FIG. 4B(1) to FIG. 4B(4) are another schematic diagram of interfaces of a terminal device entering a main character mode according to an embodiment of this application;

DETAILED DESCRIPTION OF ILLUSTRATIVE EMBODIMENTS

Figure 1:
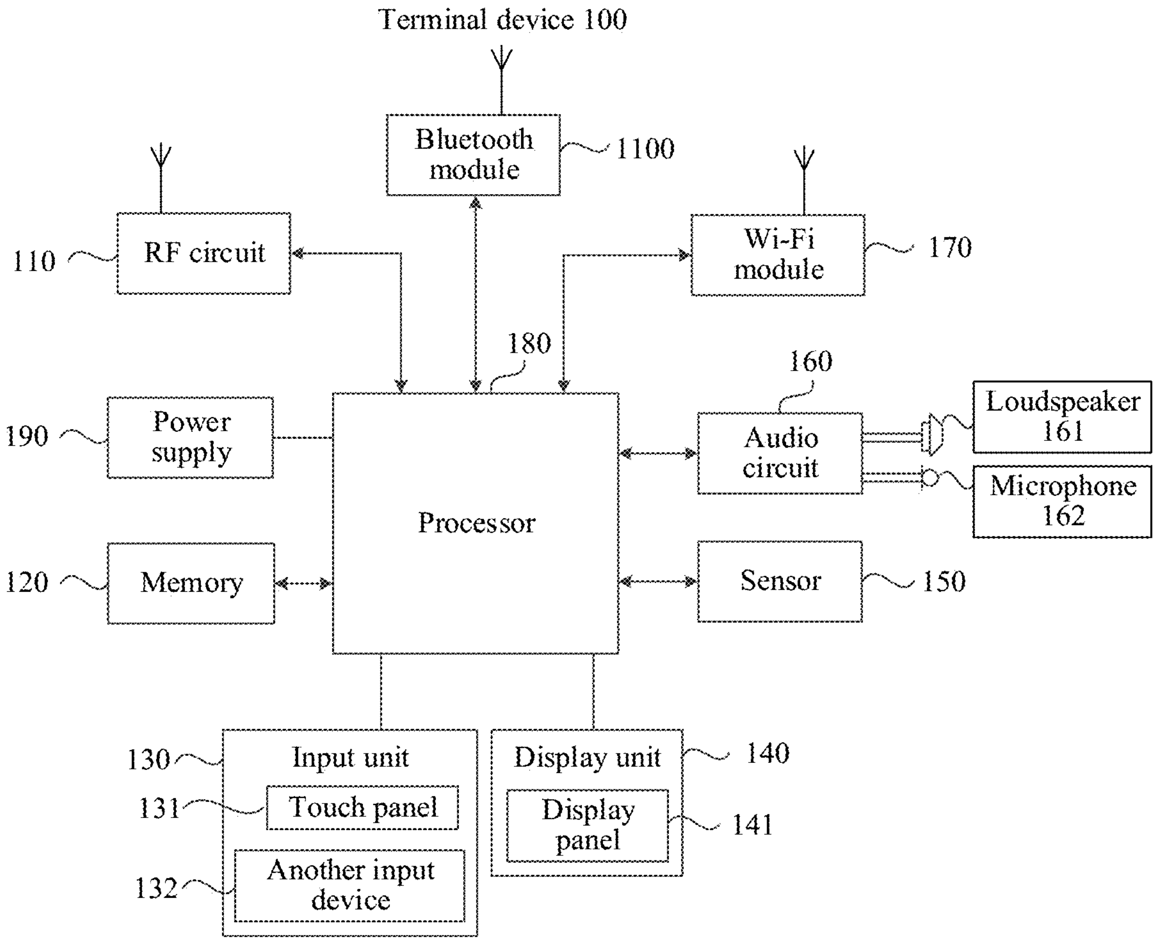
FIG. 1 is a schematic diagram of a hardware structure of a terminal device according to an embodiment of this application.

In the embodiments of this application, terms such as "first" and "second" are used to distinguish between same items or similar items that have basically same functions and purposes. For example, a first chip and a second chip are merely used for distinguishing between different chips, and are not intended to limit a sequence thereof. A person skilled in the art may understand that the words such as "first" and "second" do not limit a quantity and an execution order, and the words such as "first" and "second" unnecessarily define a difference.

It should be noted that, the term "example", "for example", or the like in the embodiments of this application is used to represent giving an example, an illustration, or a description. Any embodiment or design solution described as "example" or "for example" in this application should not be construed as being preferred or advantageous over other embodiments or design solutions. Exactly, the term such as "example" or "for example" as used herein is intended to present a related concept in a specific manner.

In the embodiments of this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" in this specification generally indicates an "or" relationship between the associated objects. "At least one of the following items" or a similar expression thereof indicates any combination of these items, including a single item or any combination of a plurality of items. For example, at least one of a, b, or c may indicate a, b, c, a and b, a and c, b and c, or a, b, and c, where a, b, and c may be singular or plural.

A recording method provided in the embodiments of this application may be applied to an electronic device that has a photographing function. The electronic device includes a terminal device, which may also be referred to as a terminal (terminal), user equipment (user equipment, UE), a mobile station (mobile station, MS), a mobile terminal (mobile terminal, MT), and the like. The terminal device may be a mobile phone (mobile phone), a smart television, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like. A specific technology and a specific device form that are used by the terminal device are not limited in the embodiments of this application.

To better understand the embodiments of this application, the following describes a structure of the terminal device in the embodiments of this application.

FIG. 1 is a schematic structural diagram of a terminal device 100. The terminal device may include components such as a radio frequency (radio frequency, RF) circuit 110, a memory 120, an input unit 130, a display unit 140, a sensor 150, an audio circuit 160, a wireless fidelity (wireless fidelity, Wi-Fi) module 170, a processor 180, a power supply 190, and a Bluetooth module 1100. A person skilled in the art may understand that the structure of the terminal device shown in FIG. 1 does not constitute a limitation on the terminal device, and the terminal device may include more or fewer components than those shown in the figure, or some components may be combined, or a different component deployment may be used.

The following specifically describes the components of the terminal device with reference to 1.

The RF circuit 110 may be configured to receive and send signals in an information receiving and sending process or a call process, and especially, after receiving downlink information of a base station, send the downlink information to the processor 180 for processing. In addition, the RF circuit sends designed uplink data to the base station. Usually, the RF circuit includes, but is not limited to, an antenna, at least one amplifier, a transceiver, a coupler, a low noise amplifier (low noise amplifier, LNA), a duplexer, and the like. In addition, the RF circuit 110 may also communicate with a network and another device through wireless communication. The wireless communication may use any communication standard or protocol, including, but not limited to, Global System for Mobile Communications (global system of mobile communications, GSM), General Packet Radio Service (general packet radio service, GPRS), Code Division Multiple Access (code division multiple access, CDMA), Wideband Code Division Multiple Access (wideband code division multiple access, WCDMA), Long Term Evolution (long term evolution, LTE), email, Short Messaging Service (short messaging service, SMS), and the like.

The memory 120 may be configured to store a software program and a module, and the processor 180 runs the software program and the module that are stored in the memory 120, to perform various functional applications and data processing of the terminal device. The memory 120 may mainly include a program storage area and a data storage area. The program storage area may store an operating system, an application program required by at least one function (for example, a sound playback function and an image display function), a boot loader (boot loader), and the like. The data storage area may store data created according to use of the terminal device (for example, audio data or an address book) and the like. In addition, the memory 120 may include a high-speed random access memory, and may further include a non-volatile memory, such as at least one disk storage device, a flash memory device, or another volatile solid-state storage device. It may be understood that, in the embodiments of this application, the memory 120 stores a program connected to a Bluetooth device.

The input unit 130 may be configured to: receive input digit or character information, and generate a keyboard signal input related to a user setting and function control of the terminal device. Specifically, the input unit 130 may include a touch panel 131 and another input device 132. The touch panel 131, which may also be referred to as a touchscreen, may collect a touch operation that is performed by a user on or near the touch panel 131 (for example, an operation that is performed by a user by using any suitable object or accessory such as a finger or a stylus on or near the touch panel 131), and drive a corresponding connection apparatus according to a preset program. Optionally, the touch panel 131 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, then sends the contact coordinates to the processor 180, and can receives and executes a command sent by the processor 180. In addition, the touch panel 131 may be implemented by using various types, such as a resistive type, a capacitive type, an infrared type, a surface acoustic wave type, and the like. In addition to the touch panel 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information inputted by the user or information provided to the user, and various menus of the terminal device. The display unit 140 may include a display panel 141. Optionally, the display panel 141 may be configured by using a liquid crystal display (liquid crystal display, LCD), an organic light-emitting diode (organic light-emitting diode, OLED), or the like. Further, the touch panel 131 may cover the display panel 141. After detecting a touch operation on or near the touch panel, the touch panel 131 transfers the touch operation to the processor 180 to determine a type of a touch event. Then the processor 180 provides a corresponding visual output on the display panel 141 according to the type of the touch event. Although in FIG. 1, the touch panel 131 and the display panel 141 are used as two separate parts to implement input and output functions of the terminal device, in some embodiments, the touch panel 131 and the display panel 141 may be integrated to implement the input and output functions of the terminal device.

The terminal device may further include at least one sensor 150 such as an optical sensor, a motion sensor, and another sensor. Specifically, the optical sensor may include an ambient light sensor and a proximity sensor. The ambient light sensor may adjust luminance of the display panel 141 according to brightness of the ambient light, and the proximity sensor may switch off the display panel 141 or backlight when the terminal device is moved to the ear. As one type of the motion sensor, an acceleration sensor may detect a magnitude of acceleration in various directions (generally three axes), and may detect a magnitude and a direction of gravity when static, which may be configured for an application that recognizes a posture of a terminal device (such as horizontal and vertical screen switching, a related game, and magnetometer posture calibration), a function related to vibration recognition (such as a pedometer and a knock), and the like. For other sensors such as a gyroscope, a barometer, a hygrometer, a thermometer, an infrared sensor, and the like that may further be configured on the terminal device, details are not described herein again.

The audio circuit 160, a loudspeaker 161, and a microphone 162 may provide audio interfaces between the user and the terminal device. The audio circuit 160 may transmit, to the loudspeaker 161, an electrical signal obtained by converting received audio data, and the loudspeaker 161 converts the electrical signal into a voice signal for outputting. According to another aspect, the microphone 162 converts a collected sound signal into an electrical signal, the electrical signal is converted into audio data after received by the audio circuit 160, and the audio data is sent to another terminal device through the RF circuit 110 after being outputted to the processor 180 for processing, or the audio data is outputted to the memory 120 for further processing.

Wi-Fi belongs to a short distance wireless transmission technology. The terminal device may help, by using the Wi-Fi module 170, the user to receive and send an email, browse a web page, access stream media, and the like. This provides wireless broadband Internet access for the user. Although FIG. 1 shows the Wi-Fi module 170, it may be understood that the Wi-Fi module is not an essential component of the terminal device, and the Wi-Fi module may be omitted as required, provided that the scope of the essence of the present disclosure is not changed.

The processor 180 is a control center of the terminal device, and connects to various parts of the terminal device by using various interfaces and lines. By running or executing the software program or module stored in the memory 120, and invoking data stored in the memory 120, the processor performs various functions and data processing of the terminal device, thereby performing overall monitoring on the terminal device. Optionally, the processor 180 may include one or more processing units. Preferably, the processor 180 may integrate an application processor and a modem. The application processor mainly processes an operating system, a user interface, an application program, and the like. The modem mainly processes wireless communication. It may be understood that the foregoing modem processor may also not be integrated into the processor 180.

It may be understood that, in the embodiments of this application, the memory 120 stores a program for executing the recording method, and the processor 180 may be configured to invoke and execute the program for executing the recording method stored in the memory 120 to implement the recording method in the embodiments of this application.

The terminal device further includes the power supply 190 (such as a battery) for supplying power to the components. Preferably, the power supply may be logically connected to the processor 180 by using a power management system, thereby implementing functions such as charging management, discharging management, and power consumption management by using the power management system.

A Bluetooth technology is a short-distance wireless transmission technology, and the terminal device may establish a Bluetooth connection to another terminal device with a Bluetooth module through the Bluetooth module 1100, thereby performing data transmission based on a Bluetooth communication link. The Bluetooth module 1100 may be a Bluetooth low energy (Bluetooth low energy, BLE) module according to an actual requirement. It may be understood that, in a case that the terminal device in the embodiments of this application is a user terminal and a service machine, the terminal device includes the Bluetooth module. However, it may be understood that the Bluetooth module is not an essential component of the terminal device, and the Bluetooth module may be omitted as required, provided that the scope of the essence of the present disclosure is not changed. For example, a server may not include the Bluetooth module.

Although not shown in the figure, the terminal device may further include a camera. Optionally, the camera may be a front-facing camera, a rear-facing camera, or a built-in camera (which may be stretched out from a body of the terminal device during use) on the terminal device. This is not limited in the embodiments of this application.

Optionally, the terminal device may include a single camera, two cameras, three cameras, or the like. This is not limited in the embodiments of this application. The camera includes, but is not limited to, a wide-angle camera, a telephoto camera, or a depth camera. For example, the terminal device may include three cameras, which include one main camera, one wide-angle camera, and one telephoto camera.

Optionally, when the terminal device includes a plurality of cameras, the plurality of cameras may be completely front-facing cameras, completely rear-facing cameras, completely built-in cameras, at least some front-facing cameras, at least some rear-facing cameras, or at least some built-in cameras. This is not limited in the embodiments of this application.

Figure 2:
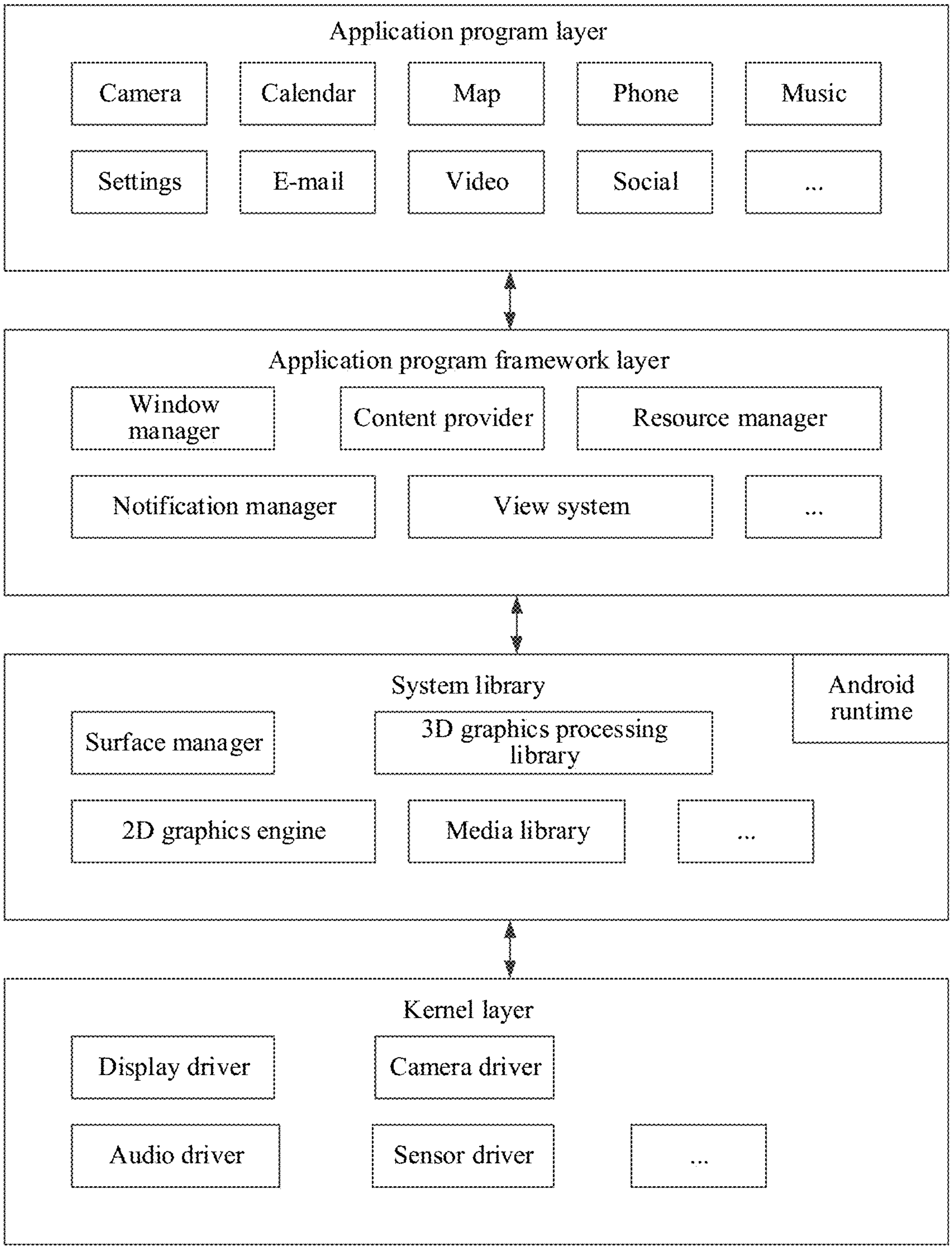
FIG. 2 is a schematic diagram of a software structure of a terminal device according to an embodiment of this application.

For example, FIG. 2 is a block diagram of a software structure of the terminal device 100 according to an embodiment of this application.

A layered architecture divides software into several layers, and each layer has a clear role and task. Layers communicate with each other through a software interface. In some embodiments, the Android system is divided into four layers, which are an application program layer, an application program framework layer, an Android runtime (Android runtime) and system library, and a kernel layer from top to bottom.

The application program layer may include a series of application program packages. As shown in FIG. 2, the application program package may include application programs such as camera, gallery, phone, map, phone, music, settings, email, video, and social.

The application program framework layer provides an application programming interface (application programming interface, API) and a programming framework for application programs at the application program layer. The application program framework layer includes some predefined functions.

As shown in FIG. 2, the application program framework layer may include a window manager, a content provider, a resource manager, a view system, a notification manager, and the like.

The window manager is configured to manage a window program. The window manager may obtain a size of a display screen, determine whether there is a status bar, lock the screen, touch the screen, drag the screen, take a screenshot, and the like.

The content provider is configured to store and obtain data, so that the data can be accessed by an application program. The data may include a video, an image, audio, calls that are made and answered, a browse history and a bookmark, an address book, and the like.

The view system includes visual controls such as a control for displaying text and a control for displaying an image. The view system may be configured to create an application program. A display interface may be formed by one or more views. For example, a display interface including an SMS message notification icon may include a view for displaying text and a view for displaying an image.

The resource manager provides the application with various resources such as a localized character string, an icon, an image, a layout file, and a video file.

The notification manager enables an application program to display notification information in a status bar. The notification information may be a message used to indicate a notification type, and may automatically disappear after a short stay without user interaction. For example, the notification manager is configured to notify download completion, a message prompt, and the like. The notification manager may alternatively be a notification that appears on a top status bar of the system in a form of a graph or scroll bar text, for example, a notification of an application program running on the background, or may be a notification that appears on the screen in a form of a dialog window. For example, text information is prompted in the status bar, a prompt tone is made, the terminal device vibrates, or an indicator light flashes.

The Android runtime includes a core library and a virtual machine. The Android runtime is responsible for scheduling and managing the Android system.

The core library includes two parts: a functional function that needs to be invoked by the Java language and a core library of Android.

The application program layer and the application program framework layer are run in the virtual machine. The virtual machine executes Java files at the application program layer and the application program framework layer as binary files. The virtual machine is configured to perform functions such as lifecycle management of an object, stack management, thread management, security and exception management, and garbage collection.

The system library may include a plurality of functional modules, for example, a surface manager (surface manager), a media library (Media Libraries), a three-dimensional graphics processing library (for example, an OpenGL ES), a 2D graphics engine (for example, an SGL), and the like.

The surface manager is configured to manage a display subsystem, and provide fusion of 2D and 3D layers for a plurality of application programs.

The media library supports playback and recording of a plurality of common audio and video formats, a static image file, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, compositing, and layer processing.

The 2D graphics engine is a drawing engine for 2D drawing.

The kernel layer is a layer between hardware and software. The kernel layer includes at least a display driver, a camera driver, an audio driver, and a sensor driver.

With reference to a scenario in which interface switching occurs in the terminal device, the following describes an example of a working procedure of software and hardware of the terminal device.

For example, when a touch sensor in the terminal device receives a touch operation, a corresponding hardware interrupt is sent to the kernel layer. The kernel layer processes the touch operation into an original input event (including information such as touch coordinates, touch strength, and a time stamp of the touch operation). The original input event is stored at the kernel layer. The application program framework layer obtains the original input event from the kernel layer, and recognizes a button corresponding to the input event. For example, the touch operation is a single touch operation and a button corresponding to the single touch operation is a button of a "camera application" icon. The camera application invokes an interface of the application framework layer to start the camera application, and further starts the display driver by invoking the kernel layer to display a function interface of the camera application. The function interface of the camera application may include a "recording" button.

When the touch sensor of the terminal device receives a touch operation on the "recording" button in the camera application, an input event corresponding to the touch operation is sent to the camera application through the system library, the kernel layer, and the application program framework layer, and the camera application invokes a camera access interface in the application program framework layer to start a recording function of the camera application and drives, based on the camera driver at the kernel layer, one or more cameras to collect one or more frames of images in real time. After the cameras collect images, the images may be sent to the camera application in real time through the kernel layer, the system library, and the application program framework layer, and the camera application further displays the images on an interface of the camera application.

It may be understood that, the camera application in the embodiments of this application may include camera and another application including photographing and recording functions, and the camera application is not specifically limited in the embodiments of this application.

The following describes the technical solutions of this application and the technical solutions of this application in detail by using specific embodiments. The following several specific embodiments may be independently implemented and may also be combined with each other, and same or similar concepts or processes may not be described repeatedly in some embodiments.

To improve user experience, a terminal device such as a mobile phone and a tablet computer is usually provided with a plurality of cameras, to provide a plurality of photographing modes for photographing and recording functions. For example, the photographing modes may include a front-facing photographing mode, a rear-facing photographing mode, or a front-facing and rear-facing photographing mode. In a possible implementation, a user may use the terminal device to record a video of one or more characters. When the user intends to obtain a video of one target character, the user may perform manual editing processing on the video. However, a manual editing processing method has complex operations and the photographing user needs to have a specific video editing technique, leading to poor user experience.

In view of this, an embodiment of this application provides a recording method. The terminal device may provide a recording function for a main character mode, and in the main character mode, the terminal device may additionally generate one video for a main character without manual editing processing, thereby improving the photographing experience of the user.

In the embodiments of this application, an example in which the terminal device is a mobile phone is used for description, and this example does not constitute a limitation on the embodiments of this application.

Figure 3:
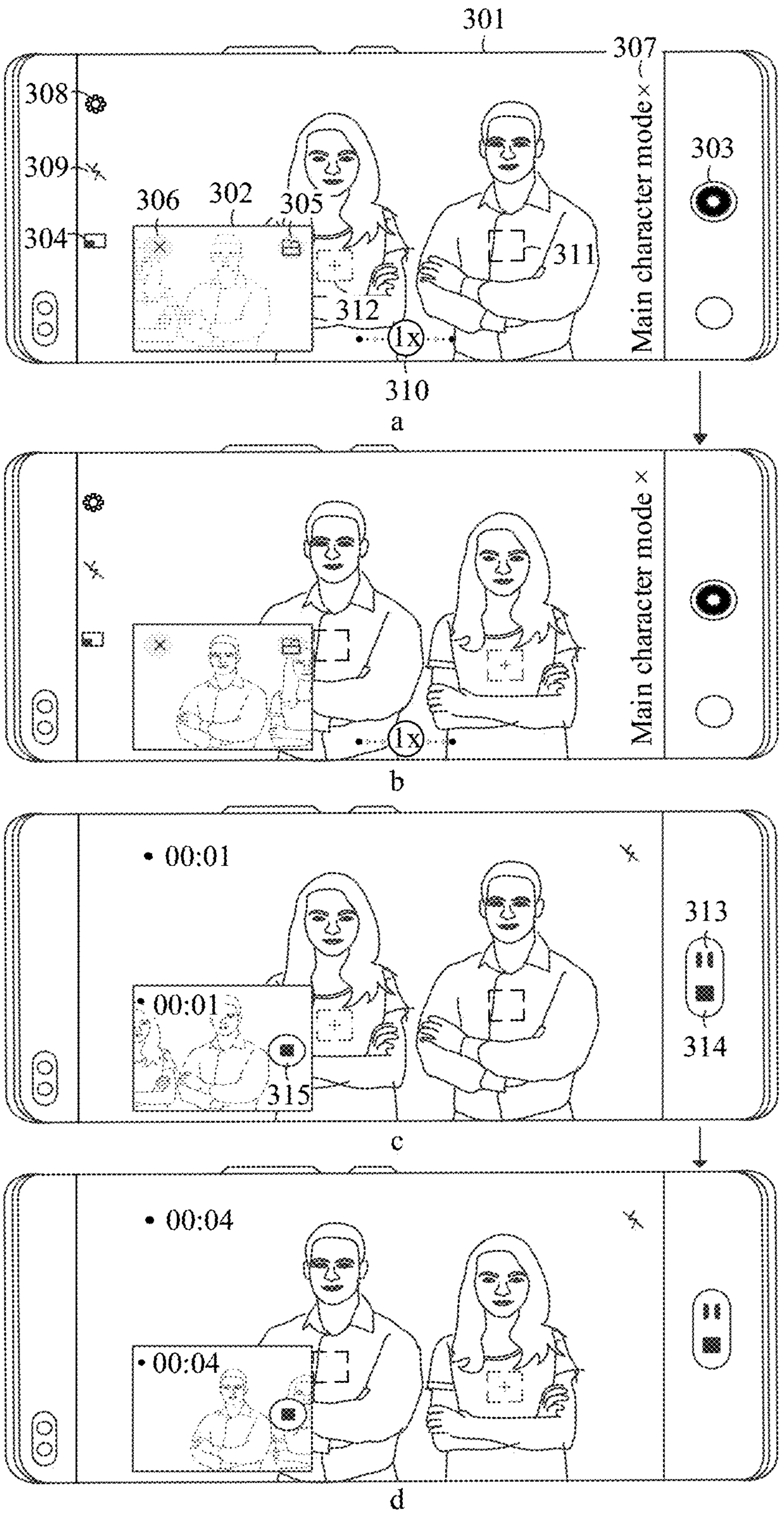
FIG. 3 is a schematic diagram of interfaces in a main character mode according to an embodiment of this application.

An embodiment of this application provides a recording method where a terminal device may provide a recording function for a main character mode, and the following describes the main character mode involved in the embodiments of this application with reference to FIG. 3.

For ease of description of the recording method provided in the embodiments of this application, the following describes meanings of terms in the embodiments of this application. The main character mode may be understood as a mode in which one portrait tracking video may be additionally generated during video recording by the terminal device. A portrait in the portrait tracking video may be understood as a "main character" focused by the user, and a manner for generating a video corresponding to the "main character" may be: cropping video content corresponding to the "main character" from a video regularly recorded by the terminal device. It may be understood that, the main character mode of the terminal device may provide a preview mode and a recording mode. In the preview mode, a display screen of the terminal device may display a preview interface. In the recording mode, the display screen of the terminal device may display a recording interface.

It should be noted that, interfaces displayed by the terminal device in the preview mode (before recording) and the recording mode (during recording) may all be referred to as preview interfaces; no video is generated and stored based on pictures displayed in the preview interface in the preview mode (before recording); and a video may be generated and stored based on pictures displayed in the preview interface in the recording mode (during recording). For ease of distinguishing, in the following description, the preview interface in the preview mode (before recording) is referred to as a preview interface; and the preview interface in the recording mode (during recording) is referred to as a recording interface.

The preview interface may include a large window and a small window. The large window may be a window whose size is equal to or slightly smaller than that of the display screen, the large window may display an image obtained by a camera, and an image displayed by the large window in the preview mode may be defined as a preview picture of the large window. The small window may be a window whose size is smaller than that of the large window, the small window may display an image of a focus tracking object selected by the user, the terminal device may select the focus tracking object based on a tracking identifier associated with the focus tracking object, and an image displayed by the small window in the preview mode may be defined as a preview picture of the small window. It may be understood that, in the preview mode, the terminal device may display the image obtained by the camera based on the large window and display the image of the focus tracking object based on the small window, but the terminal device may not generate a video and may not store content displayed by the large window and the small window as well.

The recording interface may include a large window and a small window. The large window may be a window whose size is equal to or slightly smaller than that of the display screen, the large window may display an image obtained by a camera, and an image displayed by the large window in the recording mode may be defined as a recording picture of the large window. The small window may be a window whose size is smaller than that of the large window, the small window may display an image of a focus tracking object selected by the user, and an image displayed by the small window in the recording mode may be defined as a recording picture of the small window. It may be understood that, in the recording mode, the terminal device may not only display the recording picture of the large window and the recording picture of the small window, the terminal device may further generate a large window video and a small window video obtained through recording after the recording mode is started, and may store the video generated in the large window when recording in the large window is ended and store the video generated in the small window when recording in the small window is ended. Names of the preview mode and the recording mode are not limited in the embodiments of this application.

It should be noted that, the preview interface described in the embodiments of this application may be understood as that the camera application of the terminal device is in the preview mode of the main character mode; and the recording interface may be understood as that the camera application of the terminal device is in the recording mode of the main character mode. Details are not described below again.

For example, functions of the main character mode may be set in the camera application (which may also be referred to as camera or a camera APP). For example, in a preview scenario, a preview interface in the main character mode of the terminal device may be shown in FIG. 3(*a*). The preview interface may include a large window 301, a small window 302, and a plurality of buttons. The buttons may include a recording start button 303, a first horizontal and vertical screen switching button 304, a second horizontal and vertical screen switching button 305, a small window close button 306, and a main character mode exit button 307. Optionally, the buttons may further include a recording setting button 308, a flash light button 309, and a zoom button 310.

The terminal device may display a preview picture in the large window 301, and the preview picture may include a plurality of characters. When the terminal device detects that a character exists in the preview picture of the large window, the preview picture may display a tracking identifier associated with the character. For example, the tracking identifier may be a tracking frame (for example, a tracking frame 311 and a tracking frame 312) displayed at a position corresponding to the character. For example, in the preview picture, a male character may correspond to the tracking frame 311, and a female character may correspond to the tracking frame 312. The tracking frame may prompt the user that a corresponding character may be set as a focus tracking object or may be switched to a focus tracking object. When the terminal device recognizes N characters, the large window may display M (M≤N) tracking frames. The terminal device may set any character as a focus tracking object, to generate video content of the focus tracking object. The "main character" is not limited in the embodiments of this application, where the "main character" may be a living organism such as a character or an animal, or may be a non-living organism such as a vehicle. It may be understood that, any object that may be recognized based on an algorithm model may serve as the "main character" in the embodiments of this application. In the embodiments of this application, the "main character" may be defined as a focus tracking object, and the focus tracking object may also be referred to as a main character object, a tracking target, a tracking object, or a focus tracking target. The embodiments of this application are described by using an example in which a character serves as the "main character", but the concept of the "main character" is not limited in the embodiments of this application.

In some embodiments, the tracking identifier may alternatively be a tracking identifier in another form. For example, when the terminal device recognizes a plurality of focus trackable objects, the large window may display tracking identifiers corresponding to the focus trackable objects near the focus trackable objects, and the tracking identifier may be a number, a letter, or a graph. The user taps the tracking identifier, and the terminal device selects the focus tracking object in response to the tap operation. In another example, the plurality of focus trackable objects in the large window are marked with numbers, graphs, user images, or other tracking identifiers. The terminal device may arrange a plurality of tracking identifiers at an edge or another position of a display region of the large window, and the user may tap the tracking identifier in the large window to select the focus tracking object. The recording method is described by using a tracking frame as an example in the embodiments of this application, but a form of the tracking identifier is not limited in the embodiments of this application.

It should be noted that, in the embodiments of this application, when recognizing two or more characters, the terminal device may mark corresponding tracking frames for the characters; and when recognizing a single character, the terminal device may mark a corresponding tracking frame for the single character or may not mark a tracking frame, which is not limited herein.

Optionally, the N characters displayed in the large window may be focus trackable objects, the selected "main character" is the focus tracking object, and characters that are not selected as the "main character" are other objects. A tracking frame (for example, the tracking frame 311) of the focus tracking object and a tracking frame (for example, the tracking frame 312) of another object may be displayed in different forms. In this way, the user can distinguish a tracked character.

In some embodiments, a shape, a color, a size, and a position of the tracking frame are adjustable. For example, a form of the tracking frame 311 of the focus tracking object may be a dashed frame. A form of the tracking frame 312 of the another object may be a combination of a dashed frame and "+". In addition to different shapes of the tracking frames, colors of the tracking frames may also be set in the embodiments of this application. For example, the tracking frame 311 and the tracking frame 312 have different colors. In this way, the focus tracking object and the another object may be intuitively distinguished. It may be understood that, the tracking frame may alternatively be displayed in another form, provided that the tracking frame can be triggered by the user to implement a function of tracking a focus trackable object.

The tracking frame may be marked at any position of the focus trackable object, which is not specifically limited in the embodiments of this application. In a possible implementation, in order not to cause a visual distraction to preview of the focus trackable object in the large window, the tracking frame may avoid the face of the focus trackable object. For example, the tracking frame may be marked at a centered position of a body of the focus trackable object. The terminal device may perform face recognition and body recognition, and when the terminal device detects a human face, the terminal device may display a tracking frame. The terminal device may determine a display position of the tracking frame based on face recognition and body recognition, and the tracking frame is displayed at a centered position of a human body.

It should be noted that, in some embodiments, the following scenario that the preview picture of the large window includes N characters may appear, where M (M≤N) focus trackable objects marked with tracking frames and N-M characters that are not recognized by the terminal device are included. During actual photographing, the terminal device may display a tracking frame based on a face technology, and when the terminal device cannot capture the face of a character (for example, a back of the character), the terminal device does not mark a tracking frame for the character. A method for displaying a tracking frame is not limited in the embodiments of this application.

In a preview scenario, the small window 302 displays a preview picture of the focus tracking object. The preview picture in the small window may be a part of a preview picture in the large window. In a possible implementation, the preview picture in the small window is obtained by cropping the preview picture in the large window according to a specific proportion based on the focus tracking object. The terminal device may crop an image in the large window according to an algorithm, so that the small window obtains a part of the image in the large window. In some embodiments, when a time of cropping calculation is long, the small window may display in real time cropped images of first several frames of images displayed in the large window in real time. The picture displayed in the small window is not specifically limited in the embodiments of this application.

When the focus tracking object is switched, a character in the preview picture displayed in the small window 302 is switched correspondingly. For example, if the focus tracking object is switched from a male character to a female character, the preview picture displayed in the small window 302 is changed correspondingly. The following describes a scenario in which the terminal device selects or switches the focus tracking object in detail with reference to FIG. 5, and details are not described herein.

In some embodiments, a size, a position, and a horizontal and vertical screen display manner of the small window are adjustable, and the user may adjust a form of the small window according to recording habits. The following describes adjustment of the form of the small window with reference to FIG. 6A to FIG. 7D in detail, and details are not described herein.

The preview interface further includes a plurality of buttons, and the following describes functions of the buttons.

The recording start button 303 is configured to control the terminal device to start recording in the large window and recording in the small window.

The first horizontal and vertical screen switching button 304 may be displayed in the large window and is configured to adjust horizontal screen display and vertical screen display of the small window.

The second horizontal and vertical screen switching button 305 may be displayed in the small window and is also configured to adjust horizontal screen display and vertical screen display of the small window.

The small window close button 306 is configured for the terminal device to close the small window.

The main character mode exit button 307 is configured for the terminal device to exit the main character mode and enter a regular recording mode.

Optionally, the buttons in the preview interface further include:

- the recording setting button 308, configured for the terminal device to display a camera setting interface, where the user adjusts various photographing parameters of the camera in the interface;
- the flash light button 309, configured to set a flash light effect, where the flash light button may be extended to buttons with a plurality of flash light functions, and the buttons may be configured to control mandatory turn-on, mandatory turn-off, turn-on during photographing, and environment-based adaptive turn-on of a flash light; and
- the zoom button 310, configured to adjust zoom of the preview interface. The zoom button may provide zoom functions such as wide-angle, 1×, and 2×. The zoom button may be configured to adjust a size of a preview scenario in the large window, and a preview scenario in the small window may be proportionally scaled as the scaling in the large window.

It may be understood that, in a preview scenario, the preview interface may include a large window and a small window. A preview picture in the large window includes focus trackable objects. When the terminal device selects a focus tracking object, the focus tracking object may be displayed in the center in a preview picture in the small window. In some scenarios, the focus tracking object may be in a moving state, and when the focus tracking object moves but does not leave a camera, the focus tracking object may be continuously displayed in the center in the preview picture in the small window. For example, the trackable objects in the preview interface include a male character and a female character, the terminal device responds to a tap operation of the user on a tracking frame of the male character, and the terminal device selects the male character as the focus tracking object and enters an interface shown in FIG. 3(*a*). In the interface in FIG. 3(*a*), the male character is displayed in the center in the preview picture in the small window, and the male character is located on a right side of the female character. When the male character moves, the terminal device may continuously perform focus tracking on the male character and display the male character in the center in the small window. When the male character walks to a left side of the female character, an interface of the terminal device may be shown in FIG. 3(*b*). In the interface in FIG. 3(*b*), the male character is still displayed in the center in the preview picture in the small window, and the male character is located on the left side of the female character.

For example, in a recording scenario, a recording interface in the main character mode of the terminal device may be shown in FIG. 3(*c*). The recording interface may include a large window 301, a small window 302, a plurality of buttons, and a recording time. The buttons may include a recording pause button 313, a recording end button 314, and a small window recording end button 315.

Different from the preview scenario, in the recording scenario, the small window 302 displays a recording picture of the focus tracking object. In a recording process, the terminal device may additionally generate one video recorded by the small window based on a video recorded by the large window. Similar to the preview process, the recording picture in the small window may be a part of a recording picture in the large window. In a possible implementation, the recording picture in the small window is obtained by cropping the recording picture in the large window according to a specific proportion based on the focus tracking object. The two videos are independently stored in the terminal device. In this way, a video corresponding to the focus tracking object may be obtained without performing manual editing on the entire video subsequently, and operations are simple and convenient, thereby improving the user experience.

The recording interface may include a plurality of buttons, and the following describes functions of the buttons.

The recording pause button 313 is configured to pause video recording. Recording in the large window and recording in the small window may be paused simultaneously, and when the recording interface does not include the small window, the recording pause button 313 may only pause the recording in the large window.

The recording end button 314 is configured to end video recording. The recording in the large window and the recording in the small window may be ended simultaneously, and when the recording interface does not include the small window, the recording end button 314 may only end the recording in the large window.

The small window recording end button 315 is configured to end recording of a video in the small window. The terminal device may end the recording in the small window based on the small window recording end button 315, and the recording in the large window is not affected.

The recording time is used for identifying a duration for which a current video has been recorded. A recording duration in the large window may be the same as or different from that in the small window.

It may be understood that, in the recording scenario, the recording interface may include a large window and a small window. A recording picture in the large window includes focus trackable objects. When the terminal device selects a focus tracking object, the focus tracking object may be displayed in the center in a recording picture in the small window. In some scenarios, the focus tracking object may be in a moving state, and when the focus tracking object moves but does not leave a camera, a focus moves as the focus tracking object moves, and the focus tracking object may be continuously displayed in the center in the recording picture in the small window. For example, the trackable objects in the recording interface include a male character and a female character, the terminal device responds to a tap operation of the user on a tracking frame of the male character, and the terminal device selects the male character as the focus tracking object and enters an interface shown in FIG. 3(*c*). In the interface in FIG. 3(*c*), the male character is displayed in the center in the recording picture in the small window, and the male character is located on a right side of the female character. In this case, the focus is located in a facial region of the male character and located at a right part of the center of the picture. When the male character moves, the terminal device may continuously perform focus tracking recording on the male character and display the male character in the center in the small window. When the male character walks to a left side of the female character, an interface of the terminal device may be shown in FIG. 3(*b*). In the interface in FIG. 3(*b*), the male character is still displayed in the center in the recording picture in the small window, and the male character is located on the left side of the female character. In this case, the focus is located in the facial region of the male character and located at a left part of the center of the picture.

In the embodiments of this application, a photographing mode of additionally generating one focus tracking video based on the focus tracking object is defined as a main character mode, and the photographing mode may also be referred to as a focus tracking mode, which is not limited in the embodiments of this application.

When recording is performed by using the main character mode, there may be a plurality of manners for entering the main character mode.

For example, the following describes methods for entering the main character mode in the embodiments of this application with reference to FIG. 4A(1) to FIG. 4A(4) and FIG. 4B(1) to FIG. 4B(4).

In a possible implementation, the terminal device is in a main interface shown in FIG. 4A(1), and when the terminal device detects an operation that the user starts a camera application 401, the terminal device may enter a photographing preview interface shown in FIG. 4A(2). The photographing preview interface may include a preview picture and photographing mode select buttons. The preview picture may display a scenario captured by a camera of the terminal device in real time. The photographing mode select buttons include, but are not limited to: a "portrait" button, a "photographing" button, a "recording" button 402, a "professional" button, and a "more" button 403.

When the terminal device detects an operation that the user taps the "recording" button 402, the terminal device switches from the photographing preview interface to a recording preview interface shown in FIG. 4A(3). The recording preview interface may include, but not limited to: a main character mode button 404 configured to receive a trigger to enter the main character mode, a recording setting button configured to receive a trigger to enter settings, a filter button configured to receive a trigger to enable a filter effect, and a flash light button configured to set a flash light effect.

The terminal device may enter the main character mode based on the main character mode button 404 in the recording preview interface. For example, the user taps the main character mode button 404 in the interface, and the terminal device enters a preview interface shown in FIG. 4A(4) in response to the tap operation; and in the preview interface, the large window may include a plurality of photographing objects, the terminal device may recognize the plurality of photographing objects based on image content of the large window, the plurality of photographing objects may serve as focus trackable objects, and tracking frames may be marked for the focus trackable objects in the preview interface of the terminal device.

In another possible implementation, the terminal device is in a main interface shown in FIG. 4B(1). When the terminal device detects an operation that the user starts a camera application 401, the terminal device may enter a photographing preview interface shown in FIG. 4B(2). The photographing interface may include a plurality of buttons, for example, a "portrait" button, a "photographing" button, a "recording" button 402, a "professional" button, and a "more" button 403. When the terminal device detects an operation that the user taps the "more" button 403, the terminal device enters an interface shown in FIG. 4B(3), and the interface in FIG. 4B(3) may display a plurality of function buttons of the "more" button in an unfolded manner. For example, the "more" button may include, but not limited to: a "professional PRO" button, a "panorama" button, a "high-dynamic-range (high-dynamic-range, HDR)" button, a "delayed photographing" button, a "watermark" button, a "document dewarping" button, a "high resolution" button, a "microfilm" button, and a main character mode button 405. Alternatively, it may be understood as that the main character mode is hidden in the "more" button.

When the user taps the main character mode button 405 in the interface in FIG. 4B(3), the terminal device may enter a preview interface shown in FIG. 4B(4) in response to the tap operation. For related content of the preview interface shown in FIG. 4B(4), reference may be made to the description of the preview interface shown in FIG. 4A(4), and details are not described herein again.

It may be understood that, FIG. 4A(1) to FIG. 4A(4) and FIG. 4B(1) to FIG. 4B(4) show two methods for the terminal device to enter the main character mode in the embodiments of this application, but the embodiments of this application are not limited to the foregoing two entering methods. In addition to the icon form shown in FIG. 4A(3) and in FIG. 4B(3), the main character mode button may also be in another form. The main character mode button may alternatively be set in another hidden menu or set at another window display position, which is not limited in the embodiments of this application.

After the terminal device enters the main character mode, one piece of video content corresponding to a "main character" selected by the user may be additionally generated and displayed in the small window while recording in the large window is implemented. It may be understood that, when the terminal device enters the main character mode and performs recording, the terminal device may be in a horizontal screen state or a vertical screen state. In the horizontal screen state or the vertical screen state, principles that the terminal device implements the main character mode are similar. For ease of description of the recording method in the embodiments of this application, the following embodiments describe a plurality of application scenarios of the main character mode by using an example in which the terminal device performs recording in the horizontal screen state.

The embodiments of this application describe a scenario in the preview mode of the main character mode in detail with reference to FIG. 5 to FIG. 9B, and the embodiments of this application describe a scenario in the recording mode of the main character mode in detail with reference to FIG. 10A to FIG. 15. Scenarios in the preview mode are first described.

Figure 5:
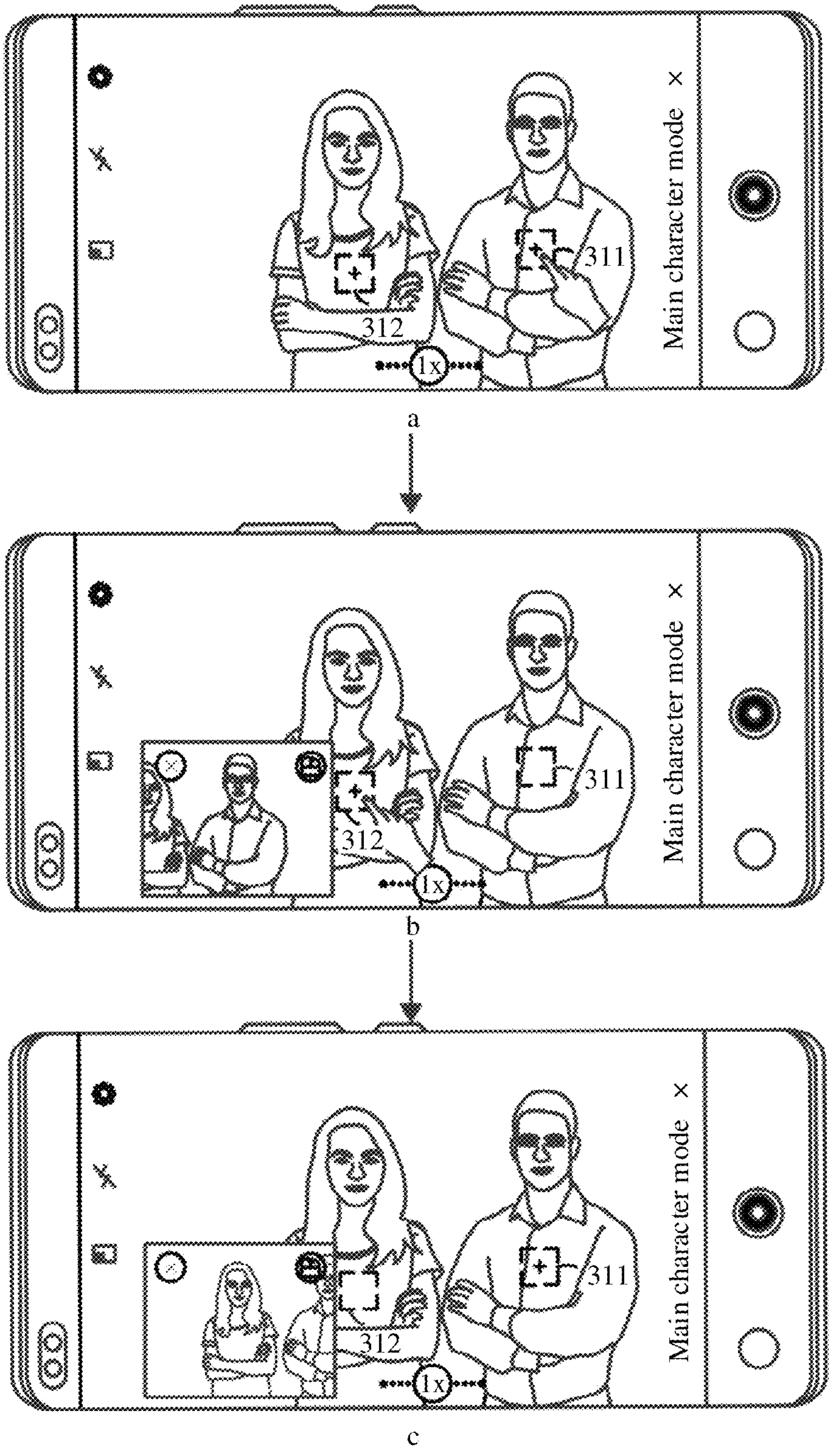
FIG. 5 is a schematic diagram of interfaces of selecting a focus tracking object of a small window according to an embodiment of this application.

For example, FIG. 5 is a schematic diagram of interfaces of selecting a focus tracking object in a preview mode of a main character mode. As shown in FIG. 5:

The terminal device enters the preview mode of the main character mode, and as shown in FIG. 5(*a*), the terminal device may display a preview interface of the main character mode. The preview interface includes a plurality of focus trackable objects, and respective tracking frames may be marked for the focus trackable objects correspondingly (for example, a tracking frame 311 is marked on a male character, and a tracking frame 312 is marked on a female character).

The terminal device may determine a focus tracking object selected by the user according to a tap operation of the user on the tracking frames. For example, if the user intends to preview a focus tracking picture of the male character in a small window of the terminal device, the user may tap the tracking frame 311 corresponding to the male character, and the terminal device enters an interface shown in FIG. 5(*b*) in response to the tap operation.

In the interface shown in FIG. 5(*b*), when the terminal device selects the male character as the focus tracking object, a small window may appear in a large window in the preview interface in a floated manner, and the small window presents a picture corresponding to a position at which the focus tracking object is located in the large window, where in the small window, the focus tracking object may be located at a centered position of the small window to reflect a "main character" role of the focus tracking object. Optionally, after a tracking frame of the focus tracking object is triggered, a color of the tracking frame corresponding to the focus tracking object may be changed, where for example, the color may be lighted, darker, or changed to another color, and a shape of the tracking frame may also be changed, where for example, the tracking frame 311 of the male character is a dashed frame, and the tracking frame 312 of the female character is a combination of a dashed frame and "+". In the embodiments of this application, forms of tracking frames of the focus tracking object and another object may be represented as having any combination of different colors, different sizes, and different shapes, so that the user can distinguish the focus tracking object and the another object in the large window. Optionally, after the tracking frame of the focus tracking object is triggered, the tracking frame corresponding to the focus tracking object may disappear, so that the user may not select the selected focus tracking object repeatedly.

It may be understood that, in the preview mode of the main character mode, after selecting the focus tracking object, the user may change the focus tracking object autonomously. In the interface shown in FIG. 5(*b*), when receiving an operation that the user taps the tracking frame 312 of the female character, the terminal device enters an interface shown in FIG. 5(*c*). In this case, the focus tracking object in the small window is switched from the male character to the female character. States of the tracking frames of the characters are changed. For example, a color and a shape of the tracking frame 312 of the female character are changed, and the tracking frame 311 of the male character is restored to an unselected form. For changes of the forms of the tracking frames, reference may be made to the related description in the interface shown in FIG. 5(*b*), and details are not described herein again.

Optionally, the terminal device switches the focus tracking object in the preview mode, and an object displayed in a preview picture in the small window is changed from the original focus tracking object to a new focus tracking object. To enable a smoother picture during switching, an embodiment of this application further provides a dynamic special effect for focus tracking object switching. For example, the following describes a design of the dynamic special effect by using an example in which the male character is the original focus tracking object and the female character is the new focus tracking object.

In a possible implementation, the large window in the preview interface includes a male character and a female character, and the focus tracking object displayed in the small window is the male character. When the terminal device detects a tap operation on the tracking frame of the female character, the preview picture in the small window may be switched from focus tracking display of the male character to panoramic display, and then switched from panoramic display to focus tracking display of the female character. For example, the male character is originally displayed in the center in the small window, after the user taps the tracking frame of the female character, a cropping proportion of the preview picture in the small window to the preview picture in the large window is increased, and the preview picture in the small window may include more content in the preview picture in the large window, which may be represented as that the male character and a background thereof in the small window are gradually scaled until a panorama of the female character and the male character may be displayed in the small window simultaneously. Then, the female character in the panorama is displayed in the center and in an enlarged manner in the small window. Optionally, the panorama may be the preview picture in the large window that is proportionally scaled or may be an image obtained by cropping a region having the male character and the female character in the preview picture in the large window.

In another possible implementation, the large window in the preview interface includes a male character and a female character, and the focus tracking object displayed in the small window is the male character. When the terminal device detects a tap operation on the tracking frame of the female character, a focus tracking point in the preview picture in the small window is gradually moved from the male character to the female character. For example, the male character is originally displayed in the center in the small window, after the user taps the tracking frame of the female character, a cropping proportion of the preview picture in the small window to the preview picture in the large window remains unchanged, but the preview picture in the small window is cropped in a direction approaching the female character according to the original cropping proportion. For example, the female character is located on a left side of the male character, and in a process that the terminal device switches the focus tracking object, the male character and a background thereof in the small window are moved rightward until the female character is displayed in the center in the small window.

In this way, in the process that the terminal device switches the focus tracking object, a picture that the original focus tracking object is switched to the new focus tracking object in the small window becomes smoother, thereby improving the recording experience of the user.

In the preview mode of the main character mode, after the small window appears in the preview interface of the terminal device, the user may further adjust the form of the small window as required. The following describes methods for adjusting the small window with reference to FIG. 6A, FIG. 6B, and FIG. 6C.

Figure 6A:
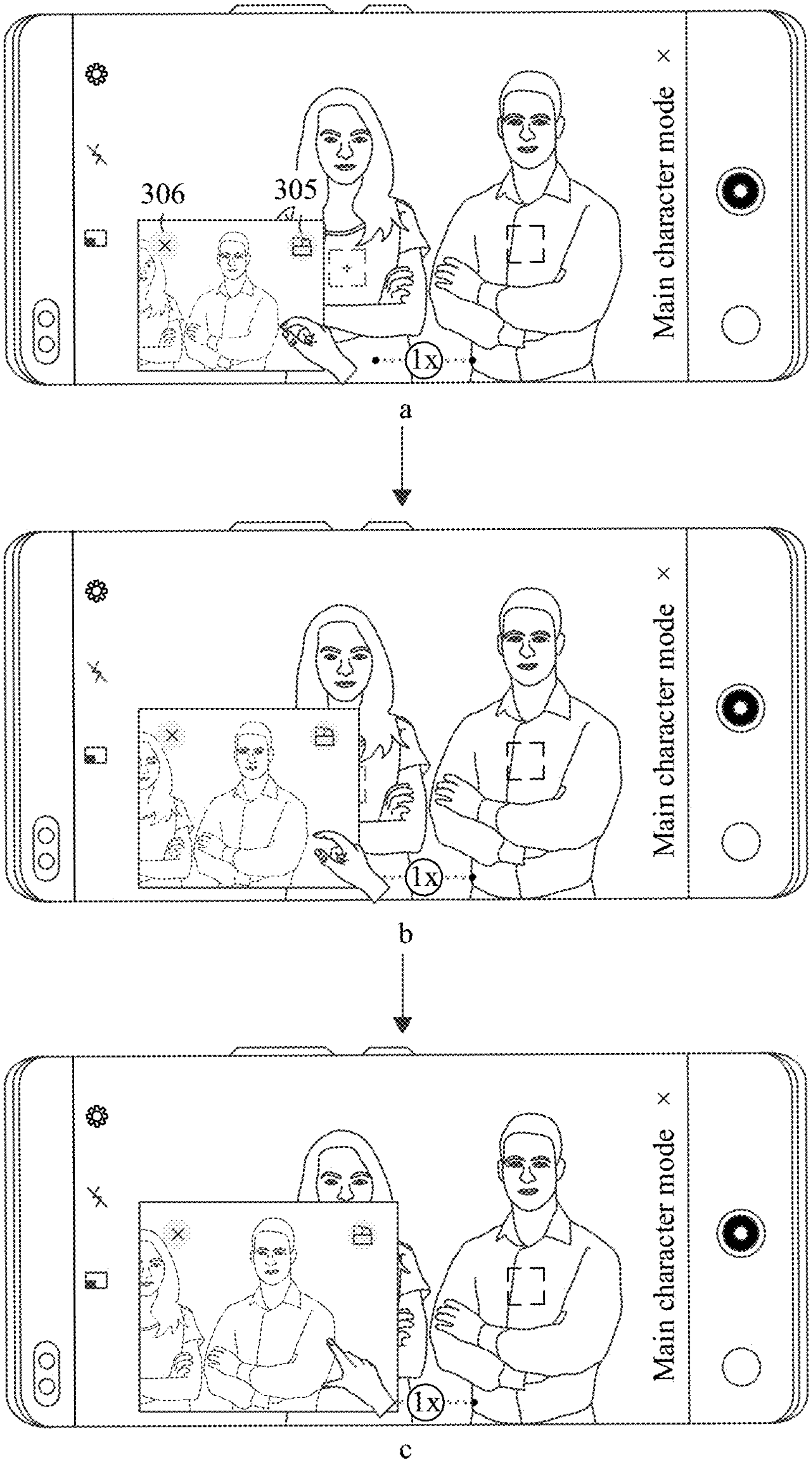
FIG. 6A is a schematic diagram of interfaces of adjusting a size of a small window according to an embodiment of this application.

For example, FIG. 6A is a schematic diagram of interfaces of adjusting a size of a small window according to an embodiment of this application. As shown in FIG. 6A(a), the small window may include a functional region of a small window close button 306 and a second horizontal and vertical screen switch button 305 and a non-functional region displaying a preview picture of the focus tracking object. The user may press any position in the non-functional region in the small window with two fingers and adjust a distance between the two fingers. When the terminal device detects the press operation, the terminal device enters an interface shown in FIG. 6A(b). The user may control the size of the small window by adjusting the distance between the two fingers. When the terminal device detects that the distance between the two fingers changes, the terminal device may adjust the size of the small window correspondingly according to a distance variation. For example, when the distance between the two fingers decreases, the small window is scaled, and when the distance between the two fingers increases, the small window is enlarged. After the user releases the two fingers, the size of the small window is kept at a size when the fingers are released, and the preview interface is shown in FIG. 6A(c).

It should be noted that, in some embodiments, in the preview mode of the main character mode, when the terminal device adjusts the size of the small window, the preview picture in the small window may be enlarged or scaled according to a specific proportion relative to an original preview picture of the small window. For example, in a process that the small window is enlarged, content in the preview picture displayed in the small window remains unchanged, only the original preview picture is enlarged according to a specific proportion based on an adjusted distance between the two fingers, and characters and backgrounds in the original preview picture are correspondingly enlarged, to obtain an enlarged preview picture, as shown in FIG. 6A.

In some embodiments, when the terminal device adjusts the size of the small window, the preview picture in the small window is enlarged or scaled relative to the preview picture in the large window. For example, in a process that the small window is enlarged, content in the preview picture displayed in the small window is increased. The terminal device may add content in the preview picture in the small window according to an adjusted distance between the two fingers. For example, the terminal device crops more content in the preview interface in the large window and preview the content in the small window, which is represented as that sizes of characters in the preview picture in the small window are consistent with sizes of the characters in the original preview picture, but backgrounds in the preview picture are increased.

The size of the small window may be customized and adjusted in the embodiments of this application, the user may adjust the size of the small window to a suitable size, and the user may view the preview picture of the focus tracking object in the small window more clearly, thereby improving the recording experience of the user.

It may be understood that, when the size of the small window is relatively small, contact areas of the fingers are excessively great during operation by the two fingers. As a result, a button in the small window may be triggered accidentally. Optionally, an embodiment of this application provides a method for preventing a button from being triggered accidentally in a small window adjustment process. When the terminal device detects that a tap or long press operation exists in the non-functional region of the small window, the small window close button and the second horizontal and vertical screen switch button in the small window are hidden. When the terminal device detects that no touch operation exists in the small window, the hidden buttons are restored and displayed.

Figure 6B:
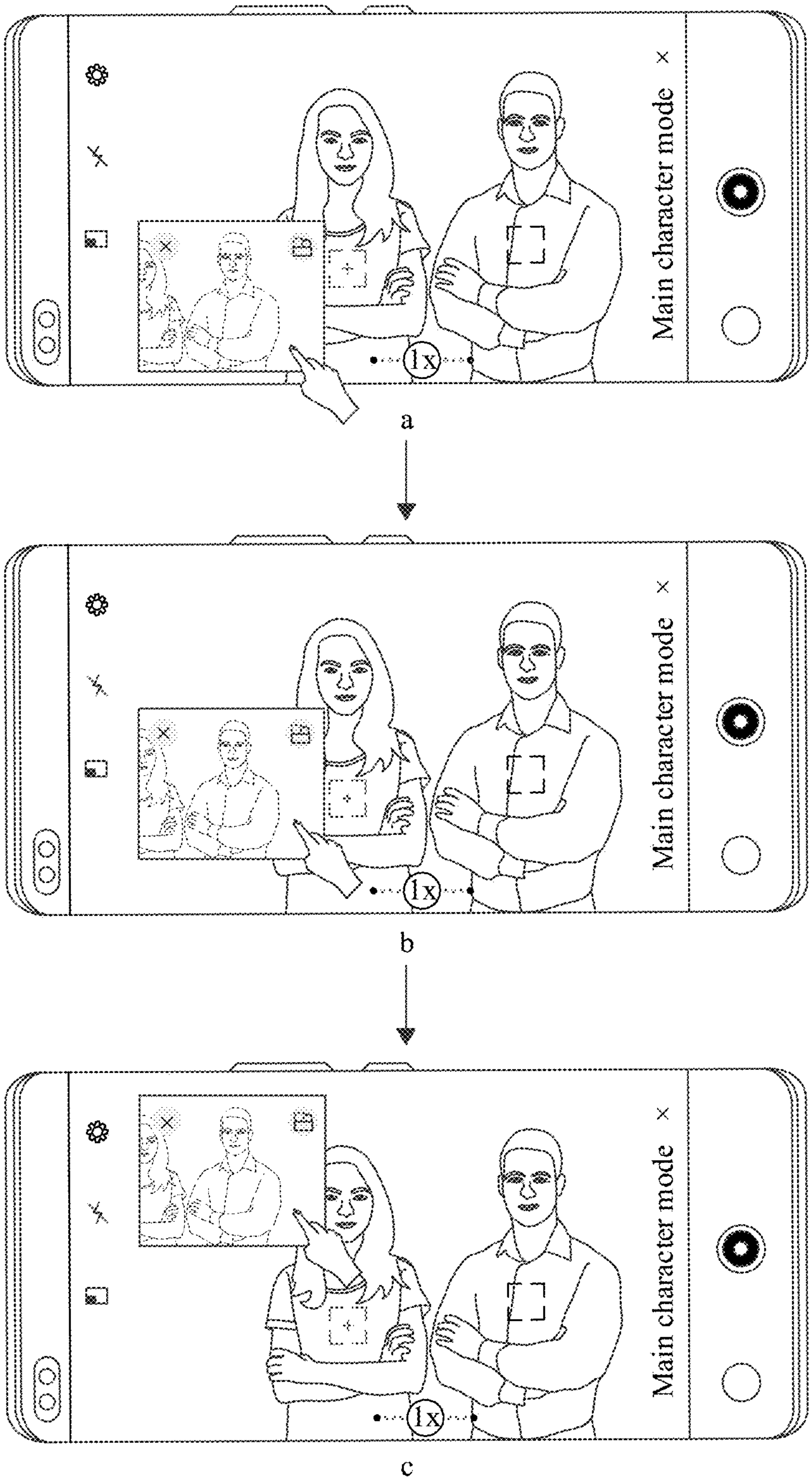
FIG. 6B is a schematic diagram of interfaces of adjusting a display position of a small window according to an embodiment of this application.

In the preview mode of the main character mode, to improve the recording experience of the user, the terminal device further provides a function of adjusting a display position of the small window. For example, FIG. 6B shows a method for adjusting a display position of a small window. As shown in FIG. 6B:

The display position of the small window in an interface shown in FIG. 6B(a) is located at the lower left of the large window, and when the terminal device detects an operation that the user taps the small window and long presses to drag the small window, the terminal device enters an interface shown in FIG. 6B(b). In the interface in FIG. 6B(b), the display position of the small window may move as the finger of the user moves. For example, when the user long presses the small window and drags the small window upward, the small window moves upward correspondingly. After the user drags the small window to a preset position, the user releases the finger. The terminal device detects a lift operation of the user and stops moving the small window. In this case, the small window stays at a position where the finger performs the lift operation, and the terminal device enters an interface shown in FIG. 6B(c). In the interface in FIG. 6B(c), the small window is moved to the upper left.

It should be noted that, in a possible implementation, after the display position of the small window is adjusted, as a character in the camera of the terminal device moves or as the camera of the terminal device moves, the small window may block a portrait or a human face in the preview picture in the large window, which affects the preview experience of the user. The display position of the small window may be adjusted automatically or adjusted by default in the embodiments of this application. For example, the terminal device may detect a display position of the human face in the large window and the display position of the small window, and when the terminal device detects that a region in which the small window is located and a region in which the human face is located overlap with each other, the terminal device may automatically adjust the display position of the small window until no overlapped region exists between the two regions. Alternatively, the terminal device may detect a position of the human face and a position of a rectangular side frame of the small window, and when the terminal device detects that a distance between the side frame and a region in which the human face is located is less than a specific threshold, the terminal device stops, by default, movement of the small window toward a direction of the human face, so that the small window cannot move to the region in which the human face is displayed.

In another possible implementation, after the display position of the small window is adjusted, a part of the small window may exceed an edge of the large window, and the user cannot preview the complete small window, which affects the preview experience of the user. The display position of the small window may be adjusted automatically or adjusted by default in the embodiments of this application. For example, the terminal device may detect whether the small window fully appears in the display screen, and if a part of the small window cannot be fully displayed, the terminal device may automatically move the small window in a reverse direction of adjusting the display position of the small window last time until the small window is fully displayed. The terminal device may also automatically adjust the display position of the small window according to another principle, which is not limited in the embodiments of this application. Alternatively, the terminal device may detect positions of boundaries of a rectangular side frame of the large window and positions of boundaries of a rectangular side frame of the small window, and when any boundaries of the two rectangular side frames overlap with each other, the terminal device stops, by default, moving the small window, so that the small window cannot be moved out of the edge of the large window.

Optionally, in the preview mode of the main character mode, in a process that the terminal device adjusts the position of the small window, the terminal device may alternatively set the buttons in the small window to be hidden to prevent the buttons from being triggered accidentally, and details are not described herein.

The display position of the small window may be customized and adjusted in the embodiments of this application, the user may adjust the position of the small window in real time to reduce a case that the small window blocks the preview picture in the large window, thereby improving the recording experience of the user.

An embodiment of this application provides a method for adjusting a small window through a gesture, and this method may adjust the form of the small window flexibly and quickly. The embodiments of this application are not limited to the foregoing method, and the terminal device may alternatively adjust the small window in another manner. For example, the terminal device may adjust the size of the small window through a button having a function of enlarging/scaling at a magnification. The terminal device may set a small window adjustment menu, to adjust the size of the small window by manually inputting parameters such as a length/width. The terminal device may alternatively set a movement direction button to adjust the position of the small window by moving upward, downward, leftward, or rightward. The method for adjusting the small window is not limited in the embodiments of this application.

Figure 6C:
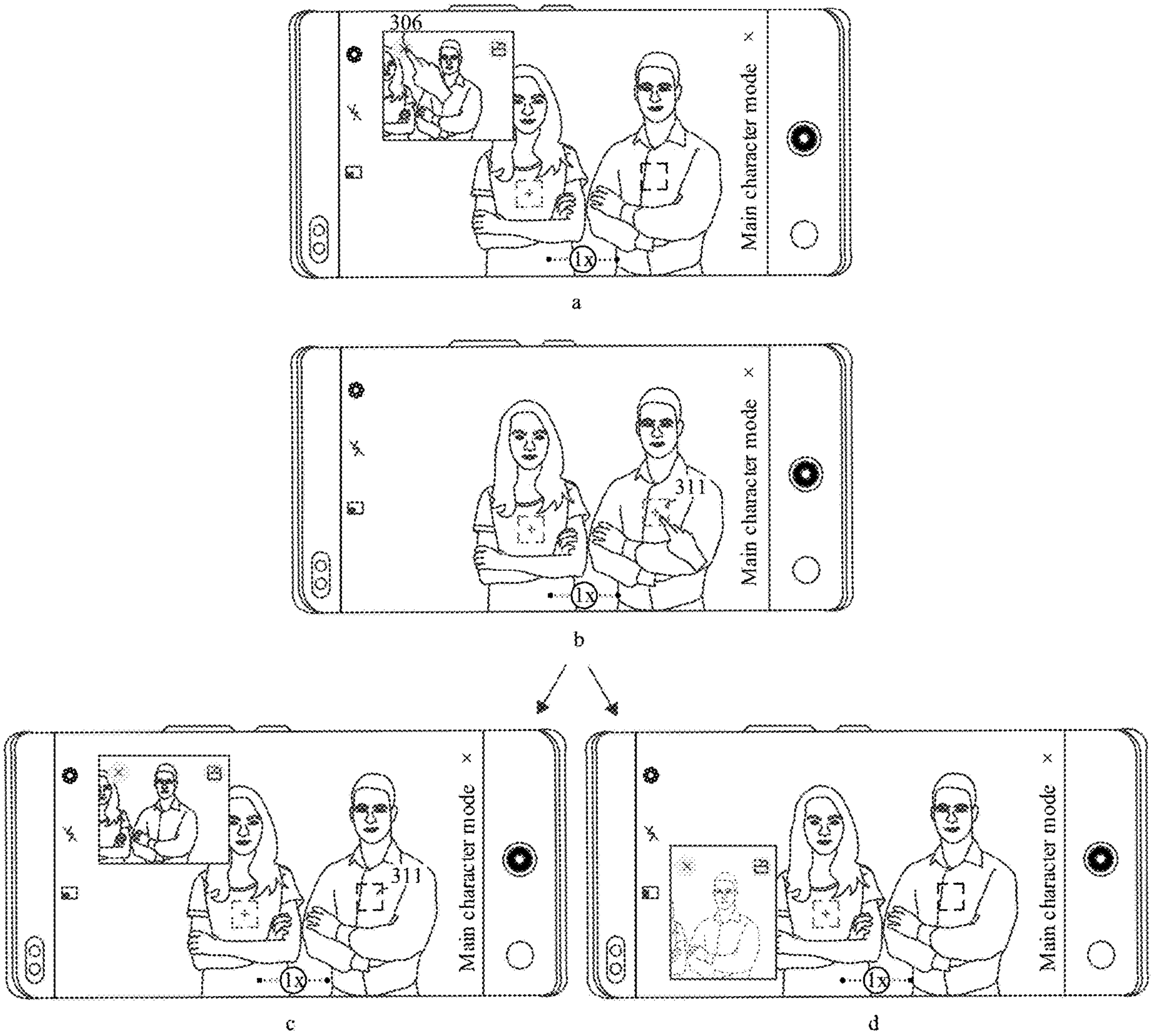
FIG. 6C is a schematic diagram of interfaces of a memory mechanism of a small window according to an embodiment of this application.

In a possible implementation, in the embodiments of this application, the small window in the preview mode of the main character mode may further include a memory mechanism, and the following describes the memory mechanism of the main character mode with reference to FIG. 6C.

For example, the main character mode may provide a function of adjusting the display position of the small window, and the user may move the position of the small window according to photographing habits of the user. For example, as shown in FIG. 6C(a), the small window is adjusted to an upper left position of the preview interface. When the terminal device detects an operation that the user taps the small window close button 306, the terminal device enters an interface shown in FIG. 6C(b). In the interface in FIG. 6C(b), the small window is closed. When the selected focus tracking object is not displayed in the picture in the large window, the tracking frame 311 is restored to the unselected form. When the terminal device receives an operation that the user taps the tracking frame 311, the terminal device enters an interface shown in FIG. 6C(c). In the interface in FIG. 6C(c), the small window is restarted. In this case, a form of the small window is consistent with the form of the small window in FIG. 6C(a). For example, in the interface in FIG. 6C(a) and the interface in FIG. 6C(c), sizes, positions, and horizontal and vertical screen display of the small window are the same.

In the embodiments of this application, a time limit of the memory mechanism may be further set, and when a duration that the terminal device does not display the small window is within the time limit or when a duration that the terminal device does not use the recording function is within the time limit, if the terminal device re-triggers to display the small window, the form of the small window may follow a form of the small window that is closed last time. When the duration that the terminal device does not display the small window exceeds the time limit or the duration that the terminal device does not use the recording function exceeds the time limit, if the terminal device re-triggers the small window, the small window is restored to a form that is set by default.

In the preview mode of the main character mode, the form that is set by default of the small window may be a form of the small window when the main character mode is entered for the first time on the day and the small window is started, or may be a system default form. The time limit may be set to 15 minutes (min). For example, the small window in the interface in FIG. 6C(b) is closed, after 15 min, the user taps the tracking frame 311 of the male character, the terminal device enters an interface shown in FIG. 6C(d), and a form of the small window in the interface in FIG. 6C(d) may be a form that is set by default. For example, the large window is in horizontal screen preview, and the small window is in vertical screen preview, and the small window appears at the lower left of the preview interface.

It may be understood that, one form that is set by default of the small window may be shown by the interface in FIG. 6C(d), where a preview direction in the large window is inconsistent with a preview direction in the small window. For example, when the large window is in horizontal screen preview, the small window is in vertical screen preview; and when the large window is in vertical screen preview, the small window is in horizontal screen preview. In another form that is set by default of the small window, the preview direction in the large window is consistent with the preview direction in the small window. For example, when the large window is in horizontal screen preview, the small window is also in horizontal screen preview; and when the large window is in vertical screen preview, the small window is also in vertical screen preview. The form that is set by default of the small window is not limited in the embodiments of this application.

This embodiment of this application provides a memory mechanism of the small window in the preview mode of the main character mode, the small window is restarted within a specific time limit, and the form of the small window may follow a form of the small window that is adjusted by the user last time. In addition, the terminal device may automatically adjust, when the small window is closed accidentally, the form to a form before the small window is closed accidentally, thereby reducing a time that the user adjusts the form of the small window and improving the recording experience of the user.

In the embodiments of this application, the terminal device may set the memory mechanism of the small window independently, so that when the small window is started for the $K^{th}$ time within a period of time, the form of the small window is consistent with a form of the small window when the small window is started for the $(K-1)^{th}$ time. In addition, in the embodiments of this application, the terminal device may further establish a binding relationship between the form of the small window and the focus tracking object.

For example, in some embodiments, the terminal device may set the memory mechanism based on a face recognition technology. The terminal device selects the focus tracking object and adjusts the form of the small window, and the terminal device may establish a binding relationship between a facial feature of the focus tracking object and adjustment data of the small window and store the data in the terminal device. When the terminal device recognizes the focus tracking object again, the terminal device automatically invokes the adjustment data bound to the focus tracking object, and a current form of the small window may be consistent with the form of the small window when the focus tracking object is selected last time.

In some embodiments, when the terminal device recognizes the focus tracking object for the $K^{th}$ time, the form of the small window is adjusted, and the terminal device may store adjustment data at the $K^{th}$ time and establish a binding relationship between the new adjustment data and the focus tracking object. Optionally, the adjustment data at the $K^{th}$ time may replace adjustment data at the $(K-1)^{th}$ time, and the terminal device only reserves the adjustment data corresponding to the focus tracking object last time. Optionally, the terminal device may store the adjustment data at the $K^{th}$ time and establish a new binding relationship between the new adjustment data and the focus tracking object, and the terminal device may reserve a binding relationship established according to the adjustment data at the $(K-1)^{th}$ time. When the terminal device selects the focus tracking object for the $(K+1)^{th}$ time, the terminal device may provide the adjustment data of the small window at the $K^{th}$ time and at the $(K-1)^{th}$ time to the user for selection.

Optionally, when the terminal device selects the focus tracking object but does not adjust the form of the small window, the terminal device may store the facial feature of the focus tracking object and data of the form that is set by default of the small window and establish a binding relationship. When the terminal device recognizes the focus tracking object again, the small window may be displayed in the form that is set by default.

This embodiment of this application provides a memory mechanism of the focus tracking object and the small window in the preview mode of the main character mode. When the terminal device recognizes a focus tracking object that has been selected, the terminal device may automatically invoke, according to a binding relationship, adjustment data of the small window when the focus tracking object is selected last time, so that the form of the small window is consistent with the form of the small window when the focus tracking object is selected last time, thereby reducing a time for adjusting the small window and improving the recording experience of the user.

To meet diversified requirements of the user, in the preview mode of the main character mode, the embodiments of this application may provide horizontal screen preview and vertical screen preview of the small window, and may further support switching between the horizontal screen preview and the vertical screen preview in the small window. The following describes a scenario in which the terminal device switches horizontal and vertical screens of the small window with reference to FIG. 7A, FIG. 7B, and FIG. 7C.

In a possible implementation, horizontal and vertical screen preview of the large window is related to the display screen of the terminal device. When the terminal device is horizontally placed, the large window may display a picture of the horizontal screen preview; and when the terminal device is vertically placed, the large window may display a picture of the vertical screen preview. Horizontal and vertical screen preview of the small window may be controlled by a horizontal and vertical screen switch button, where the horizontal and vertical screen switch button may be the first horizontal and vertical screen switch button 304 and/or the second horizontal and vertical screen switch button 305. When the terminal device detects a tap operation on the horizontal and vertical screen switch button, the small window may be switched from the horizontal screen preview to the vertical screen preview or switch the vertical screen preview to the horizontal screen preview.

In another possible implementation, horizontal and vertical screen preview of the large window and horizontal and vertical screen preview of the small window may be set in an associated manner, when the large window performs horizontal and vertical screen preview switching, the horizontal and vertical screen preview of the small window also changes. For example, both the large window and the small window are in horizontal screen preview, and when the large window is switched to the vertical screen preview, the small window is also switched to the vertical screen preview. The following describes three methods for switching horizontal and vertical screen preview of the small window with reference to the foregoing possible implementations by using an example in which the small window is switched from horizontal screen preview to vertical screen preview. The embodiments of this application may further provide a method for switching the small window from vertical screen preview to horizontal screen preview, methods and principles of the two cases are similar, and details are not described herein again.

Figure 7A:
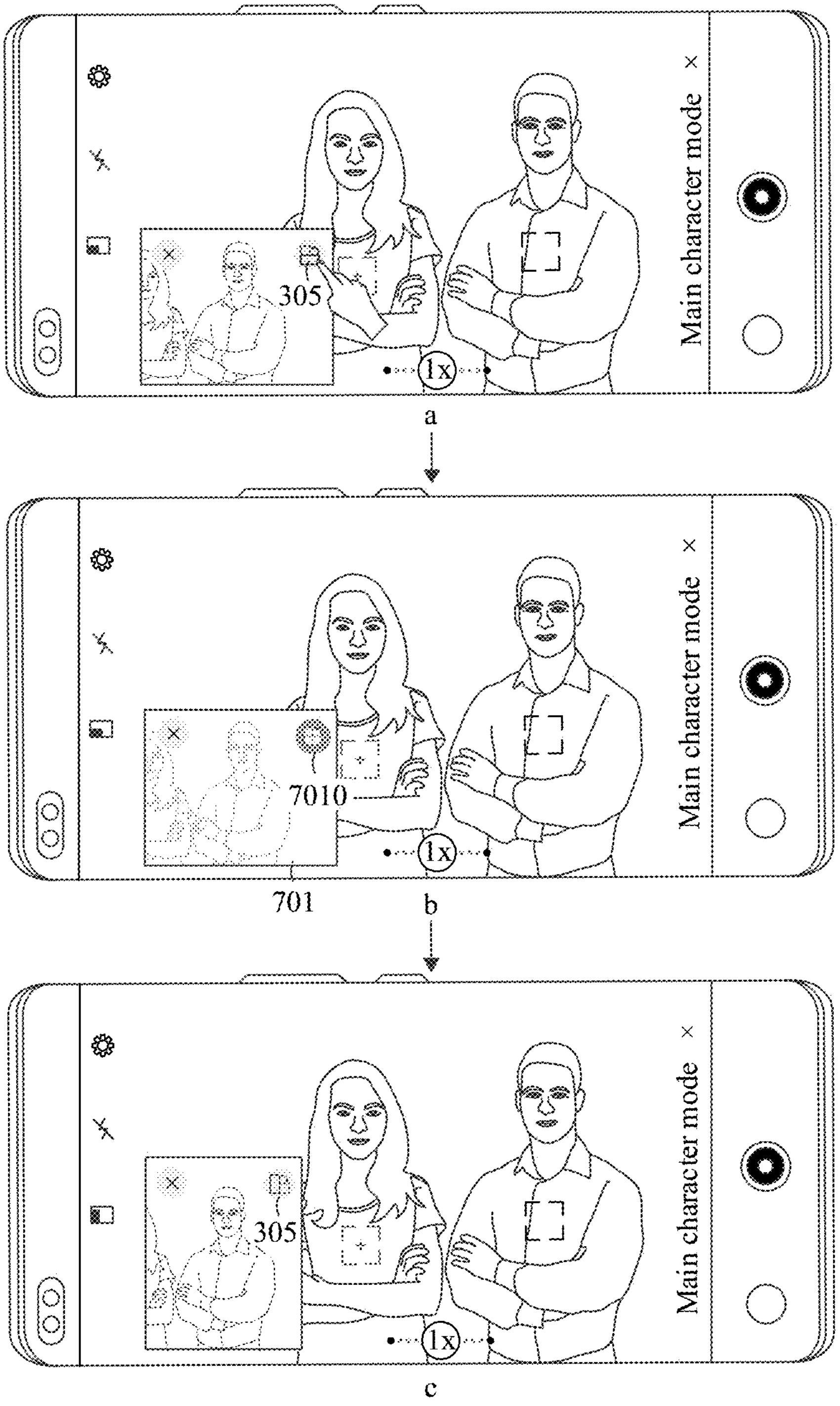
FIG. 7A is a schematic diagram of interfaces of switching horizontal and vertical screens of a small window according to an embodiment of this application.

It should be noted that, an icon of the second horizontal and vertical screen switch button 305 may include two forms, where the icon of the second horizontal and vertical screen switch button 305 may be in a form during horizontal screen preview as shown in an interface in FIG. 7A(a), which is represented in a form that a horizontal frame points to a vertical frame. It may be understood that, the small window is currently in horizontal screen preview, and after the second horizontal and vertical screen switch button 305 is tapped, the small window may be switched from the horizontal screen preview to vertical screen preview. The icon of the second horizontal and vertical screen switch button 305 may alternatively be in a form during vertical screen preview as shown in an interface in FIG. 7A(c), which is represented in a form that a vertical frame points to a horizontal frame. It may be understood that, the small window is currently in vertical screen preview, and after the second horizontal and vertical screen switch button 305 is tapped, the small window may switch the vertical screen preview to horizontal screen preview. A form of the icon of the second horizontal and vertical screen switch button is not limited in this application.

For example, the interface in FIG. 7A(a) displays a small window that is in horizontal screen preview, the small window includes the second horizontal and vertical screen switch button 305, and the second horizontal and vertical screen switch button 305 is in the form during horizontal screen preview. When the terminal device receives a tap operation on the second horizontal and vertical screen switch button 305, the terminal device enters the interface shown in FIG. 7A(c). In the interface in FIG. 7A(c), the small window is in vertical screen preview, and the icon of the second horizontal and vertical screen switch button 305 is changed correspondingly and changed to the form during vertical screen preview.

It may be understood that, horizontal and vertical screen switching of the small window does not affect the preview picture in the large window. For example, when the small window is switched from the horizontal screen preview to the vertical screen preview, horizontal and vertical screen preview in the large window does not change.

Optionally, to enhance the visual enjoyment of the small window during horizontal and vertical screen switching, the terminal device may set a dynamic special effect. For example, as shown in FIG. 7A(a), the user taps the second horizontal and vertical screen switch button 305 in the small window, and the terminal device enters an interface shown in FIG. 7A(b) in response to the operation. In the interface in FIG. 7A(b), the small window may display a dynamic special effect 701, where the dynamic special effect 701 is used for prompting the user that the small window is currently in a horizontal and vertical screen switching process. For example, the dynamic special effect may be processing such as blurring, focus softening, or mask adding performed by the terminal device on the preview picture in the small window. After the horizontal and vertical screen switching of the small window is completed, the terminal device enters the interface shown in FIG. 7A(c), and the dynamic special effect in the small window disappears. Due to the dynamic special effect, the preview picture in the small window during horizontal and vertical screen switching becomes smoother, and a problem that a character or a background is deformed or distorted in the switching process is reduced, thereby improving preview aesthetics of the small window.

It may be understood that, the terminal device may further generate, when detecting a tap operation in the small window, a highlighted icon 7010 at a position corresponding to the tap operation, to indicate that the user performs the tap operation in the small window, so as to indicate that the small window obtains a focus, as shown in in FIG. 7A(b). For example, when the terminal device receives that the size of the small window is adjusted by two fingers, the position of the small window is adjusted through a single tap and drag operation, and a region in the small window is tapped, the terminal device may generate the highlighted icon 7010. A generation scenario of the highlighted icon 7010 is not limited in the embodiments of this application.

The preview interface in the main character mode further includes the first horizontal and vertical screen switch button. An icon of the first horizontal and vertical screen switch button 304 may also include two forms, where the icon of the first horizontal and vertical screen switch button 304 may be in a form during horizontal screen preview as shown in an interface in FIG. 7B(a), which is represented in a form that a horizontally placed small rectangular frame is nested in a large rectangular frame. It may be understood as that the small window is currently in horizontal screen preview. The icon of the first horizontal and vertical screen switch button 304 may alternatively in a form during vertical screen preview as shown in an interface in FIG. 7B(c), which is represented in a form that a vertically placed small rectangular frame is nested in a large rectangular frame. It may be understood as that the small window is currently in vertical screen preview. It should be noted that, an example in which the terminal device is horizontally placed and the large window is in horizontal screen preview is used in this embodiment of this application. Therefore, in the icon of the first horizontal and vertical screen switch button 304, the large rectangle is horizontally placed. It may be understood that, when the terminal device is vertically placed, the large rectangle may be displayed in a vertically placed manner. A form of the icon of the first horizontal and vertical screen switch button is not limited in this application.

Figure 7B:
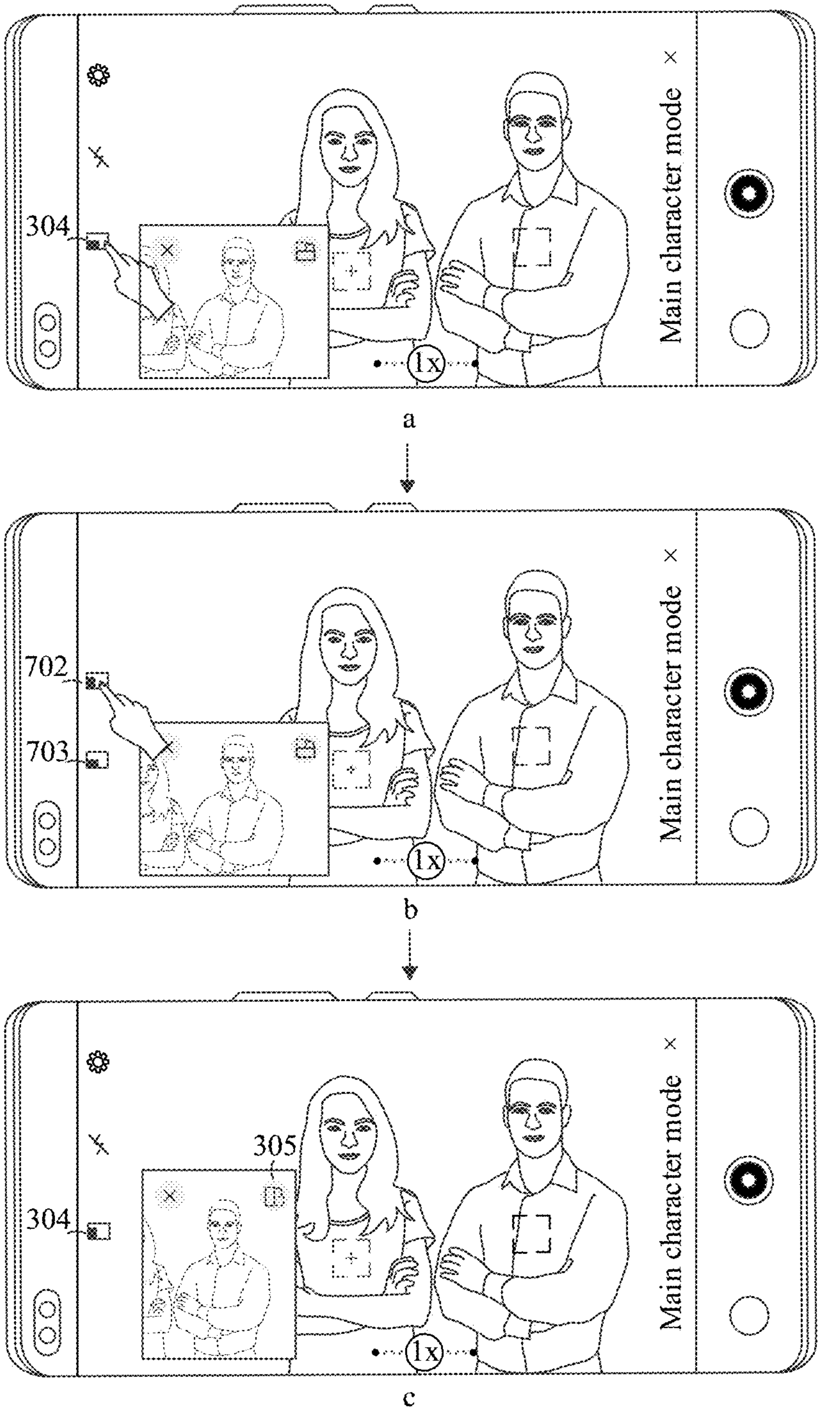
FIG. 7B is another schematic diagram of interfaces of switching horizontal and vertical screens of a small window according to an embodiment of this application.

For example, the interface in FIG. 7B(a) displays a small window that is in horizontal screen preview, and the large window of the terminal device includes the first horizontal and vertical screen switch button 304. When the terminal device receives a tap operation on the first horizontal and vertical screen switch button 304, the terminal device enters the interface shown in FIG. 7B(b). In the interface in FIG. 7B(b), the first horizontal and vertical screen switch button 304 is changed to an unfolded state, and the preview interface provides a horizontal screen display button 703 and a vertical screen display button 702. The horizontal screen display button 703 is used to indicate the terminal device to display the small window in horizontal screen preview, and the vertical screen display button 702 is used to indicate the terminal device to display the small window in vertical screen preview. When the terminal device receives a tap operation on the vertical screen display button 702, the terminal device enters the interface shown in FIG. 7B(c). In the interface in FIG. 7B(c), the small window is switched to vertical screen preview, and correspondingly, the icon of the first switch horizontal and vertical screen switch button 304 is displayed in the form during vertical screen preview.

Optionally, in a possible implementation, in the embodiments of this application, when horizontal and vertical screen switching of the small window is performed based on the first horizontal and vertical screen switch button, the terminal device may directly enter the interface shown in FIG. 7B(c) from the interface shown in FIG. 7B(b). In the horizontal and vertical screen switching process of the small window, no dynamic special effect is displayed in the small window. In another possible implementation, the terminal device may also set a dynamic special effect in the horizontal and vertical screen switching process of the small window. For details, reference may be made to the related description in FIG. 7A, and details are not described herein again.

It should be noted that, in the two methods for switching the horizontal and vertical screens of the small window, the second horizontal and vertical screen switch button 305 in the small window and the first horizontal and vertical screen switch button 304 in the large window may be set in an associated manner. For example, when the small window is switched to vertical screen preview, the icon of the first horizontal and vertical screen switch button 304 is in the form during vertical screen preview, and the icon of the second horizontal and vertical screen switch button 305 is also in the form during vertical screen preview, as shown in the interface in FIG. 7B(c).

Optionally, in the preview mode of the main character mode, an embodiment of this application further provides a scenario of adjusting horizontal and vertical screens of a small window when the small window is not displayed. For example, in an interface in FIG. 7C(a), when the terminal device enters the main character mode or closes small window preview, the preview interface may not include the small window. In this case, the icon of the first horizontal and vertical screen switch button 304 is displayed in the form during horizontal screen preview, and if the terminal device receives a tap operation on the tracking frame of the focus tracking object, the terminal device may start the small window for horizontal screen preview. If the terminal device receives a tap operation on the first horizontal and vertical screen switch button 304, the terminal device may enter an interface shown in FIG. 7C(b). In the interface in FIG. 7C(b), the first horizontal and vertical screen switch button 304 is unfolded to the horizontal screen display button 703 and the vertical screen display button 702. When the terminal device receives a tap operation on the vertical screen display button 702, the terminal device enters an interface shown in FIG. 7C(c). In the interface in FIG. 7C(c), the icon of the first horizontal and vertical screen switch button 304 is in the form during vertical screen preview. When the user taps the tracking frame 311 of the focus tracking object, the terminal device enters an interface shown in FIG. 7C(d) in response to the tap operation. In the interface in FIG. 7C(d), the small window displays a preview picture in a vertical screen, the first horizontal and vertical screen switch button 304 is displayed in the form during vertical screen preview, and the second horizontal and vertical screen switch button 305 is also switched to the form during vertical screen preview in an associated manner.

Optionally, when the terminal device enters the main character mode for the first time or closes small window preview, the preview interface does not include the small window. If the terminal device does not recognize a focus trackable object, there is no character in the preview picture, and the first horizontal and vertical screen switch button may be hidden. When the terminal device recognizes a focus trackable object and marks a tracking frame, the first horizontal and vertical screen switch button may be displayed.

Figure 7C:
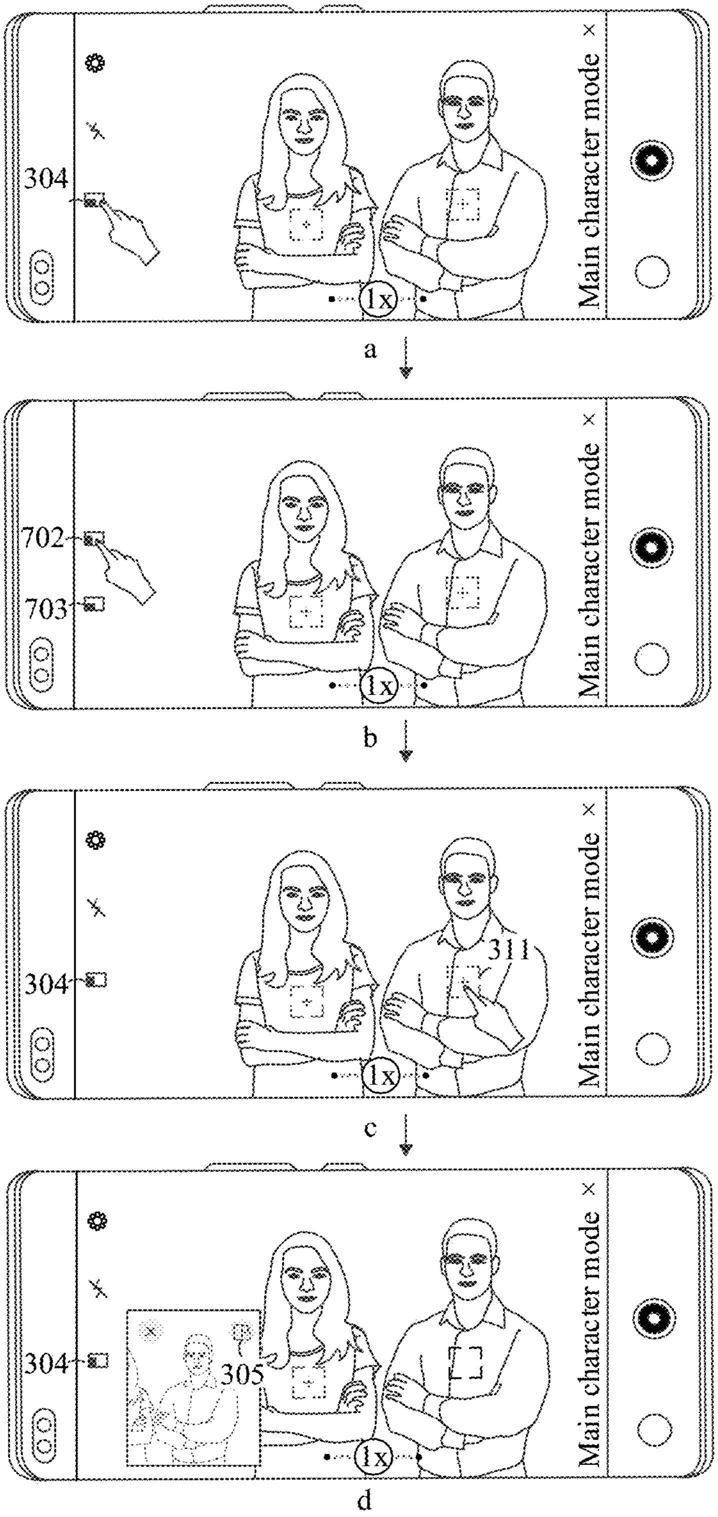
FIG. 7C is still another schematic diagram of interfaces of switching horizontal and vertical screens of a small window according to an embodiment of this application.

Optionally, in the interface shown in FIG. 7C(d), the terminal device may perform a process of switching from vertical screen preview to horizontal screen preview based on the first horizontal and vertical screen switch button 304 and the second horizontal and vertical screen switch button 305. This scenario is similar to the scenarios shown in FIG. 7A and FIG. 7B, and details are not described herein again.

Figure 7D:
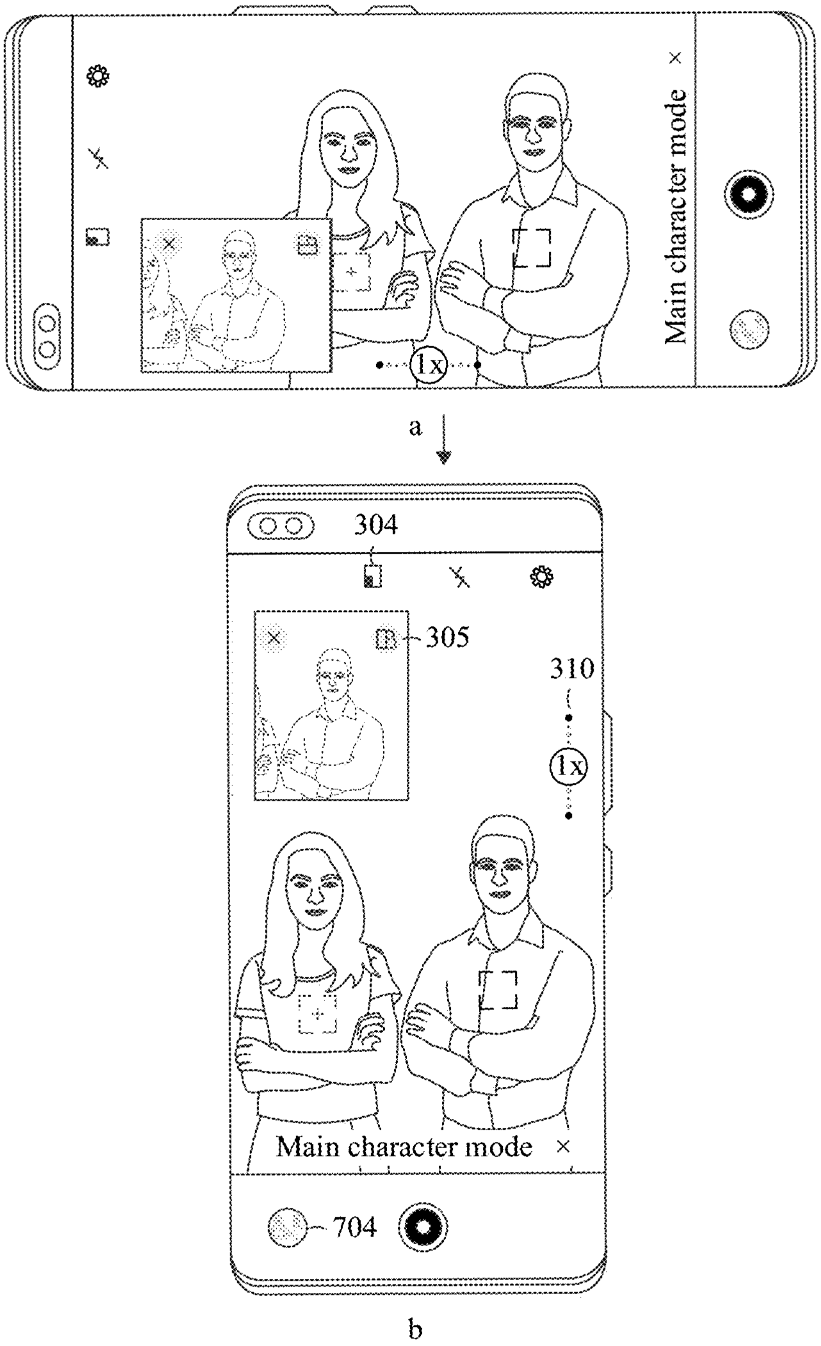
FIG. 7D is still another schematic diagram of interfaces of switching horizontal and vertical screens of a small window according to an embodiment of this application.

An embodiment of this application further provides a scenario in which horizontal and vertical screen switching is performed in a large window and a small window in an associated manner. As shown in FIG. 7D:

For example, the terminal device is horizontally placed, and the preview interface of the terminal device may be shown in FIG. 7D(a), where the large window is in a horizontal screen preview state, and the small window is also in a horizontal screen preview state. When the terminal device detects that the terminal device is vertically placed, the large window in the terminal device is switched to a vertical screen preview state, and the small window is also switched to vertical screen preview, as shown in FIG. 7D(b).

For example, the terminal device is horizontally placed, in the preview interface of the terminal device, the large window is in a horizontal screen preview state, and in this case, the small window may alternatively in a vertical screen preview state. When the terminal device detects that the terminal device is vertically placed, the large window in the terminal device is switched to a vertical screen preview state, and the small window is switched to horizontal screen preview.

In this embodiment of this application, when the terminal device switches from a vertically placed state to a horizontally placed state, changes of horizontal and vertical screen states of the large window and the small window may be a reverse process of the foregoing embodiment, and details are not described herein again.

It may be understood that, when the display screen of the terminal device is switched from a horizontally placed state to a vertically placed state, the large window is switched from a horizontal screen to a vertical screen, the small window is not changed relative to the large window, and the preview picture in the small window is still a cropped picture at a corresponding position in the large window. However, the small window is switched from a horizontal screen to a vertical screen due to a change of a placement state of the terminal device, and the icons of the first horizontal and vertical screen switch button and the second horizontal and vertical screen switch button are also switched to the forms during vertical screen preview.

When the terminal device performs horizontal and vertical screen switching, the terminal device may detect an acceleration sensor, to obtain acceleration values in directions X, Y, and Z. The terminal device obtains a rotation angle through calculation based on the acceleration values, to determine a horizontal and vertical screen state of the terminal device. When the terminal device detects that the terminal device rotates, horizontal and vertical screen switching is performed in the large window, and positions and states of some icons may also change correspondingly. For example, in the interface in FIG. 7D(b), the large window is switched from a horizontal screen to a vertical screen, and an icon of the zoom button 310, a button in the large window, a button in the small window, and content displayed by a preview frame 704 that has recorded a video may rotate correspondingly and be changed to forms during vertical screen preview.

In a possible implementation, in a process that the terminal device rotates a screen, the small window rotates correspondingly, but a function button in the small window may not rotate along with the rotation. For example, no matter the small window is in horizontal screen preview or vertical screen preview, the second horizontal and vertical screen switch button 305 is always located at an upper right corner of the small window, as shown in FIG. 7D(a) and FIG. 7D(b).

In another possible implementation, in a process that the terminal device rotates a screen, the small window rotates correspondingly, and a function button in the small window also rotates correspondingly. For example, when the small window is in horizontal screen preview, the second horizontal and vertical screen switch button is located at an upper right corner of the small window, and when the terminal device rotates clockwise by 90 degrees (or around 90 degrees), the small window is changed to vertical screen preview, and the second horizontal and vertical screen switch button is located at a lower right corner of the small window.

The foregoing embodiments are application scenarios in which the user normally uses the main character mode for preview, and in some embodiments, the terminal device may not recognize the focus tracking object in the preview mode. The following describes several scenarios in which the large window loses the focus tracking object in the preview mode of the main character mode with reference to FIG. 8A, FIG. 8B, and FIG. 8C.

Figure 8A:
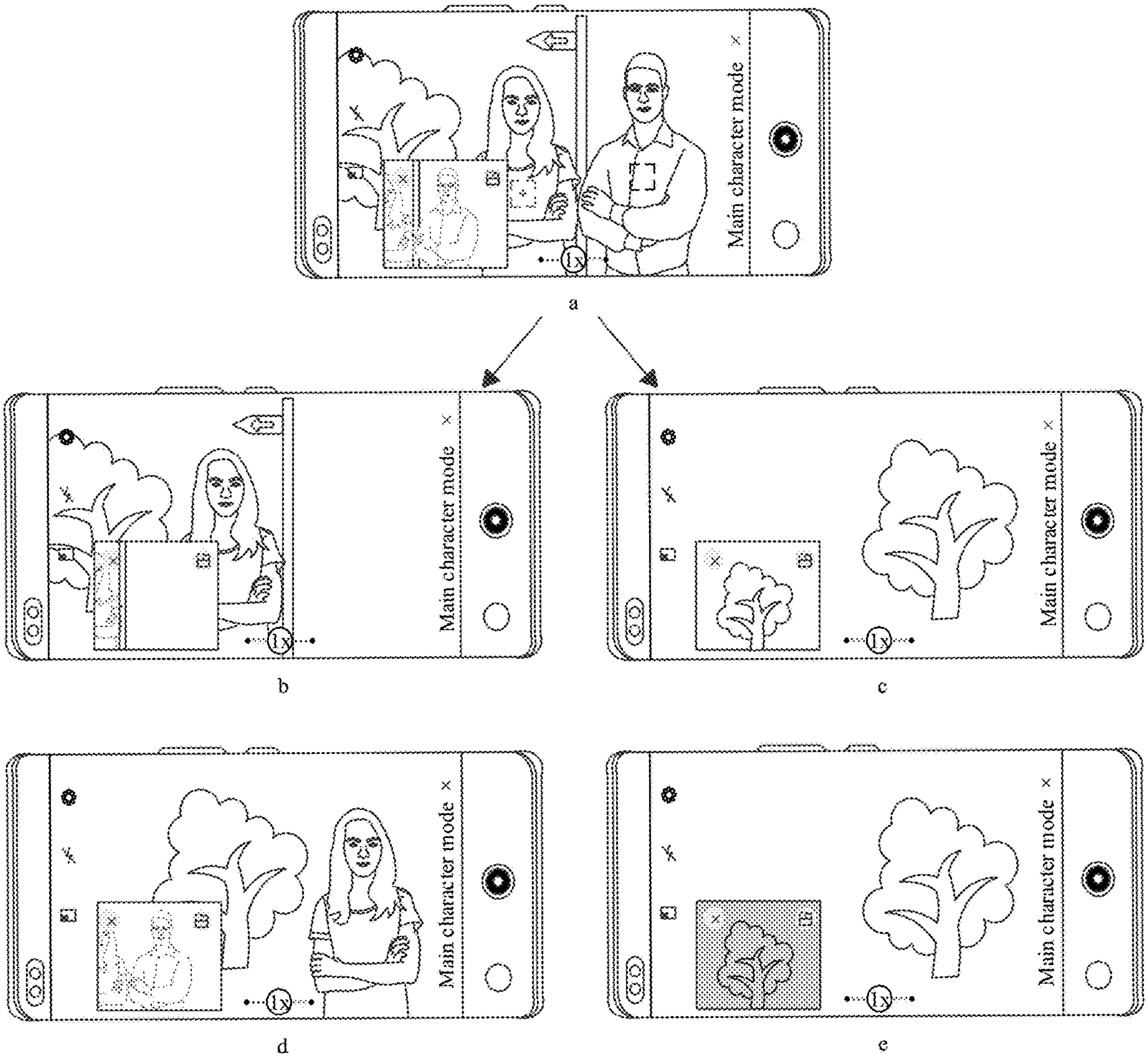
FIG. 8A is a schematic diagram of interfaces in which a large window loses a first object according to an embodiment of this application.
Figure 8B:
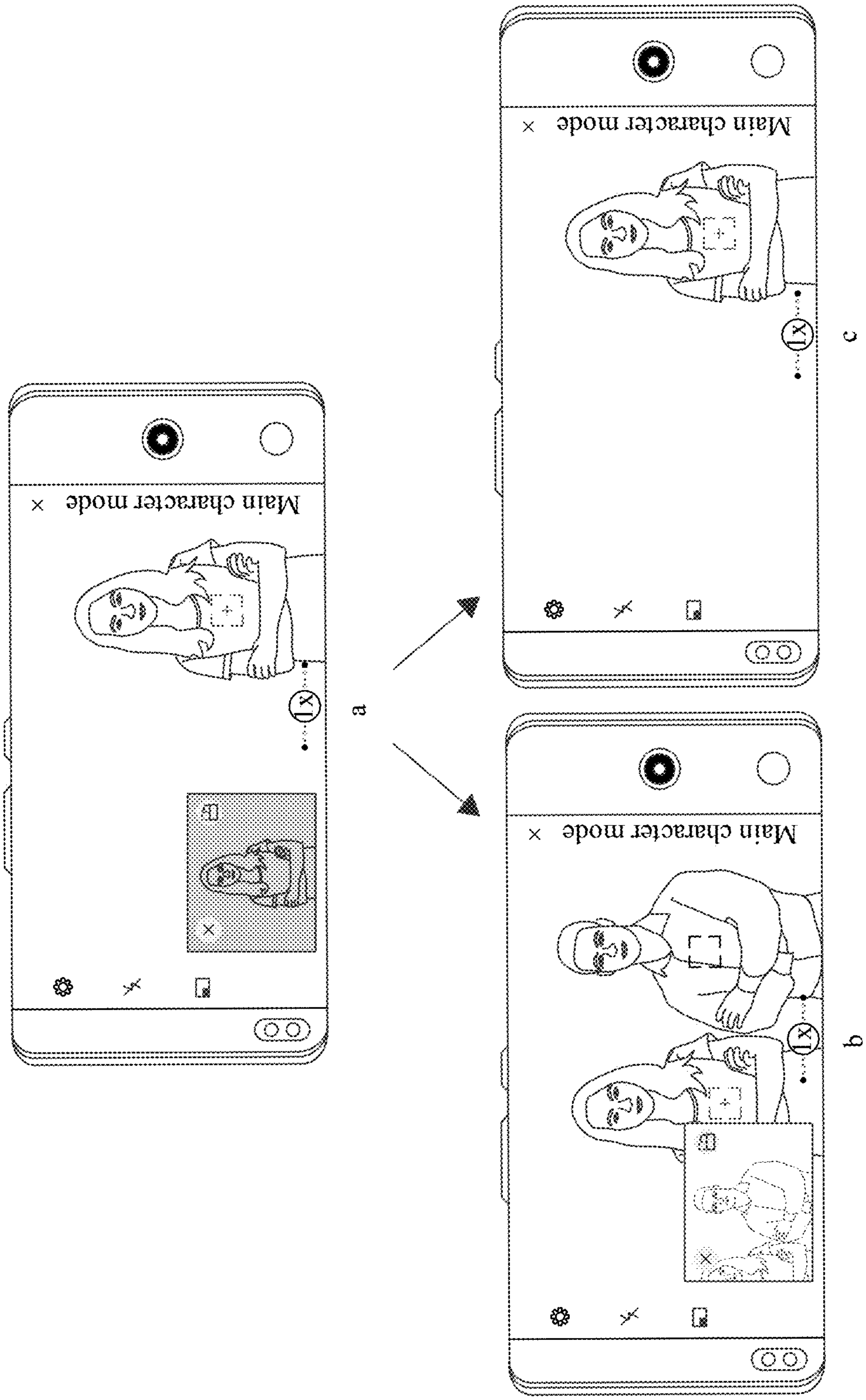
FIG. 8B is a schematic diagram of interfaces in which a large window loses a first object according to an embodiment of this application.

For example, FIG. 8A is a schematic diagram of interfaces that may be displayed in a small window when a terminal device cannot detect a focus tracking object in a preview mode of a main character mode according to an embodiment of this application.

In a possible implementation, a position of a camera of the terminal device does not change, and the focus tracking object moves out of a range that may be photographed by the camera. As a result, the focus tracking object is lost in the large window. In this case, as shown in FIG. 8A(a) and FIG. 8A(b), in the interface in FIG. 8A(a), a preview picture in the large window may include a male character, a female character, and backgrounds such as a road sign and a tree, the male character leaves an original position in this case, and the terminal device cannot recognize the focus tracking object. The terminal device enters an interface shown in FIG. 8A(b), in the interface in FIG. 8A(b), a picture in the small window may be a cropped picture of a current picture in the large window. For example, in a case that the camera of the terminal device does not move, in the preview picture in the large window, the male character (that is, the focus tracking object) disappears, and the female character and the backgrounds such as the tree and the road sign do not change. In a case that the camera of the terminal device does not move, a preview picture in the small window may display a preview picture of a background in which the focus tracking object is located before the focus tracking object is lost.

In another possible implementation, the characters do not move, and the camera of the terminal device deviates from the focus tracking object. As a result, the focus tracking object is lost in the large window. In this case, as shown in FIG. 8A(a) and FIG. 8A(c), comparing an interface in FIG. 8A(c) with the interface in FIG. 8A(a), it may be found that the camera of the terminal device deviates leftward, the tree in the preview picture in the large window moves from a left side to a right side, the characters move out of the range that may be photographed, and the focus tracking object is lost. It may be understood that, before the focus tracking object is lost, the small window displays a picture of the focus tracking object at a corresponding position in the large window (a focus tracking position is located on a right side of the preview picture in the large window, and the small window displays a picture at the position); and after the focus tracking object is lost, the small window still displays a picture at the corresponding position in the picture in the large window (the focus tracking position is still located on the right side of the preview picture in the large window, and the small window displays a picture at the position). For example, before the focus tracking object is lost, as shown in FIG. 8A(a), the small window displays a picture of the male character on the right side in the large window. After the focus tracking object is lost, as shown in FIG. 8A(c), a picture at the position of the male character is the tree in this case, and the small window of the terminal device displays a preview picture of the tree.

It may be understood that, in the foregoing two scenarios in which the focus tracking object in the large window is lost due to movement of the character or movement of the camera of the terminal device, when a focus tracking object is selected in the large window of the terminal device, the small window may display a picture of the focus tracking object; before the focus tracking object is lost, a picture displayed in the small window corresponds to a picture displayed in the large window; and after the focus tracking object is lost, a picture displayed in the small window still corresponds to a picture displayed in the large window, and corresponding positions remain consistent before the focus tracking object is lost. In this case, the large window is in a dynamic preview state, and the small window also dynamically displays a picture at a corresponding position in the large window.

In still another possible implementation, the terminal device switches a horizontal and vertical screen state of the small window in the preview mode. An example in which the small window is switched from horizontal screen preview to vertical screen preview is used, when the terminal device switches from a horizontal screen to a vertical screen, original data used for cropping the small window in a horizontal screen preview mode may be lost or data of the horizontal screen preview and data of the vertical screen preview do not match. As a result, the small window cannot obtain the focus tracking position in the large window after the switching, and further, the focus tracking object is lost in the small window. This scenario is subsequently described in detail with reference to FIG. 9A and FIG. 9B, and details are not described herein again.

In still another possible implementation, in the preview mode of the main character mode, after the focus tracking object is lost, the small window of the terminal device may display a static image of one last frame of picture before the focus tracking object is lost. For example, as shown in FIG. 8A(d), the focus tracking object is lost in a picture in the large window, the terminal device can only reserve one last frame of picture of the male character, and the small window may not dynamically track a preview picture in the large window but display a static image of the last frame of picture.

In still another possible implementation, after the focus tracking object is lost in the preview mode of the main character mode, the small window may display interfaces shown in FIG. 8A(b), FIG. 8A(c), and FIG. 8A(d). An example in which the small window displays the interface in FIG. 8A(c) is used, after the terminal device loses the focus tracking object, the terminal device enters an interface shown in FIG. 8A(e). In the interface in FIG. 8A(e), the terminal device adds a mask for the small window. For example, the mask may be a grayscale layer floated above a preview picture in the small window, and brightness of the small window in a mask state is lower than that of the large window, which may remind the user that preview in the small window is currently abnormal.

It may be understood that, when the terminal device loses the focus tracking object, a picture presented in the small window may be any interface shown in FIG. 8A(b), FIG. 8A(c), and FIG. 8A(d), or may be a combination of any interface shown in FIG. 8A(b), FIG. 8A(c), and FIG. 8A(d) and a mask state, which is not limited in the embodiments of this application.

The embodiments of this application provide several implementations of a display interface of the small window after the focus tracking object is lost in the preview mode of the main character mode. It may be understood that, the small window may also include other implementations of the display interface, and the implementations are not listed herein. The following describes a processing process of the terminal device after the focus tracking object is lost in the large window in the preview by using one of the foregoing implementation as an example, and the male character may be selected as the focus tracking object in the following scenarios.

Scenario one: For example, in an interface shown in FIG. 8B(a), when the male character in the large window is used as the focus tracking object and lost, the large window and the small window do not display the male character, and the small window is in a mask state. Within a specific time, the small window of the terminal device may keep displaying a preview picture, and for example, the time may be 5 s. If the terminal device re-recognize the male character within 5 s, the terminal device enters an interface shown in FIG. 8B(b), the small window may automatically perform focus tracking on the male character and restore a preview picture of the male character, and the terminal device cancels the mask state of the small window. If the terminal device does not recognize the male character within 5 s, the terminal device enters an interface in FIG. 8B(c) from the interface in FIG. 8B(a). In the interface in FIG. 8B(c), the small window is closed, and the terminal device keeps a preview picture in the large window.

Scenario two: For example, after the terminal device loses the male character (that is, the focus tracking object) in the large window, if the male character is not recognized with 5 s, the terminal device enters an interface in FIG. 8C(a), and the small window is closed in the interface in FIG. 8C(a). If the terminal device re-recognizes the male character, namely, the focus tracking object when the small window is closed, the terminal device enters an interface shown in FIG. 8C(c). In the interface in FIG. 8C(c), the small window re-displays a preview picture of the focus tracking object.

Figure 8C:
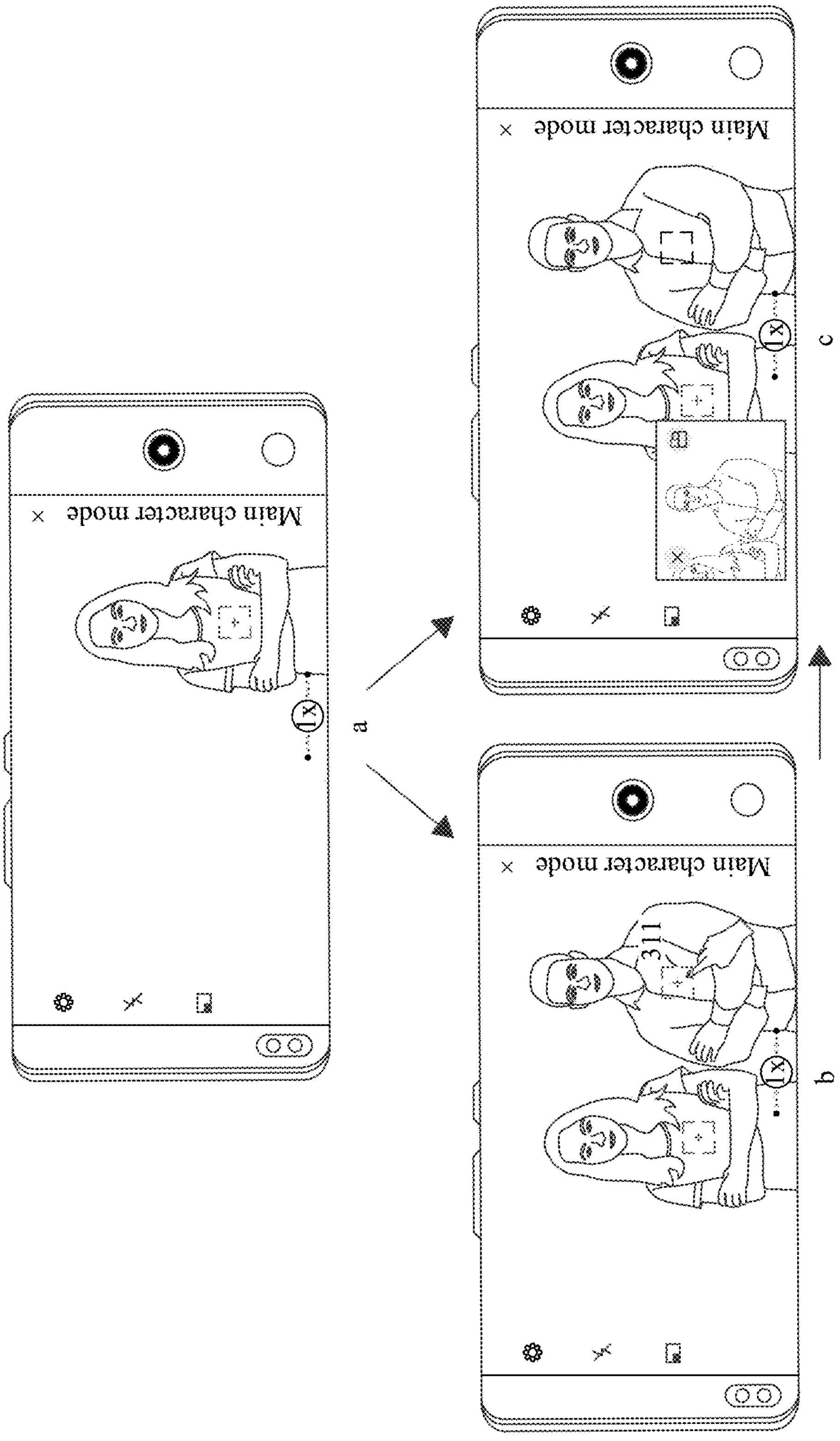
FIG. 8C is a schematic diagram of interfaces in which a large window loses a first object according to an embodiment of this application.

In an implementation of entering the interface in FIG. 8C(c) from the interface in FIG. 8C(a), the terminal device recognizes a plurality of focus trackable objects when the small window is not started (the focus trackable objects may include the focus tracking object that has not been lost or may not include the focus tracking object that has not been lost), and a preview picture in the large window may include the plurality of focus trackable objects and corresponding tracking frames, as shown in FIG. 8C(b). When the terminal device detects an operation that the user taps the tracking frame 311, the terminal device enters the interface shown in FIG. 8C(c). In the interface in FIG. 8C(c), the small window may perform focus tracking on the focus tracking object selected by the user. In this process, the user may re-tap the tracking frame to select the focus tracking object or replace the focus tracking object.

In another implementation, when the terminal device recognizes the focus tracking object that has not been lost, the small window may be automatically restored and display the focus tracking object. For example, as shown in FIG. 8C(a) to FIG. 8C(c), the terminal device recognizes a plurality of focus trackable objects within a period of time after the small window is closed, where the terminal device may determine, based on a face recognition technology, whether the focus tracking object that has not been lost is included in the plurality of current focus trackable objects. If the focus tracking object that has not been lost is included, the small window may automatically preview the focus tracking object in a focus tracking manner. If the focus tracking object that has not been lost is not included, the terminal device may perform the foregoing method of tapping a tracking frame to re-select a focus tracking object.

In the preview mode of the main character mode, the focus tracking object in the large window is lost, and if the terminal device detects, within 5 seconds after the focus tracking object is lost, an operation that the user taps to start recording, the large window starts recording a video without the focus tracking object. The small window does not include the focus tracking object, so that the video of the large window cannot be cropped based on the focus tracking object, and a focus tracking video cannot be generated. In this case, the small window may perform a method shown in FIG. 8D.

Scenario three: For example, in an interface in FIG. 8D(a), the male character in the large window is lost and a time that the male character is lost does not exceed 5 s. In this case, the small window is presented in a mask state, and the male character in the small window also does not exist. The user taps the recording start button 303 in the large window, and the terminal device enters an interface shown in FIG. 8D(b) in response to the operation. In the interface in FIG. 8D(b), the large window of the terminal device starts recording a video, and a recording picture in the large window displays a recording time. For example, the recording time during recording may include but not limited to a form of a combination of a dot and a time. The small window displays a preview picture in a mask state. It may be understood that, the small window in the mask state may still dynamically display a picture at a corresponding position in the large window, but the small window is only in a preview mode, so that the picture cannot be recorded and the video cannot be stored.

Figure 8D:
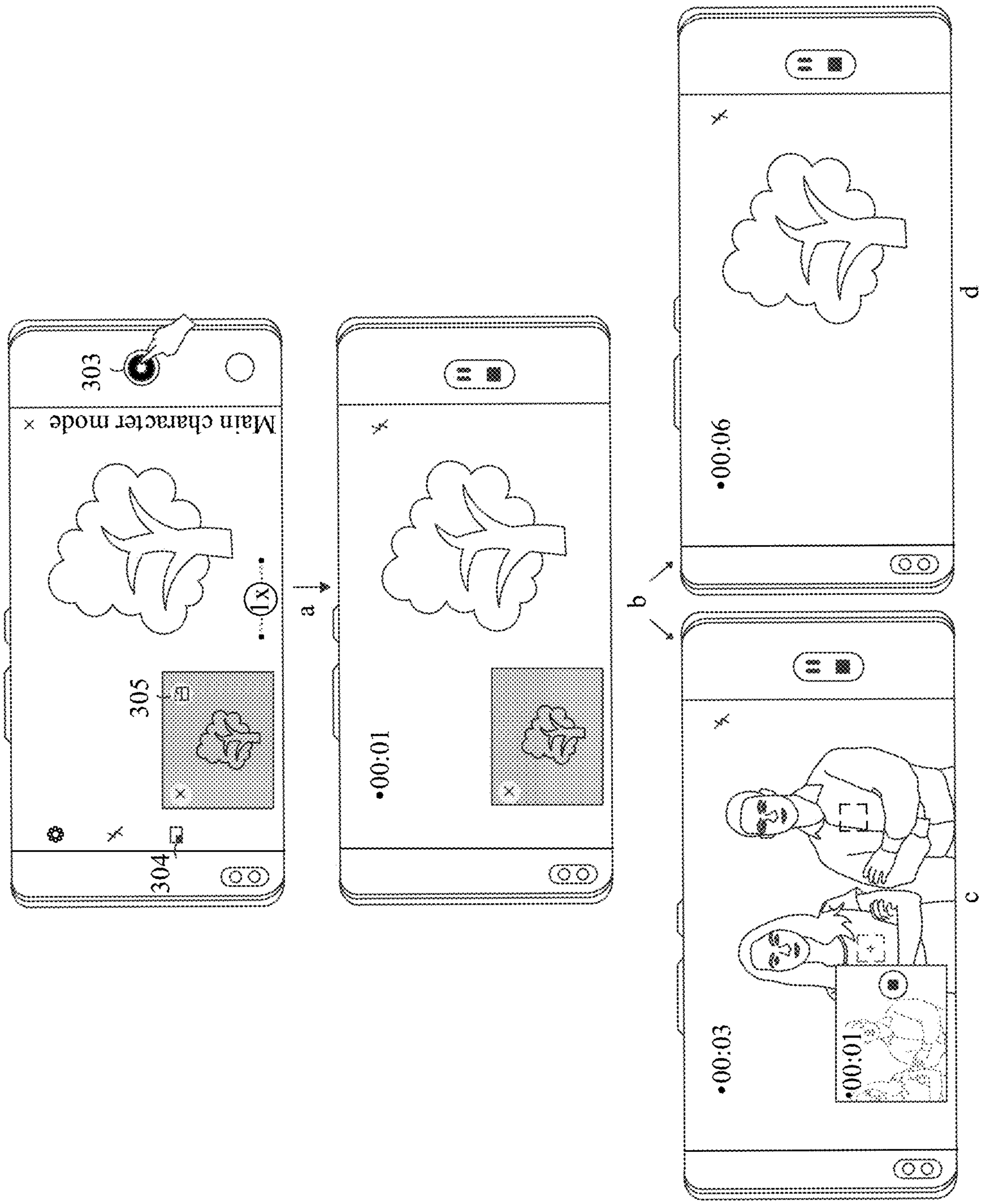
FIG. 8D is a schematic diagram of interfaces in which a large window loses a first object according to an embodiment of this application.

Optionally, in some embodiments, when switching is performed from the interface in FIG. 8D(a) to the interface in FIG. 8D(b), icons of the first horizontal and vertical screen switch button 304 and the second horizontal and vertical screen switch button 305 may be displayed. In some embodiments, after the large window starts recording, the horizontal and vertical screen switch buttons may be hidden, as shown in FIG. 8D(b).

When the small window is in the mask state, if the terminal device recognizes the focus tracking object within 5 s after the large window starts recording, the small window may remove the mask state and start recording; and otherwise, the small window is closed. It may be understood as that, the mask state of the small window may keep for 5 s, and if the terminal device retrieves the focus tracking object within 5 s, the small window starts recording a focus tracking video for the focus tracking object. If the terminal device does not retrieve the focus tracking object within 5 s, the small window disappears.

For example, in the interface in FIG. 8D(b), the large window does not include the focus tracking object and is recording a video, and the small window does not include the focus tracking object and is in the mask state. The terminal device recognizes the male character at the third second after the large window starts recording, and the terminal device enters an interface in FIG. 8D(c). In the interface in FIG. 8D(c), the mask state of the small window disappears, and the small window automatically starts recording for the focus tracking object. In this case, the recording time (3*s*) in the large window is in consistent with a recording time (is) in the small window, and a recording time difference may be a time difference between the terminal device detecting that the user taps the recording button and re-recognizing the focus tracking object.

In another example, in the interface in FIG. 8D(b), the large window does not include the focus tracking object and is recording a video, and the small window does not include the focus tracking object and is in the mask state. If the terminal device does not re-recognize the focus tracking object within 5 s after the focus tracking object is lost, the terminal device enters an interface in FIG. 8D(d). In the interface in FIG. 8D(d), the small window is closed, and the terminal device only reserves the recording picture in the large window.

The foregoing scenario may be understood as that, after the focus tracking object is lost, the small window is presented in a mask state, and the mask state may keep for 5 s. If a time that the focus tracking object is retrieved after the focus tracking object is lost is within 5 s, the small window automatically starts recording the focus tracking object. If the time that the focus tracking object is retrieved after the focus tracking object is lost exceeds 5 s or the focus tracking object is not retrieved, the small window is closed.

It may be understood that, when the large window starts recording and the small window is closed since the focus tracking object is lost for more than 5 s, if the terminal device re-recognizes the focus tracking object, the user may re-select a focus tracking object based on tracking frames of focus trackable objects. After the terminal device responds to the operation, the small window automatically appears and starts recording. This scenario is similar to a scenario shown in FIG. 10B, and details are not described herein.

In the preview mode of the main character mode, the terminal device may lose the focus tracking object in the large window due to human factors such as movement of the camera or movement of the character. The terminal device may also lose the focus tracking object due to data loss or data mismatch in the small window during horizontal and vertical screen switching of the small window. An embodiment of this application provides a processing method for a lost focus tracking object caused by horizontal and vertical screen switching.

Figure 9A:
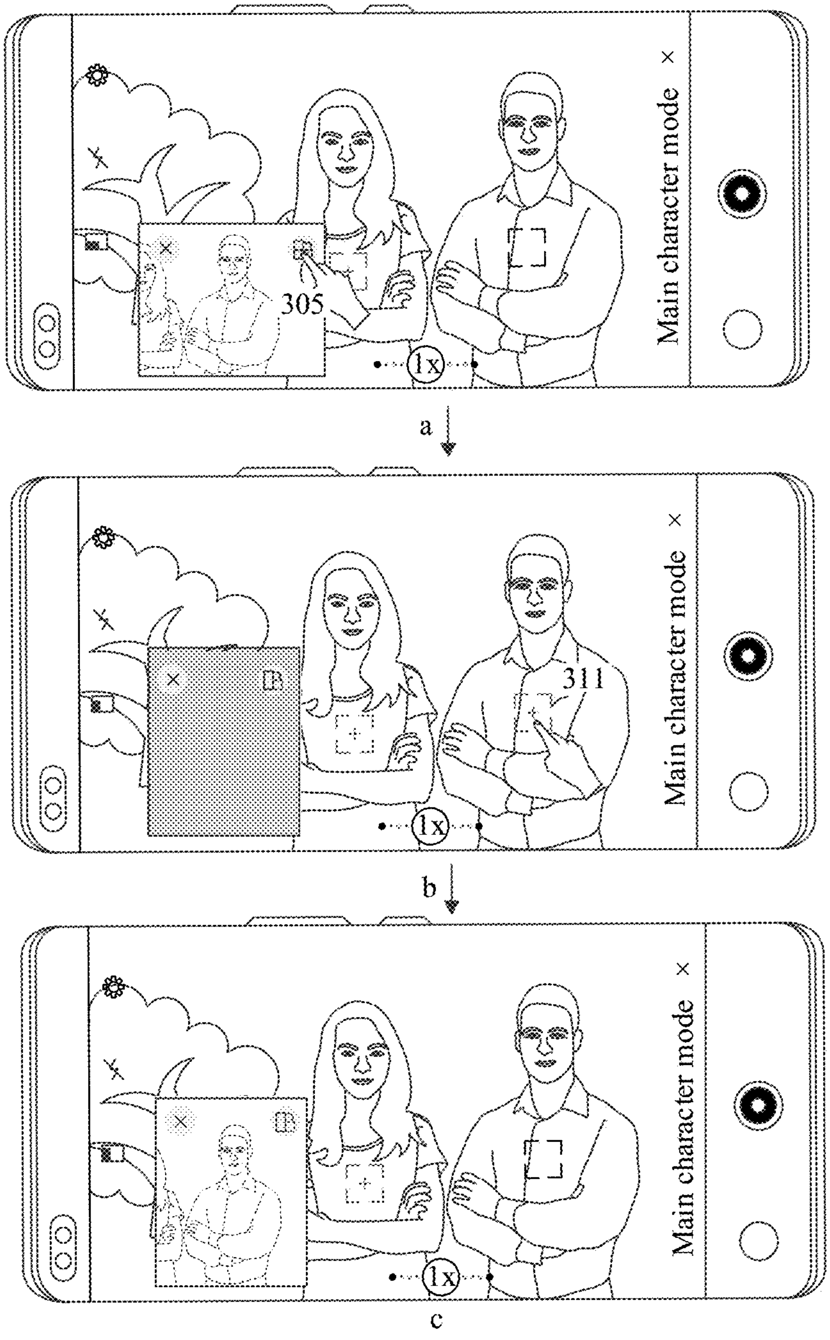
FIG. 9A is a schematic diagram of interfaces in which a small window loses a first object during horizontal and vertical screen switching of the small window according to an embodiment of this application.
Figure 9B:
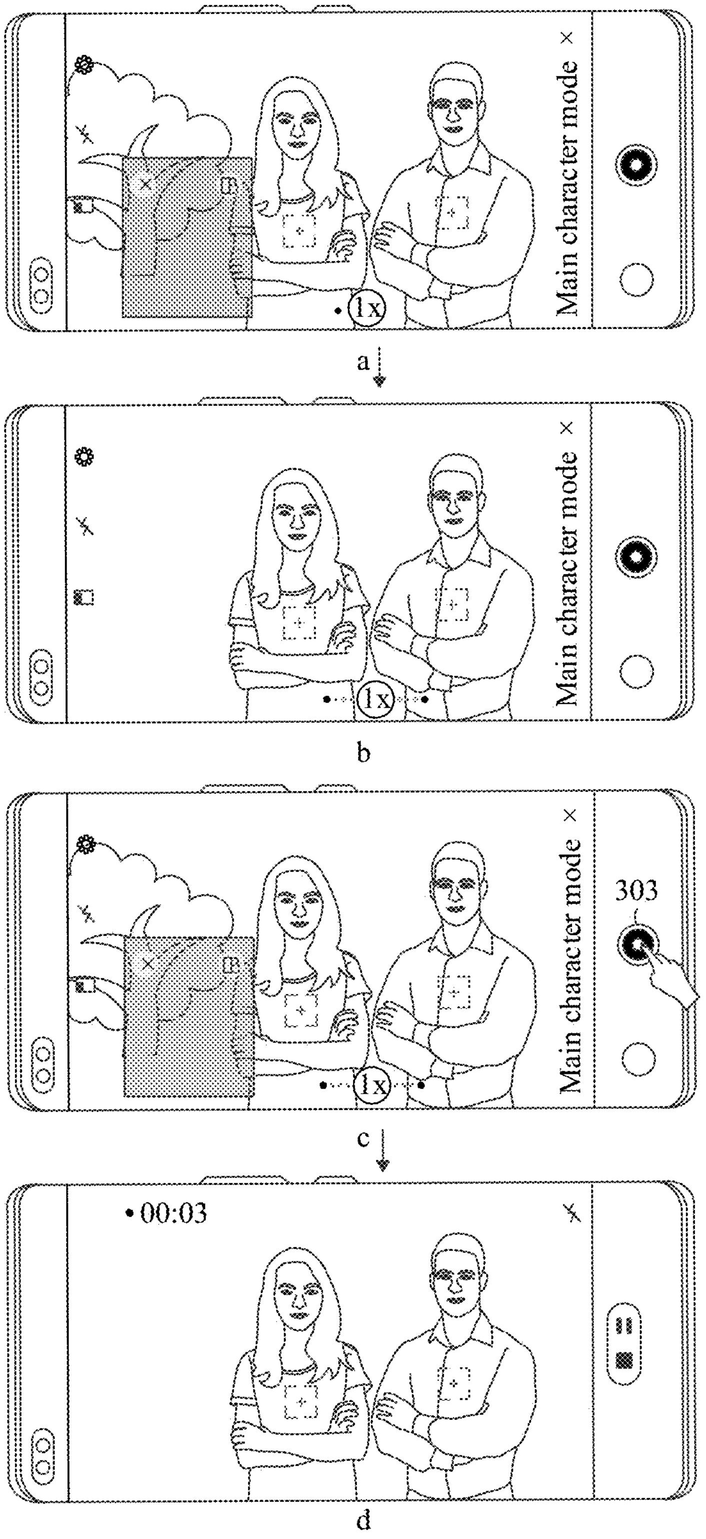
FIG. 9B is a schematic diagram of interfaces in which a small window loses a first object during horizontal and vertical screen switching of the small window according to an embodiment of this application.

For example, for a scenario in which the focus tracking object is lost due to horizontal and vertical screen switching of the small window, the embodiments of this application provide processing methods shown in FIG. 9A and FIG. 9B.

In an interface in FIG. 9A(a), the small window is in a horizontal screen preview state, and the small window includes the focus tracking object. When the terminal device receives a tap operation on a horizontal and vertical screen switch button (for example, in the interface in FIG. 9A(a), the user taps the second horizontal and vertical screen switch button 305), the terminal device may enter an interface shown in FIG. 9A(b). The terminal device loses the focus tracking object in the small window due to horizontal and vertical screen switching of the small window, in an interface in FIG. 9A(b), a preview picture in the small window does not include the focus tracking object and is in a mask state, and the tracking frame 311 is restored to the unselected form. It may be understood that, since data in the small window is lost or inapplicable, the small window cannot accurately track the focus tracking position. However, the small window is still in a preview state, and may display a cropped picture at any position in the large window in real time. For example, in the interface in FIG. 9A(b), the focus tracking position of the small window is changed from a position at which the original male character is located to a position at which the tree is located. When the terminal device receives an operation that the user taps the tracking frame 311, the terminal device enters an interface in FIG. 9A(c). The terminal device re-selects a focus tracking object, and in the interface in FIG. 9A(c), the focus tracking object appears in a preview picture in the small window. The focus tracking object selected by the terminal device may be the focus tracking object that has not been lost or may be another object, which is not limited herein.

Optionally, when the terminal device re-detects the focus tracking object, the small window may restore to track the focus tracking object. For example, when the small window of the terminal device is switched from a horizontal screen to a vertical screen, the focus tracking object in the small window may be lost. When the terminal device re-recognizes the focus tracking object that has not been lost, the small window automatically displays the focus tracking object and the mask state disappears. For example, before the horizontal and vertical screen switching of the small window of the terminal device, the focus tracking object is the male character, as shown in FIG. 9A(a); during the horizontal and vertical screen switching of the small window, the male character disappears and the small window is presented in a mask state, as shown in FIG. 9A(b); and after the switching of the small window is completed, the terminal device re-recognizes the male character, and the small window automatically restores to track the male character, as shown in FIG. 9A(c).

It may be understood that, when the small window is performing horizontal and vertical screen switching, the terminal device needs to re-calculate a cropped position of the small window relative to the large window. The terminal device may re-obtains data of a focus tracking position when receiving a tap operation of the user on the focus tracking object, and crop a picture at the focus tracking position. In this way, a scenario that the focus tracking object is lost during horizontal and vertical screen switching of the small window may be reduced.

Optionally, when the small window loses the focus tracking object due to horizontal and vertical screen switching, the preview picture in the small window does not include the focus tracking object and is in a mask state, as shown in FIG. 9B(a). After a period of time (for example, 5 s after the focus tracking object is lost), if the terminal device does not receive a tap operation of the user on the tracking frame, the terminal device may enter an interface shown in FIG. 9B(b). In the interface in FIG. 9B(b), a preview picture in the large window is included, and the small window is closed.

Optionally, when the small window loses the focus tracking object due to horizontal and vertical screen switching, the preview picture in the small window does not include the focus tracking object, as shown in FIG. 9B(c). In a period of time that the small window loses the focus tracking object (for example, within 5 s after the focus tracking object is lost), the terminal device detects a tap operation on the recording start button 303 in the large window, and the terminal device may enter an interface in FIG. 9B(d). In the interface in FIG. 9B(d), a recording picture and a recording time in the large window are displayed, and the small window disappears. Subsequently, the terminal device may also receive a tap operation on the tracking frame and start recording in the small window, and details are not described herein.

The embodiments of this application provide several scenarios in which the focus tracking object is lost in the preview mode of the main character mode. Based on the methods in the foregoing embodiments, the terminal device may select a corresponding processing method in a case that the focus tracking object is lost, thereby improving the flexibility and accuracy of performing recording by the terminal device by using the main character mode, and further improving the recording experience of the user.

The foregoing embodiments describe the preview mode of the main character mode, and the following describes the recording mode of the main character mode with reference to the accompanying drawings. In the recording mode of the main character mode, the terminal device may start the small window to record a video for the focus tracking object and store the video.

For example, a scenario in which the terminal device starts the small window for recording is first described with reference to FIG. 10A, FIG. 10B, and FIG. 10C.

In a scenario of starting the small window for recording, recording of videos in the large window and the small window may be started simultaneously. In an interface in FIG. 10A(a), a preview picture in the large window includes the focus tracking object (for example, the male character), and the small window displays a preview picture of the focus tracking object. When the terminal device detects a tap operation on the recording start button 303 in the large window, the terminal device enters an interface shown in FIG. 10A(b). The terminal device starts recording in the large window and recording in the small window simultaneously, and the small window may display the focus tracking object in the large window in real time. In the interface in FIG. 10A(b), the small window displays a recording picture and a recording time. In another example, the small window further displays the small window recording end button 315 in the recording mode, and the recording start button 303 in the large window is converted into the recording pause button 313 and the recording end button 314 in the recording mode. The large window and the small window may each display a respective recording time, where the recording time in the large window and the recording time in the small window may keep consistent with each other. To beautify the recording interface and reduce blocking to the focus tracking object, a display position of the recording time in this embodiment of this application may be shown in FIG. 10A(b), and the recording time may alternatively be set at another position that does not affect recording.

Figure 10A:
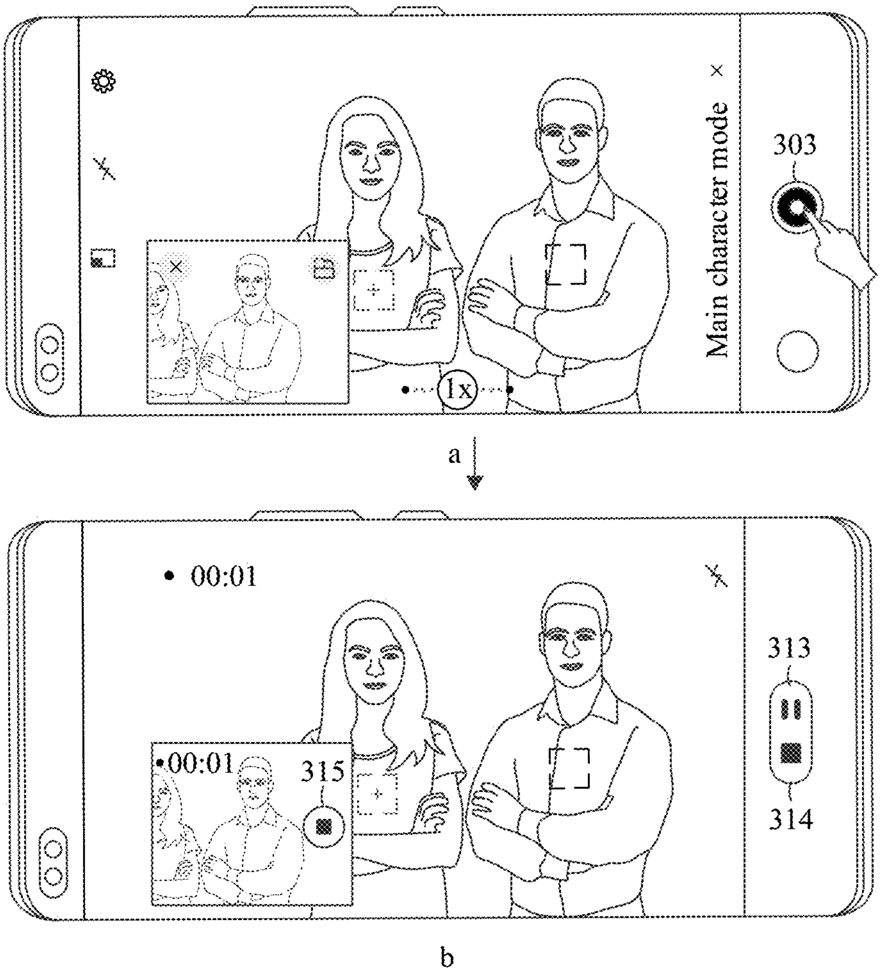
FIG. 10A is a schematic diagram of interfaces of starting recording in a small window according to an embodiment of this application.
Figure 10B:
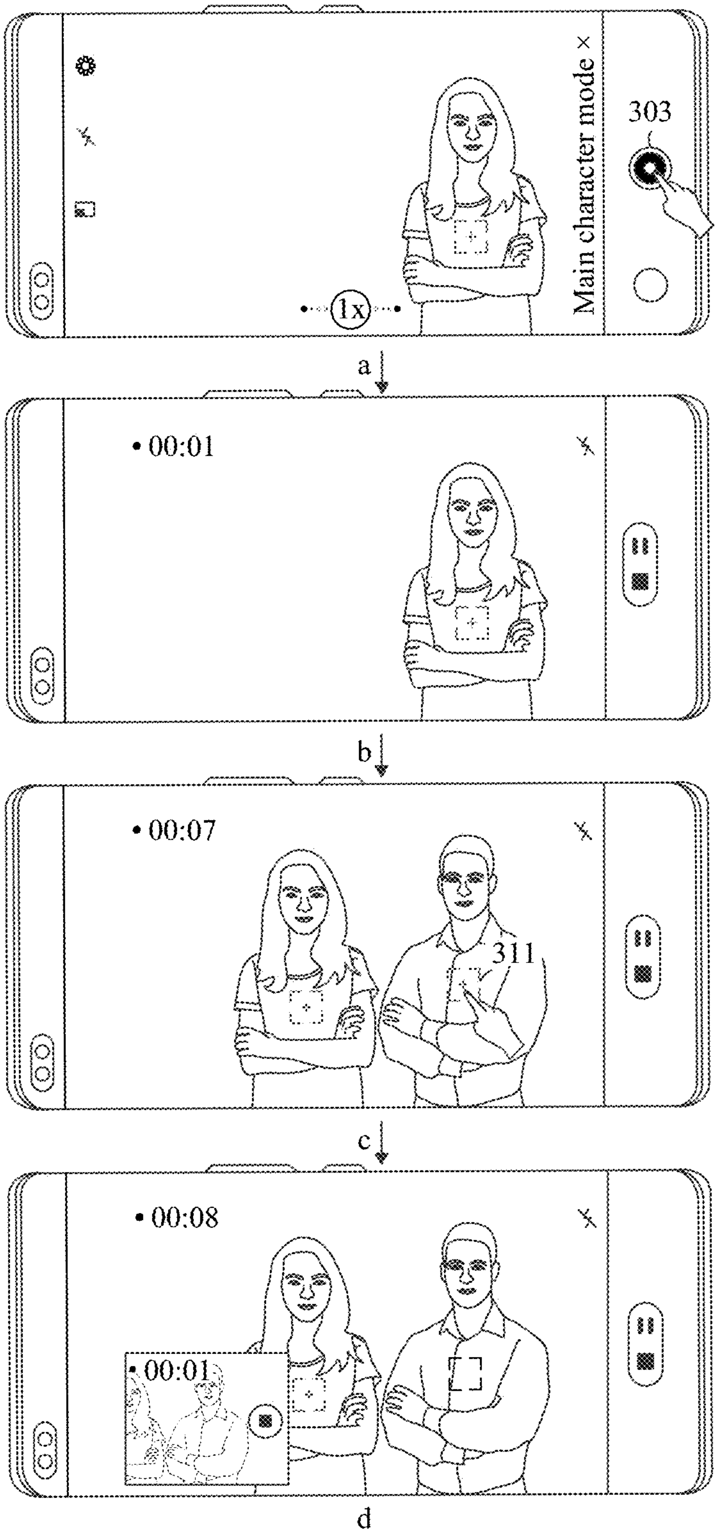
FIG. 10B is a schematic diagram of interfaces of starting recording in a small window according to an embodiment of this application.
Figure 10C:
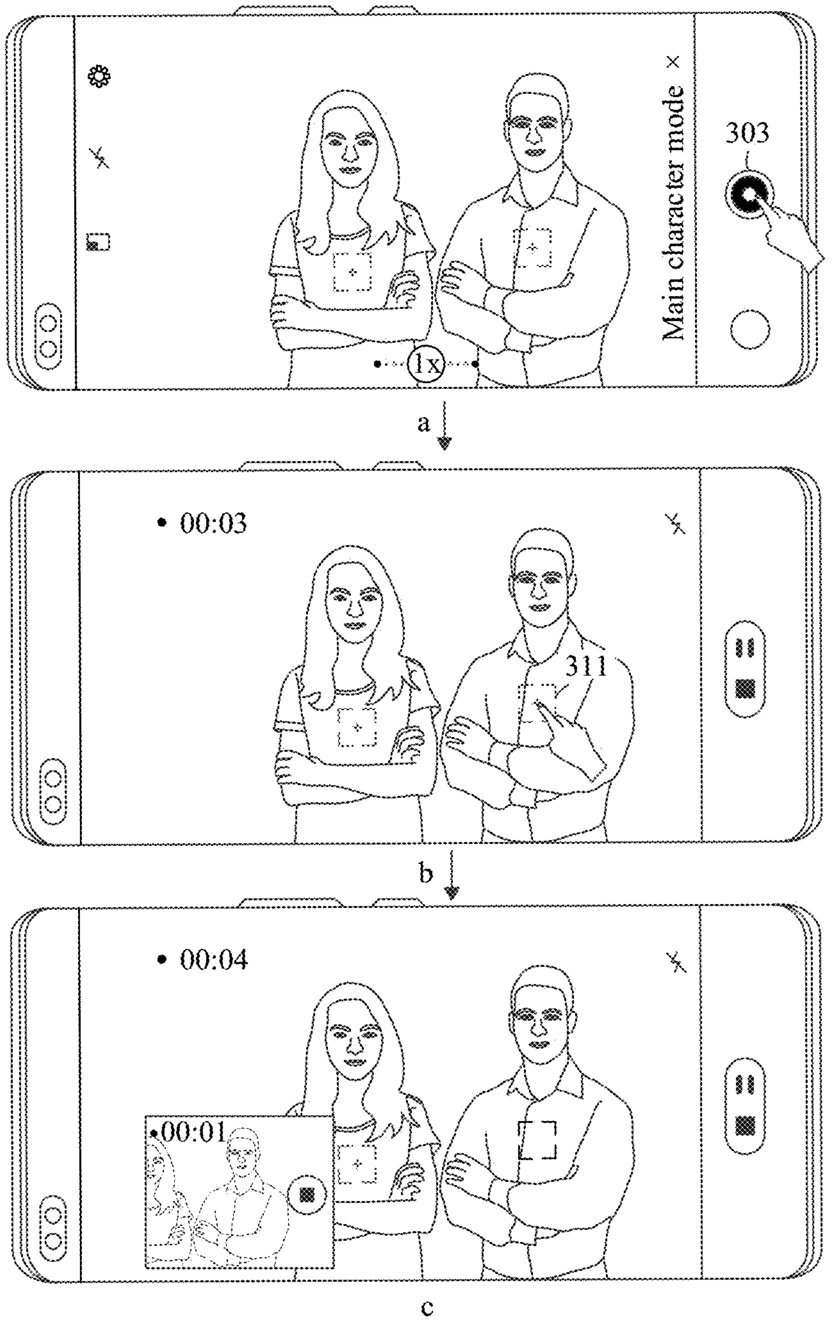
FIG. 10C is a schematic diagram of interfaces of starting recording in a small window according to an embodiment of this application.

Optionally, in some embodiments, when the terminal device enters the recording mode from the preview mode, the first horizontal and vertical screen switch button, the second horizontal and vertical screen switch button, the zoom button, and the small window close button may disappear, as shown in FIG. 10A(b). In some embodiments, these buttons may alternatively be reserved, which is not limited in the embodiments of this application.

In another scenario of starting the small window for recording, recording of videos in the large window and the small window may be started in sequence. In an interface in FIG. 10B(a), a preview picture in the large window does not include the focus tracking object, and the terminal device does not start the small window. When the terminal device detects a tap operation on the recording start button 303 in the large window, the terminal device enters an interface shown in FIG. 10B(b). In the interface in FIG. 10B(b), the terminal device starts recording in the large window, and the large window displays a recording time. After a period of time, the terminal device recognizes the focus tracking object, and a recording picture in the large window may be shown by FIG. 10B(c). The interface in FIG. 10B(c) includes the male character and the tracking frame 311 corresponding to the male character. When the terminal device receives a tap operation of the user on the tracking frame 311 of the male character at the seventh second of the recording time, the terminal device starts recording in the small window and enters an interface shown in FIG. 10B(d). In the interface in FIG. 10B(d), the small window may display a recording picture of the focus tracking object, a recording time, and a small window record button, and the small window may record the focus tracking object in the large window in real time.

In still another scenario of starting the small window for recording, recording of videos in the large window and the small window may be started in sequence. In an interface in FIG. 10C(a), a preview picture in the large window includes the focus tracking object, and the small window is not started since the terminal device does not select the focus tracking object. The terminal device responds to a tap operation of the user on the recording start button 303, and the terminal device starts recording in the large window and enters an interface shown in FIG. 10C(b). In the interface in FIG. 10C(b), the large window displays a recording picture and a recording time, and the terminal device does not start the small window. In a recording process in the large window, when the terminal device detects a tap operation that the user selects the tracking frame 311, the terminal device displays an interface shown in FIG. 10C(c). In the interface in FIG. 10C(c), the terminal device keeps the recording in the large window and starts recording in the small window.

The terminal device may start video recording in the small window based on the foregoing scenario and obtain a plurality of videos. It should be noted that, the small window may display a picture related to the focus tracking object in the large window, but videos recorded in the small window and a video recorded in the large window are a plurality of independent videos rather than a synthetic video in a picture-in-picture form that the small window is nested in the recording picture in the large window.

It should be noted that, if the terminal device does not start the recording in the small window, the terminal device may obtain one video recorded in the large window; and if the terminal device starts the recording in the small window, the terminal device may obtain one video recorded in the large window and the plurality of videos recorded in the small window. For example, during video recording in the large window, the terminal device may start the recording in the small window for a plurality of times, where the terminal device may end, when detecting a tap operation on the small window recording end button, the recording in the small window to obtain a video. After the recording in the small window is restarted, the terminal device may obtain a new video. A quantity of videos obtained in the small window may be related to a quantity of times of recording started in the small window.

Figure 10D:
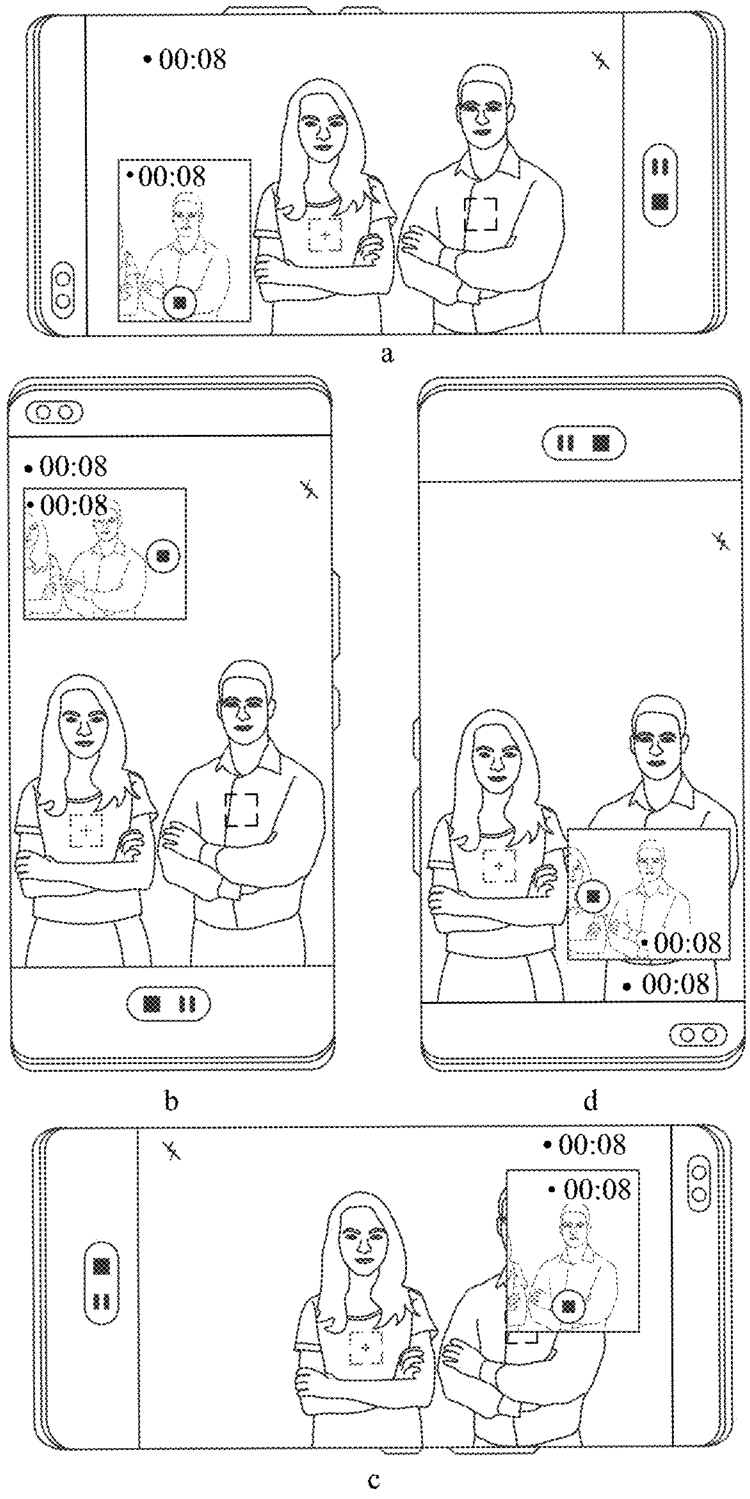
FIG. 10D is a schematic diagram of interfaces during recording in a small window according to an embodiment of this application.

In the recording mode of the main character mode, an embodiment of this application further provides a schematic diagram of four interfaces of the terminal device during recording in the small window, as shown in FIG. 10D.

For example, during recording in the large window and the small window of the terminal device, recording pictures may be shown in FIG. 10D(a). The user rotates the terminal device clockwise by 90 degrees (or about 90 degrees) sequentially, and recording interfaces in the large window and the small window of the terminal device may be shown in FIG. 10D(b), FIG. 10D(c), and FIG. 10D(d). The recording times and the recording end button in the small window may be adaptively adjusted along with horizontal and vertical screen switching.

FIG. 10D exemplarily shows a schematic diagram of four interfaces in the recording mode. It may be understood that, in the recording mode of the main character mode, a form that is set by default of the small window may be shown in FIG. 10D, where a recording direction in the large window is in consistent with a recording direction in the small window. For example, in an interface in FIG. 10D(a), the large window is in horizontal screen recording, and the small window is in vertical screen recording; and for another example, in an interface in FIG. 10D(b), the large window is in vertical screen recording, and the small window is in horizontal screen recording. The form that is set by default of the small window may alternatively be that the recording direction in the large window is consistent with the recording direction in the small window. For example, the large window is in horizontal screen recording, and the small window is in horizontal screen recording; and for another example, the large window is in vertical screen recording, and the small window is in horizontal screen recording. The form that is set by default of the small window is not limited in the embodiments of this application.

It may be understood that, in a rotation process of the terminal device, a relative display position of the small window is fixed (for example, the small window is always located around a corner close to the camera in FIG. 10D) Based on a portrait recognition technology, the terminal device may lock a position of the focus tracking object in real time, so that the small window always tracks the focus tracking object and displays the focus tracking object. For example, in FIG. 10D, after the terminal device is rotated, the small window still performs focus tracking on the male character and the male character is located at a centered position.

Since the display position of the small window is fixed, in the rotation process of the terminal device, the small window may block a character in the large window, as shown in FIG. 10D(c). In a possible implementation, the user may manually move the small window to a position that does not block the large window. In another possible implementation, the terminal device may detect whether there is an overlapped region between the focus tracking object in the small window and the focus tracking object in the large window. If there is an overlapped region, the display position of the small window is automatically adjusted until no overlapped region exists between the two windows.

The embodiments of this application provide several scenarios in which the terminal device starts the small window for recording in the main character mode. The user may perform a corresponding operation according to an actual situation to start recording in the small window, so that recording in the main character mode becomes more convenient and flexible, thereby improving the recording experience of the user.

In the recording mode of the main character mode, after the small window appears in the recording interface of the terminal device, the user may further adjust the form of the small window as required. The following describes methods for adjusting the small window with reference to FIG. 11A to FIG. 11D.

Figure 11A:
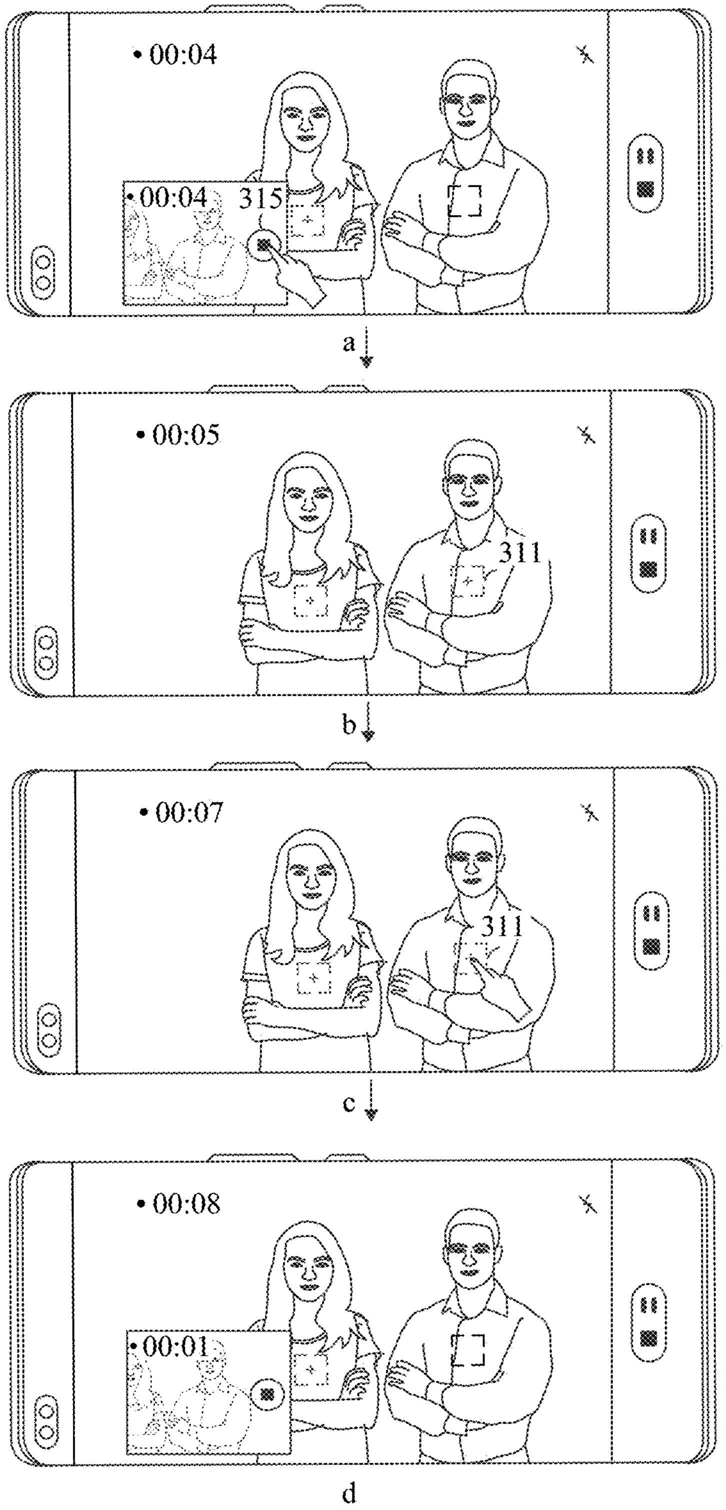
FIG. 11A is a schematic diagram of interfaces of ending recording in a small window according to an embodiment of this application.
Figure 11B:
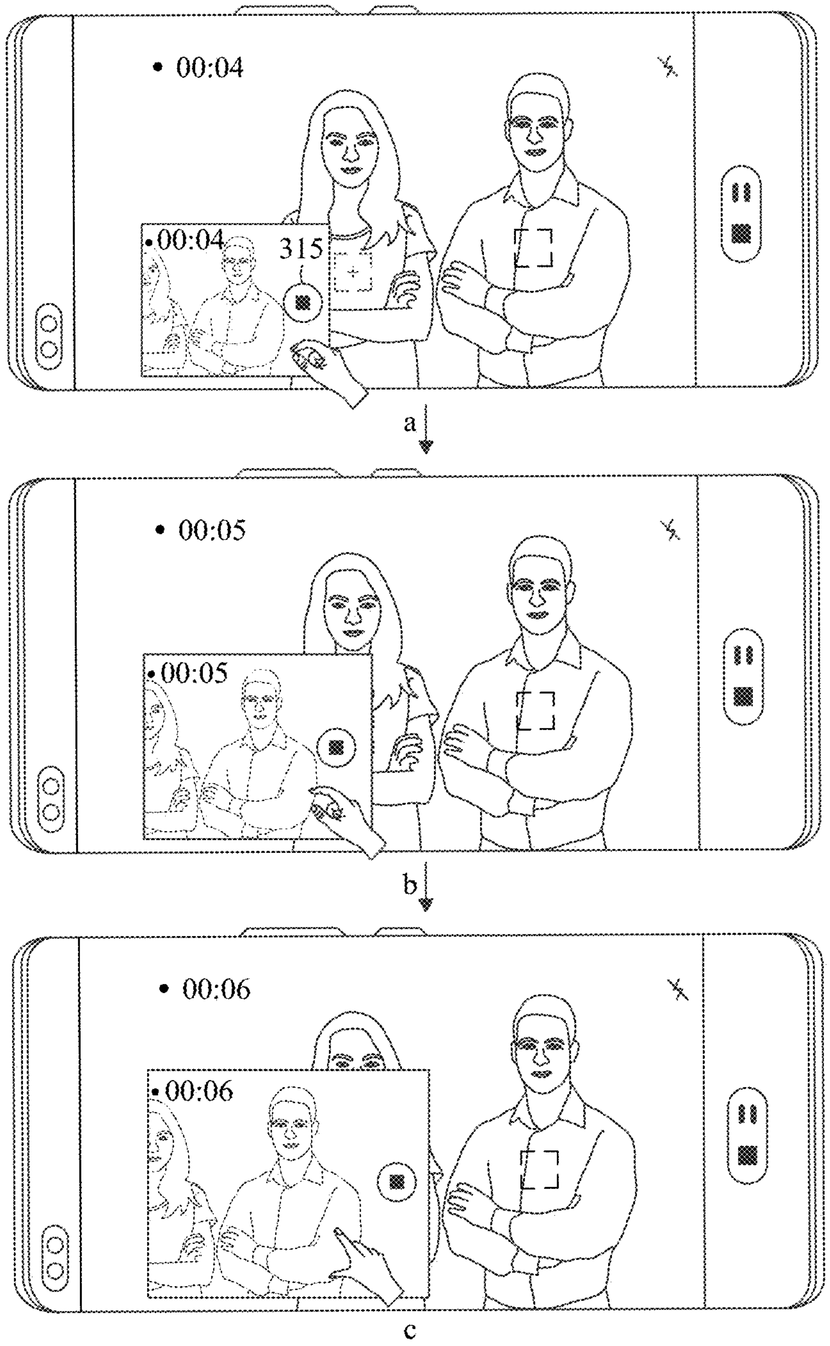
FIG. 11B is a schematic diagram of interfaces of adjusting a size of a small window according to an embodiment of this application.
Figure 11C:
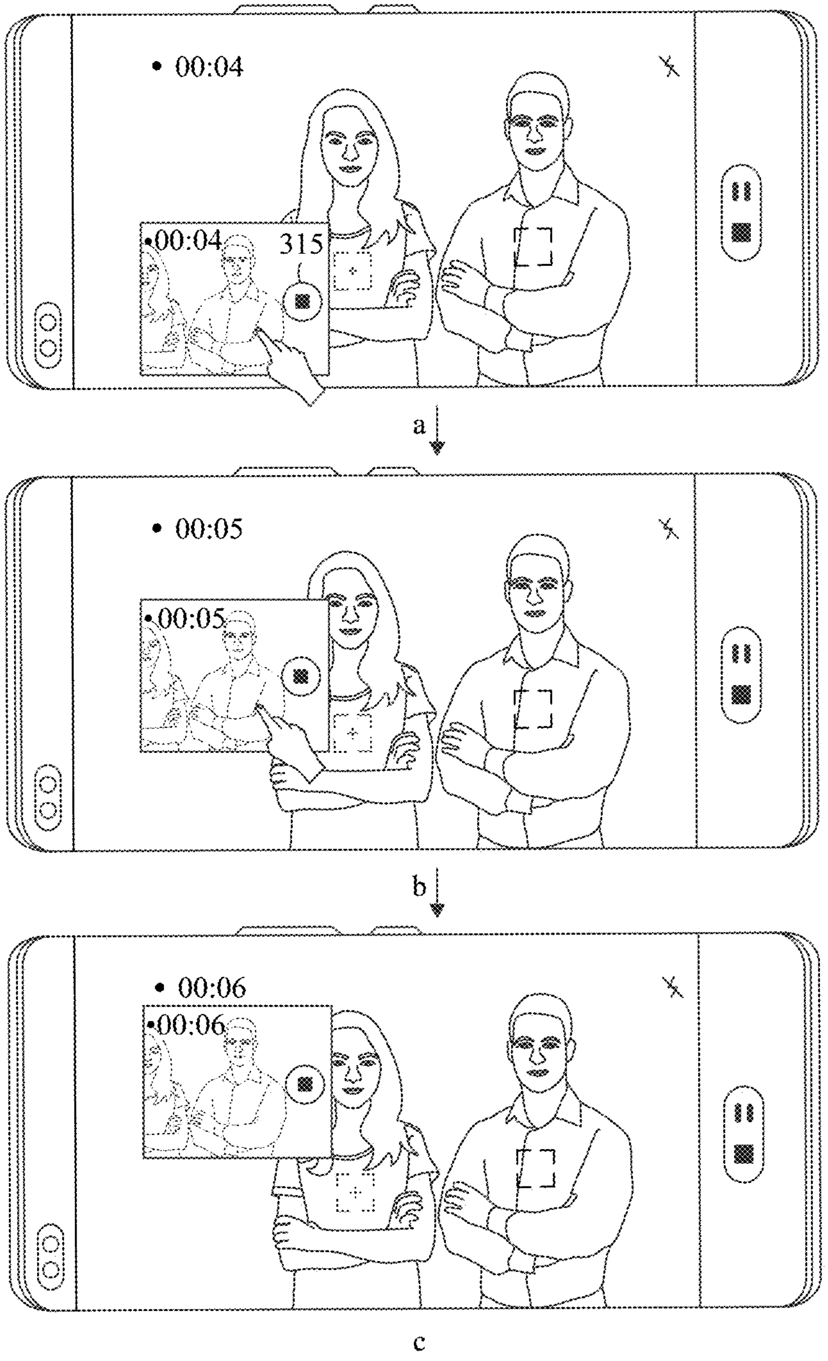
FIG. 11C is a schematic diagram of interfaces of adjusting a display position of a small window according to an embodiment of this application.

For example, FIG. 11A shows a schematic diagram of a scenario of using the small window recording end button in the small window in the recording mode of the main character mode.

The small window in the recording mode includes the small window recording end button 315. The terminal device may end, during recording in the small window, the recording in the small window at any time based on an operation of the user on the small window recording end button 315. For example, in an interface in FIG. 11A(a), the terminal device receives a tap operation of the user on the small window recording end button 315 in the small window at the fourth second of recording in the large window, and the terminal device may enter an interface shown in FIG. 11A(b). In the interface in FIG. 11A(b), the small window is closed, the selected focus tracking object is not displayed in the large window, and the tracking frame 311 is restored to the unselected form. In this case, recording in the small window has been ended, and the terminal device may store a video recorded in the small window. After a period of time, in an interface shown in FIG. 11A(c), the terminal device receives a tap operation on the tracking frame 311 at the seventh second of the recording in the large window, and the terminal device may enter an interface shown in FIG. 11A(d). The interface in FIG. 11A(d) may include the small window, and the small window starts recording a video. The video recorded in FIG. 11A(d) and the video recorded in FIG. 11A(a) may be different videos. For example, when the recording in the small window is ended at the fourth second, the terminal device stores a first video lasting for 4 s. When the terminal device selects the focus tracking object at the seventh second, the small window starts recording a second video.

It may be understood that, the small window recording end button 315 in the small window may control the recording in the small window, but the recording in the small window does not affect recording in the large window. That is, when the terminal device performs the process in FIG. 11A, the recording in the large window is always kept.

In addition, in the recording mode of the main character mode, the terminal device may also set a memory mechanism to restart the recording in the small window within 15 min, and a current form of the small window may be consistent with a previous form of the small window. For example, positions, sizes, and horizontal and vertical screen recording of the small windows in FIG. 11A(a) and FIG. 11A(d) may be the same. For the memory mechanism, reference may be made to the description in FIG. 6C, and details are not described herein again.

In the recording mode of the main character mode, when the terminal device starts the small window for recording, the user may further adjust a size of the small window. For example, the user may adjust the size of the small window by using two fingers, the terminal device may detect positions at which the two fingers tap the display screen, and control enlarging or scaling of the small window according to a distance between the two tap positions, and an adjustment process of the size of the small window may be shown in FIG. 11B(a) to FIG. 11B(c). For the adjustment process of the small window, reference may be made to the description in FIG. 6A, and details are not described herein again. It may be understood that, the recording in the large window and the recording in the small window may not be affected during adjustment on the small window.

It should be noted that, in a possible implementation, in the recording mode of the main character mode, when the terminal device adjusts the size of the small window, a recording picture in the small window may be enlarged or scaled correspondingly. For example, in a process that the small window is enlarged, the recording picture in the small window is not changed but enlarged correspondingly, so that the user can browse a picture during recording in the small window clearly. In this case, adjustment on the small window during recording does not affect the video recording in the small window. That is, in a video playing process in the small window, no enlarged or scaled discontinuous picture may appear suddenly. This method improves the visual enjoyment during recording, and does not affect the fluency during video playing.

In another possible implementation, when the terminal device adjusts the size of the small window, a preview picture in the small window is enlarged or scaled relative to the large window. For example, in a process that the small window is enlarged, the preview picture in the small window is changed and recording content in the small window is increased. That is, in a video playing process in the small window, content in the picture is increased, and the focus tracking object is scaled correspondingly. In this method, the user may adjust a display proportion of the focus tracking object in the video in the small window based on enlarging or scaling of the small window, and the focus tracking object may be better presented, thereby further improving the recording experience of the user.

In the recording mode of the main character mode, the terminal device may further adjust the display position of the small window.

For example, the user may adjust the display position of the small window through a long press and drag operation, the terminal device may detect an operation during tapping and dragging by the user, and a position of the small window in the large window may be adjusted according to movement of a finger of the user. A position adjustment process of the small window may be shown in FIG. 11C(a) to FIG. 11C(c). For the adjustment process of the small window, reference may be made to the description in FIG. 6B, and details are not described herein again. It may be understood that, the recording in the large window and the recording in the small window may not be affected during adjustment on the small window.

Optionally, in the recording mode of the main character mode, when the user adjusts the size and the position of the small window, the terminal device may also hide the button in the small window. For example, when the terminal device detects that the finger is in contact with the display screen, the small window recording end button 315 in FIG. 11C may be hidden. In this way, the user may be prevented from triggering the button accidentally and ending the recording in the small window.

Figure 11D:
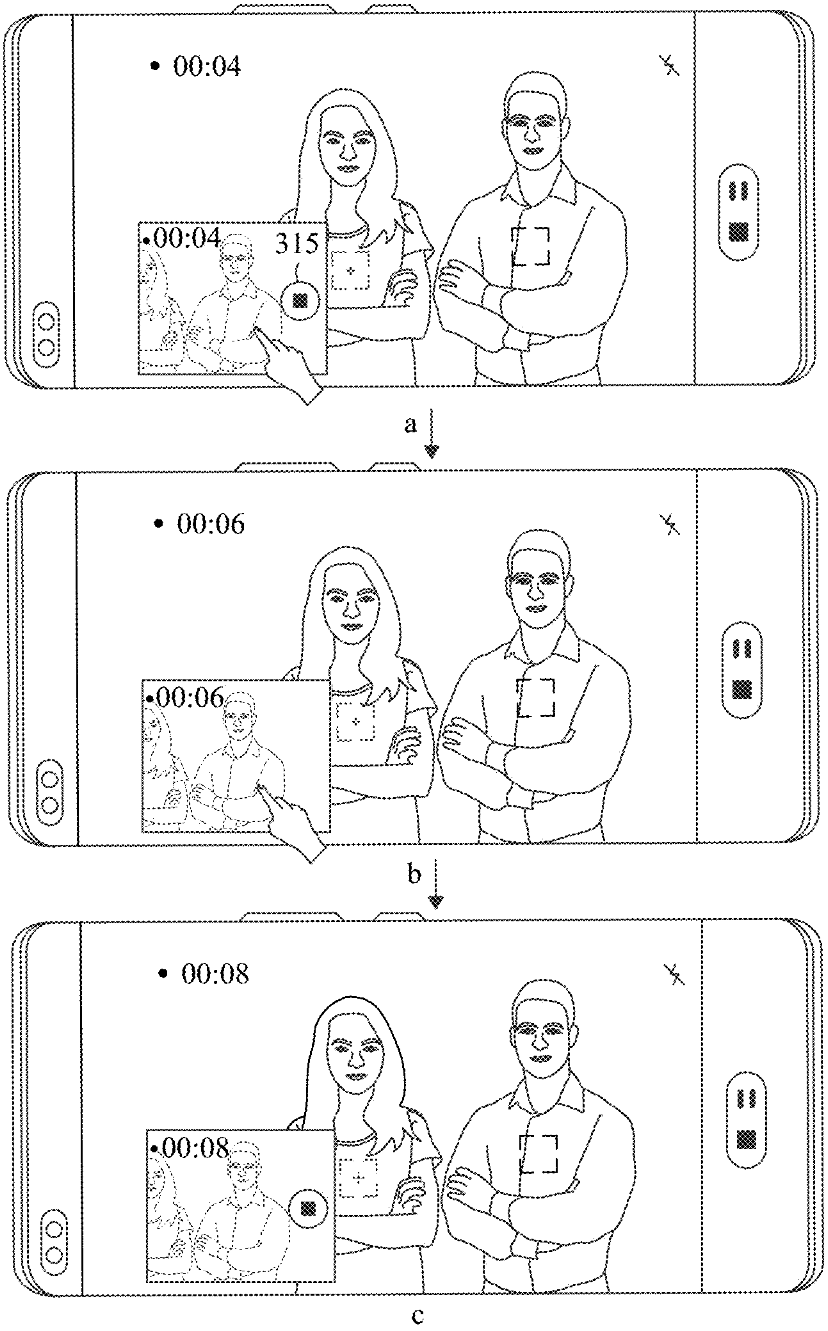
FIG. 11D is a schematic diagram of interfaces of a hidden mode of a small window according to an embodiment of this application.

In the recording mode of the main character mode, when the terminal device starts the small window for recording, a hiding mode may be set to improve the recording experience of the user. For example, as shown in FIG. 11D(a), the small window includes a recording time and the small window recording end button 315. When the terminal device receives that the user taps the non-functional region in the small window, the small window recording end button 315 in the small window is hidden, as shown in FIG. 11D(b). When the terminal device receives that the user taps the small window again, the terminal device may enter an interface shown in FIG. 11D(c). In the interface in FIG. 11D(c), the small window recording end button is restored.

Optionally, when the terminal device does not receive a tap operation with a specific time, the small window may automatically hide the button, and the large window may hide the tracking frame. For example, the time may be set to 5 s. When the terminal device in the hiding mode receives a tap operation, the hidden content may be restored and displayed. In this way, blocking of the button to the recording picture may be reduced during recording, and the user may experience the recording process immersively, thereby improving the recording experience of the user.

Figure 12:
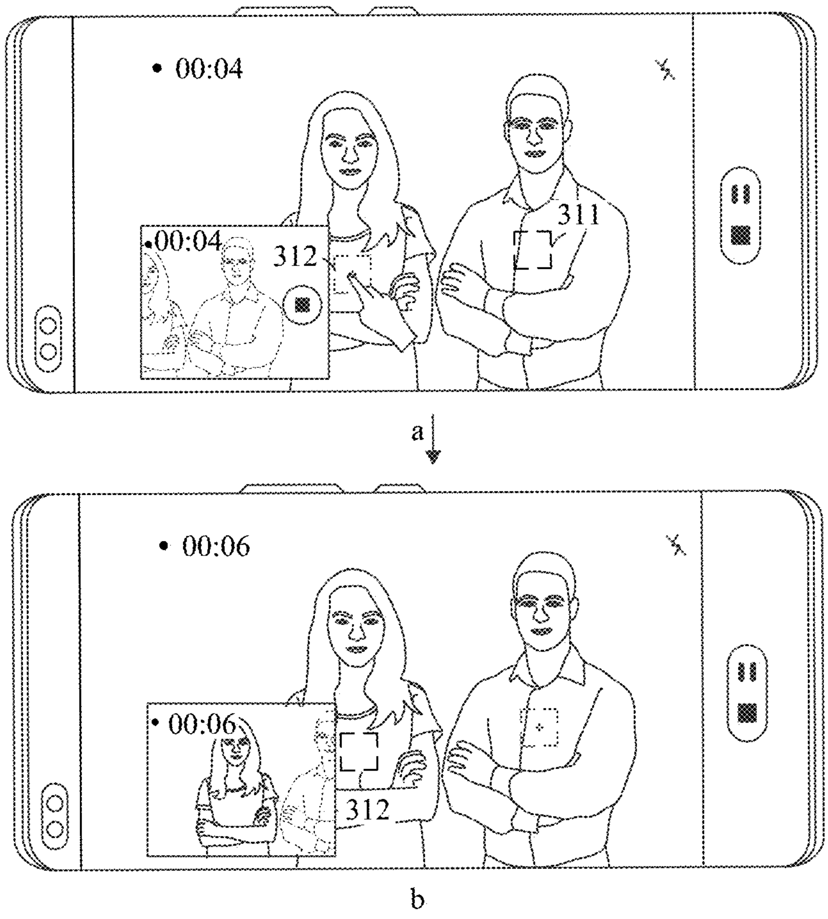
FIG. 12 is a schematic diagram of interfaces of selecting a focus tracking object of a small window according to an embodiment of this application.

An embodiment of this application further provides a method for switching the focus tracking object in the recording mode of the main character mode, as shown in FIG. 12. For example, in an interface in FIG. 12(*a*), in a recording scenario in the main character mode, the focus tracking object in the large window is the male character, and the tracking frame 311 corresponding to the male character is highlighted. The small window displays a recording picture of the male character. When the terminal device detects an operation that the user taps the tracking frame 312 corresponding to the female character, the terminal device enters an interface in FIG. 12(*b*). The terminal device changes the focus tracking object from the male character to the female character. In the interface in FIG. 12(*b*), the focus tracking object in the large window is the female character, and the tracking frame 312 corresponding to the female character is highlighted. The small window displays a recording picture of the female character.

Optionally, when the terminal device switches the focus tracking object in the recording mode, a dynamic special effect may also be set, to improve the fluency of the recording picture in the focus tracking object switching process. For the dynamic special effect, reference may be made to the description in FIG. 5, and details are not described in the embodiments of this application again.

The embodiments of this application provide several scenarios of flexibly adjusting a recording picture in the small window, to improve the experience of the user during recording.

According to the recording method provided in the embodiments of this application, in the recording mode of the main character mode, the terminal device may provide a recording pause function.

Figure 13:
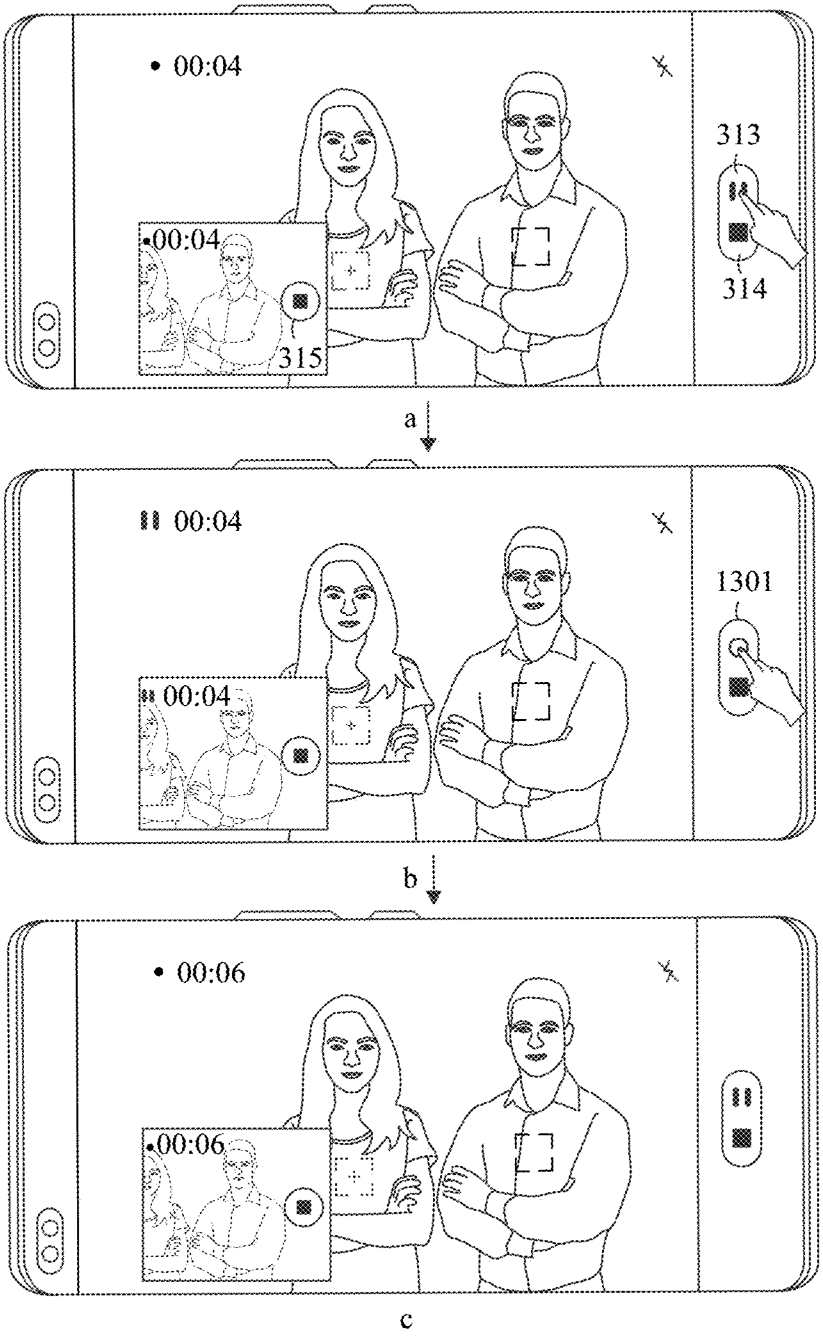
FIG. 13 is a schematic diagram of interfaces of stopping recording in a small window according to an embodiment of this application.

For example, in an interface shown in FIG. 13(*a*), the terminal device is in a recording process, the large window may include the recording pause button 313, the recording end button 314, and a recording time in the large window. The small window may include the small window recording end button 315 and a recording time in the small window. When the terminal device receives a tap operation on the recording pause button 313, the terminal device enters an interface shown in FIG. 13(*b*). In the interface in FIG. 13(*b*), recording in the large window and recording in the small window may be paused simultaneously. The recording pause button 313 may be changed to a recording continue button 1301. The recording continue button 1301 is configured to indicate the terminal device to continue to record a video in a paused state. In the large window and the small window, the recording times may be a time at which the terminal device stops recording, and the recording time when the terminal device stops recording may be represented as a combination of "||" and a time. When the terminal device receives a tap operation on the recording continue button 1301, the recording in the large window and the recording in the small window of the terminal device are restored simultaneously, as shown in FIG. 13(*c*).

It should be noted that, during a period that the terminal device stops recording, the large window may display an image obtained by the camera in real time, the small window may display an image of the focus tracking object in real time, but the terminal device does not store the images displayed by the large window and the small window.

It may be understood that, a video in the large window after pausing and a video before the pausing are the same video, and a video after the pausing in the small window and a video before the pausing are also the same video. For example, the user taps the recording pause button at the fourth second, and when the terminal device responds to the tap operation and pauses video recording, a recording time of the video is 4 s. After a period of time, when the terminal device receives a tap operation on the recording continue button, the terminal device starts recording a video at the fifth second based on the video lasting for 4 s.

Figure 14A:
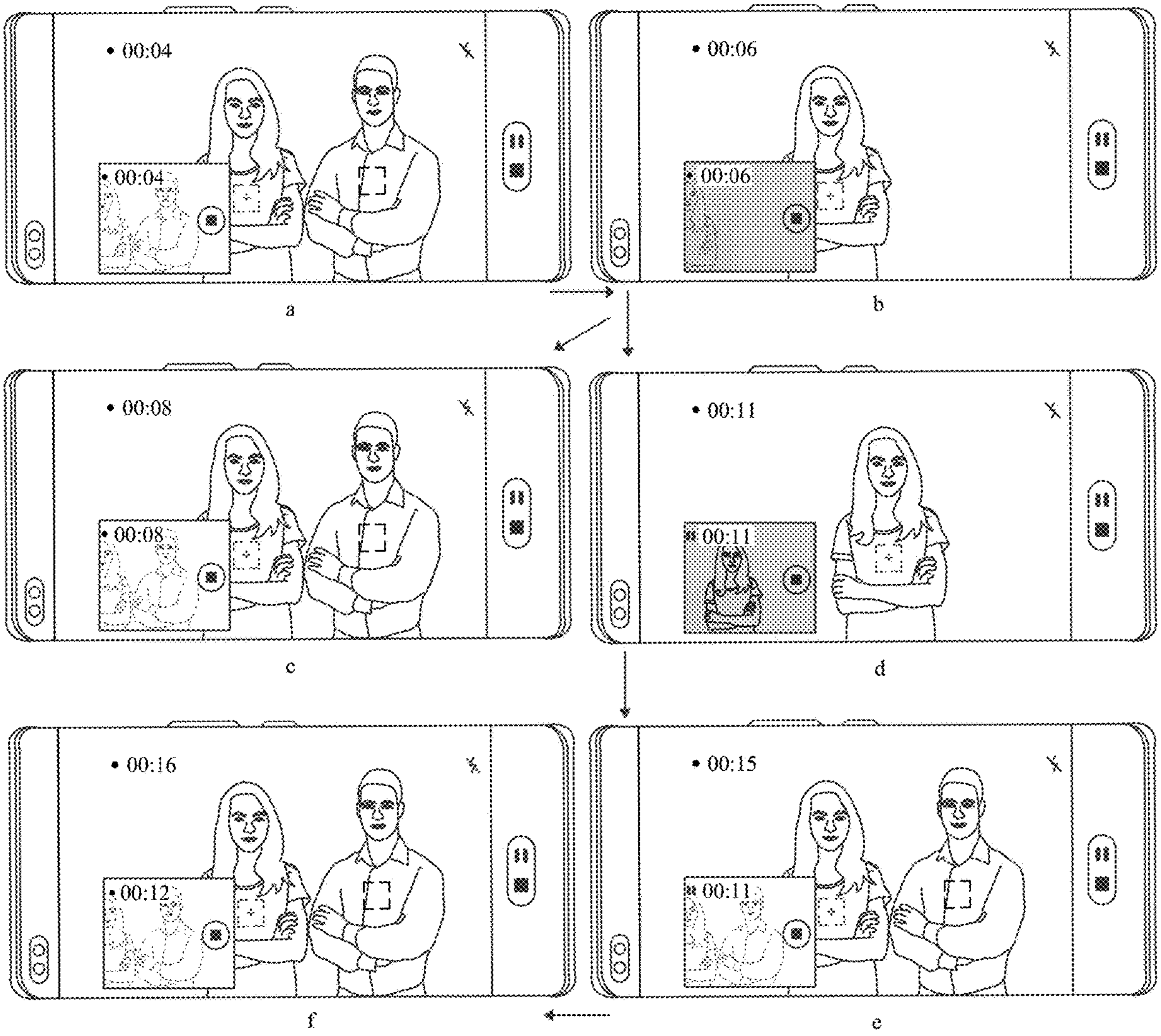
FIG. 14A is a schematic diagram of interfaces in which a large window loses a first object according to an embodiment of this application.
Figure 14B:
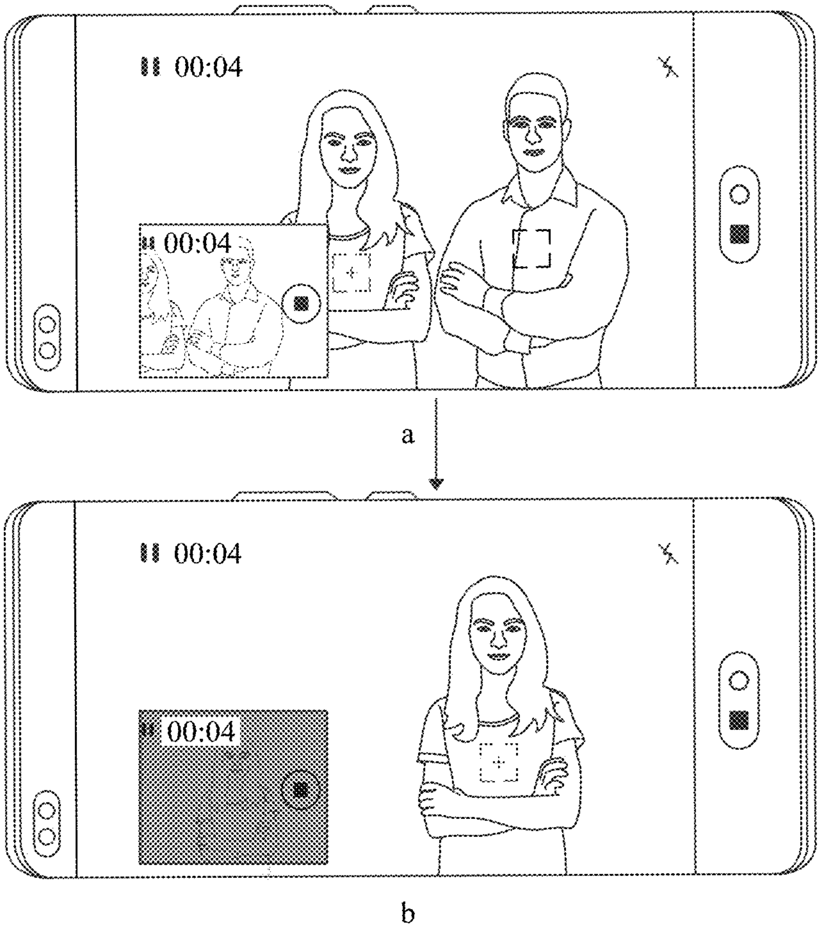
FIG. 14B is a schematic diagram of interfaces in which a large window loses a first object according to an embodiment of this application.

In the recording mode of the main character mode, the terminal device may lose the focus tracking object during recording, and the following describes a processing method for the lost focus tracking object during recording with reference to FIG. 14A and FIG. 14B.

For example, in an interface in FIG. 14A(a), the large window and the small window of the terminal device is recording, where the small window includes the focus tracking object. When the terminal device cannot recognize the focus tracking object in the large window as shown in FIG. 14A(b), the focus tracking object in the small window is also lost, and the small window keeps recording and is in a mask state. In some embodiments, after the focus tracking object is lost, the small window may continue to record a picture at a position at which the focus tracking object is located before the focus tracking object is lost, where a recording picture may be an empty shot without the focus tracking object, and a recording time may be 5 s. If the terminal device re-recognizes the focus tracking object within 5 s after the focus tracking object is lost, the terminal device enters an interface shown in FIG. 14A(c), and the small window may keep a state before the focus tracking object is lost. In this scenario, loss of the focus tracking object does not affect a focus tracking video in the small window, and the small window always keeps recording. When the focus tracking object is retrieved and recording is restored, the terminal device may edit the video before the focus tracking object is lost, an empty shot video, and a video after the focus tracking object is retrieved in the small window. In a possible implementation, the terminal device may delete the empty shot, and splice the video before the focus tracking object is lost and the video after the focus tracking object is retrieved into one video. In another possible implementation, the terminal device may perform processing such as blurring, focus softening, or mask adding on the empty shot video, to reduce an impact of the empty shot video on the coherence of the entire video and improve the experience when the user subsequently views the recorded video.

If the terminal device does not recognize the focus tracking object within 5 s after the focus tracking object is lost, the terminal device enters an interface shown in FIG. 14A(d) from the interface shown in FIG. 14A(b). In the interface in FIG. 14A(d), the terminal device continues the recording in the large window and pauses the recording in the small window, where the small window may still be presented in the mask state. For example, if the terminal device cannot detect the focus tracking object at the sixth second and does not recognize the focus tracking object in subsequent 5*s*, the terminal device pauses the recording in the small window at the eleventh second while the recording in the large window is not affected. In this scenario, if the terminal device fails to retrieve the focus tracking object or does not end the recording in the small window, the small window is always in a paused state and presented with a mask. Alternatively, the terminal device may end the recording in the small window, and no longer display the small window and content in the small window in a recording interface of the large window.

It should be noted that, when the terminal device pauses the recording in the small window, the small window may continuously track a picture at a corresponding position in the large window, but the terminal device does not perform the recording in the small window. The terminal device may alternatively display, when the recording in the small window is paused, one last frame of static picture during recording in the small window, and the small window does not track a picture at a corresponding position in the large window.

When the terminal device fails to retrieve the focus tracking object within 5 s after the focus tracking object is lost and the recording in the small window is paused, a recording interface of the terminal device may be shown in FIG. 14A(d). When the terminal device recognizes the focus tracking object in a process that the recording in the small window is paused, the recording in the small window may be automatically restored, and the terminal device enters interfaces shown in FIG. 14A(e) and FIG. 14A(f). For example, the terminal device pauses the recording in the small window at the eleventh second. At the fifteenth second, the terminal device recognizes the focus tracking object and restores the recording in the small window. In this case, the small window may continue to recording a video at the twelfth second based on the video lasting for 11 s.

The terminal device may perform the foregoing process when the focus tracking object in the small window is lost in the recording mode. In another possible scenario, the terminal device may encounter a case that the focus tracking object is lost when the recording in the large window is paused, as shown in FIG. 14B.

For example, an interface in FIG. 14B(a) may be an interface entered by the terminal device when detecting a tap operation on the recording pause button in the large window, where the large window and the small window are in a recording paused state simultaneously. The terminal device may be in a preview state when the recording is paused. That is, the large window and the small window may continuously track a preview picture of the focus tracking object but do not perform recording. In a stage that the terminal device pauses recording and previews, the terminal device may encounter a case that the focus tracking object cannot be detected, as shown in FIG. 4B(b). When the terminal device does not recognize the focus tracking object, the terminal device may enter an interface in FIG. 14B(c). In the interface in FIG. 14B(c), the small window is automatically presented in a mask state, the mask state may prompt the user that the focus tracking object is lost, and the terminal device needs to retrieve the focus tracking object or re-select a focus tracking object to restore recording.

Optionally, in a possible implementation, in the interface in FIG. 14B(b), the small window is in a recording paused state and presented with a mask. If the terminal device fails to retrieve the focus tracking object or does not end/continue recording, the mask state of the small window always exists.

The embodiments of this application provide several scenarios in which the focus tracking object is lost in the recording mode of the main character mode, and the terminal device may perform corresponding processing methods for the scenarios, to reduce an impact of the lost focus tracking object on the recording process, thereby improving the recording experience of the user.

Figure 15:
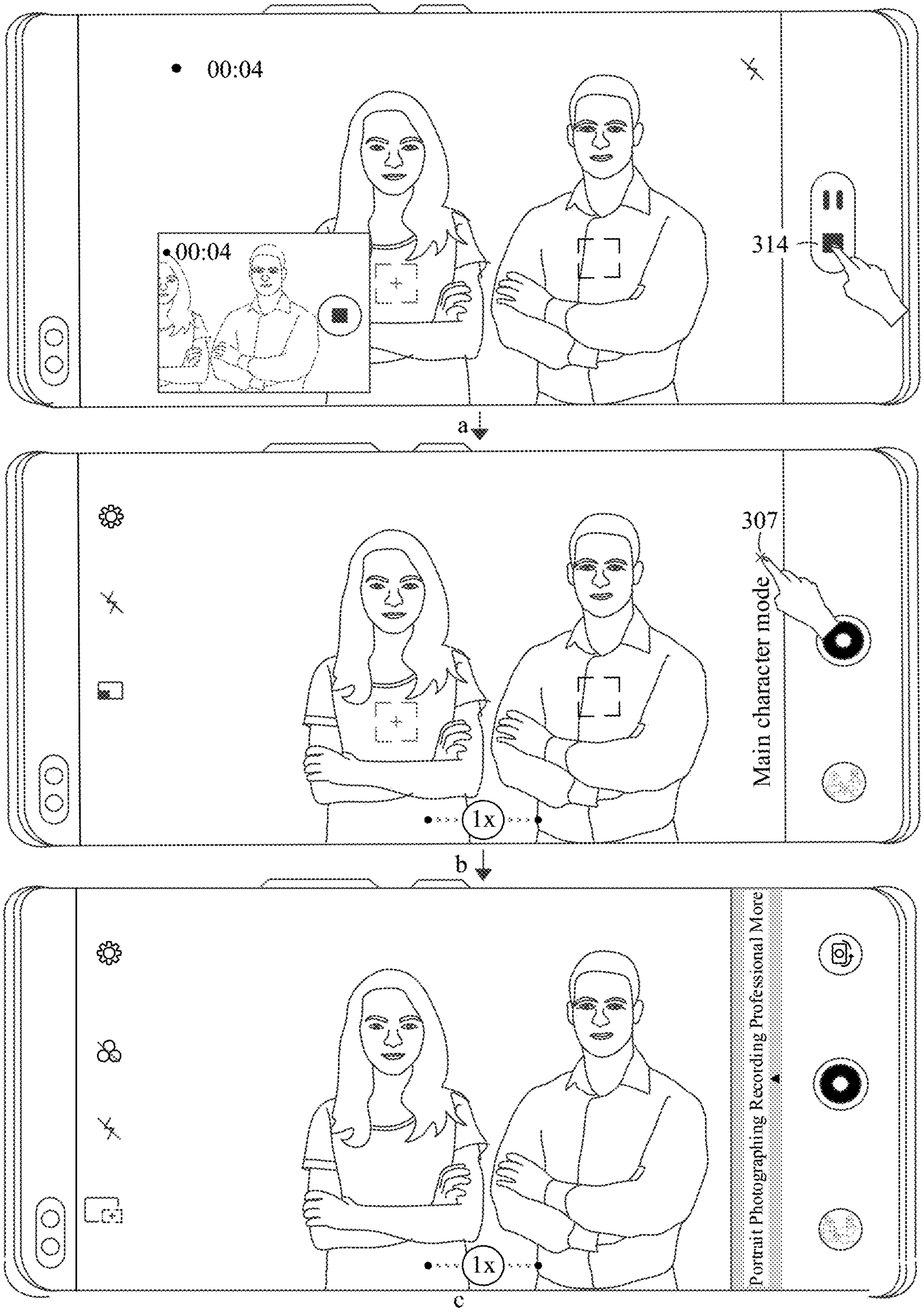
FIG. 15 is a schematic diagram of interfaces of exiting a main character mode according to an embodiment of this application.

When the user does not have a requirement of using the main character mode, the user may choose to exit the main character mode and restore to a normal recording mode. The following describes a scenario of existing the main character mode according to the embodiments of this application with reference to FIG. 15. As shown in FIG. 15:

For example, when the terminal device receives a tap operation on the recording end button 314 in an interface in FIG. 15(*a*), the terminal device may end recording in the large window and recording in the small window simultaneously and enter an interface in FIG. 15(*b*). When the terminal device ends recording, a video recorded in the large window and a video recorded in the small window may be stored simultaneously. The terminal device may store the two videos in the same path or may store the two videos in different paths. For example, the video in the large window and the video in the small window may be stored in a folder of an album, or the video in the large window may be stored in a common path, and the video in the small window is stored in a folder of the main character mode of an album. Paths in which the two videos are stored are not limited in the embodiments of this application.

In the interface in FIG. 15(*b*), the large window and the small window have ended recording and are restored to the preview mode. When a tap operation on the main character mode exit button 307 is received, the terminal device enters an interface shown in FIG. 15(*c*). The terminal device restores to a normal recording mode. Certainly, the terminal device may alternatively directly exit the main character mode and display the interface shown in FIG. 15(*c*) when detecting a tap operation on the recording end button 314 in the interface in FIG. 15(*a*). Alternatively, the user may also trigger the terminal device to exit the main character mode through manners such as a gesture, which is not limited in the embodiments of this application.

Optionally, the user may browse the video recorded in the large window and the plurality of videos recorded in the small window based on an album of the camera application, and a display sequence of the plurality of videos may be a recording sequence of the videos. That is, the terminal device may sort the videos according to an end time point or a start time point of the recorded videos. The display sequence of the plurality of videos may alternatively be a reverse sequence of the recording sequence of the videos. That is, the terminal device may arrange the videos in a reverse sequence according to the end time point or the start time point of the recorded videos.

Optionally, the video recorded in the large window and the video recorded in the small window may be displayed in a video thumbnail of the same camera interface. For ease of distinguish the video recorded in the large window and the video recorded in the small window, the terminal device may set an identifier for the video recorded in the small window. For example, the terminal device may add an outer side frame, a font, or a graph to the video recorded in the small window, and the terminal device may further set a thumbnail size of the video recorded in the small window, so that the size of the thumbnail of the video recorded in the small window is different from that of the video recorded in the large window. It may be understood that, a form of the video thumbnail in the album is not limited in the embodiments of this application.

Figure 16A:
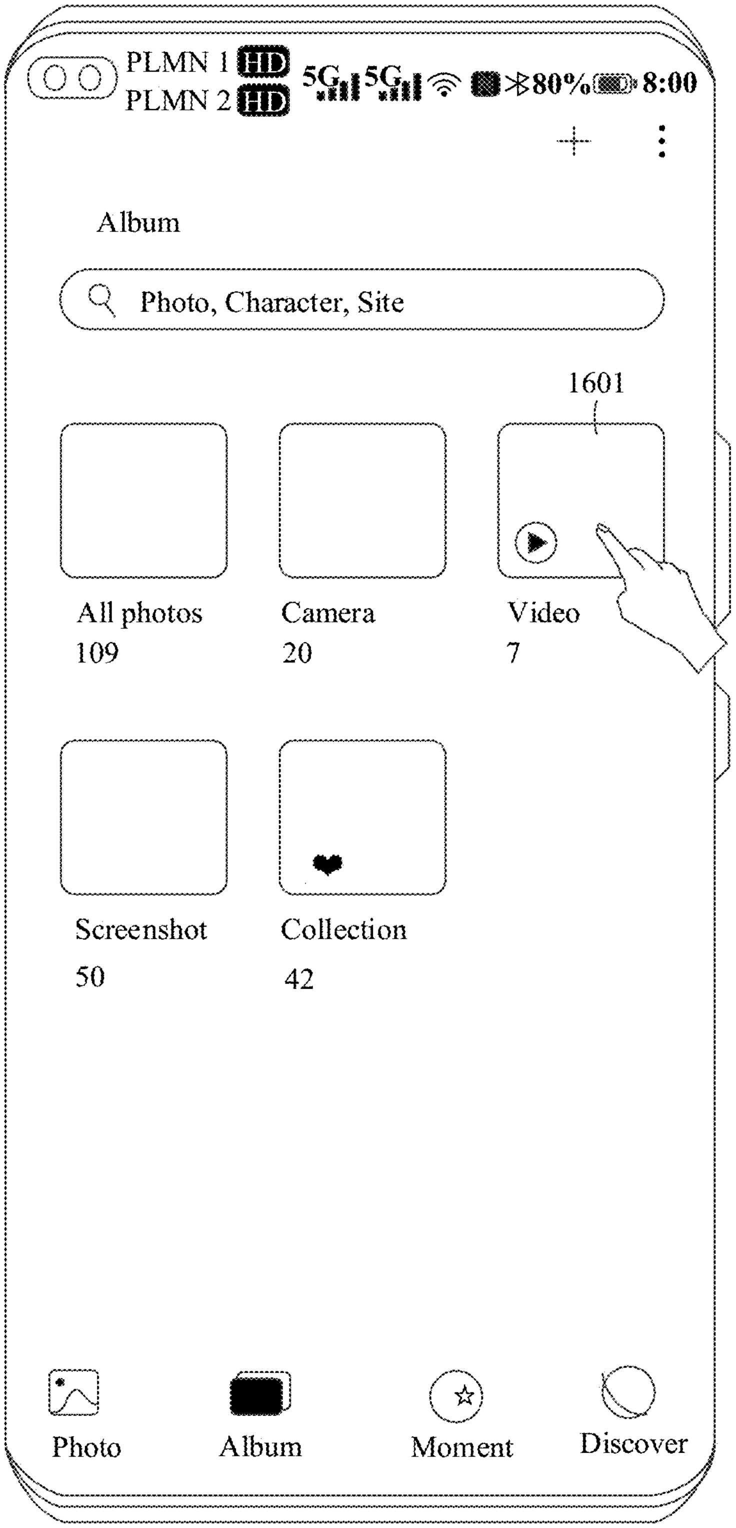
FIG. 16A and FIG. 16B are a schematic diagram of interfaces of an album application according to an embodiment of this application.
Figure 16B:
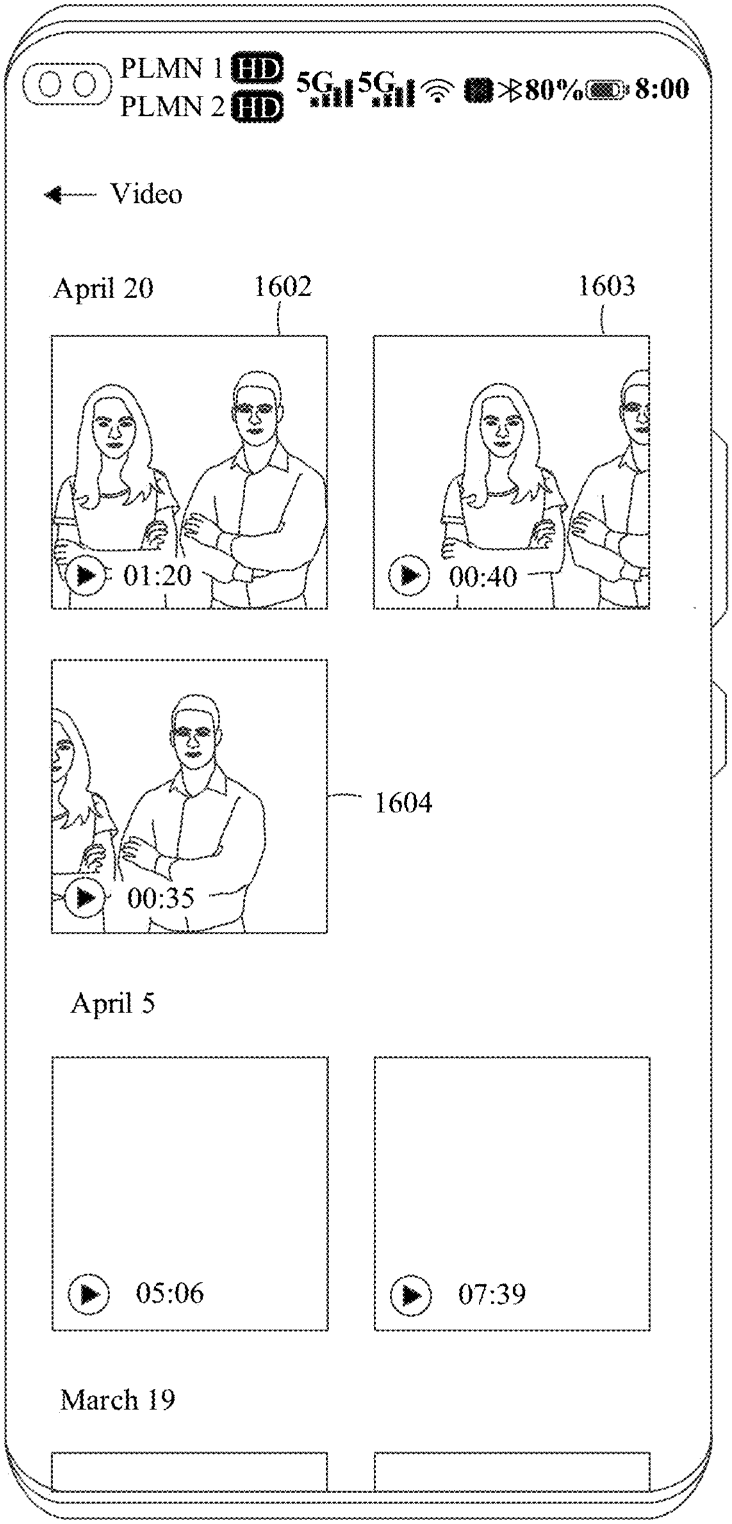

For example, an arrangement sequence of video thumbnails may be shown in FIG. 16A and FIG. 16B. The user may browse videos obtained through recording based on an interface shown in FIG. 16A, and when the terminal device detects a tap operation on a video icon 1601, the terminal device enters an interface shown in FIG. 16B. The interface in FIG. 16B may display video thumbnails that have been recorded currently, where a video 1602, a video 1603, and a video 1604 may be a plurality of videos obtained through recording by using the main character mode once. The following describes a sequence of the videos with reference to a specific recording scenario.

For example, the terminal device performs recording based on the main character mode, a recording interface includes a large window and a small window, the large window displays a male character and a female character, and the small window displays the male character. When the terminal device detects a tap operation on a recording start button, the large window of the terminal device records a video 1602 including the male character and the female character, and the small window records a focus tracking video 1604 of the male character. When the video 1604 is recorded for 35 s, the terminal device detects a tap operation on a small window recording end button, and the terminal device stops recording the video 1604 and stores the video; and the large window keeps recording the video 1602. After 5 s, the terminal device detects a tap operation on a tracking frame of the female character, and the small window of the terminal device records a focus tracking video 1603 of the female character. When the video 1602 in the large window is recorded for 80 s, the terminal device detects a tap operation on a recording end button, and the terminal device stops recording the video 1603 and the video 1604, and stores the video 1603 and the video 1602 sequentially.

In the foregoing recording scenario, the terminal device performs recording by using the main character mode once and obtains three videos. The terminal device may store the videos sequentially according to end times of the three videos, and a video that is first stored is arranged at a behind position in the interface in FIG. 16B. For example, a storage sequence of the videos is the video 1604, the video 1603, and the video 1602. An arrangement sequence of video thumbnails is reverse to the storage sequence and is the video 1602, the video 1603, and the video 1604.

It may be understood that, in the embodiments of this application, the arrangement sequence of the video thumbnails and the storage sequence of the videos are exemplarily described, which are not limited in the embodiments of this application.

It may be understood that, the video recorded in the large window may include images and sound, and the video recorded in the small window may also include images and sound. For example, the terminal device crops a recording picture in the small window from an image in the large window, so that when the video in the small window is obtained, the terminal device may further synchronize the sound to the video in the small window.

The embodiments of this application provide a scenario of exiting the main character mode, and the terminal device may switch between normal recording and main character mode recording. The user may select the normal recording and the main character mode recording based on a requirement of the user, thereby improving the use experience of the user.

Figure 17:
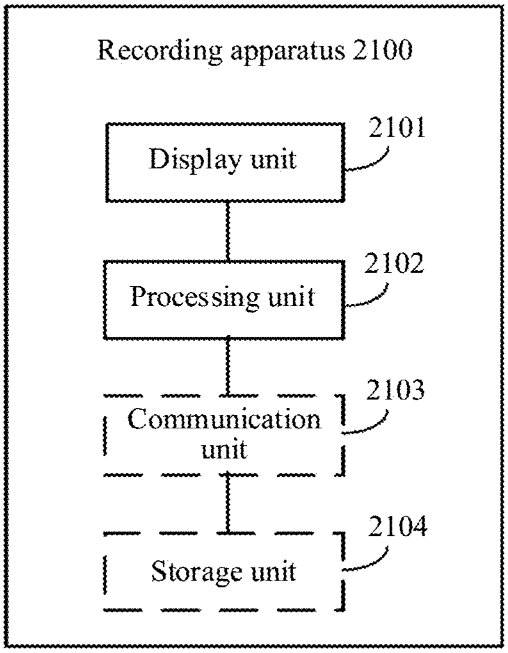
FIG. 17 is a schematic structural diagram of a recording apparatus according to an embodiment of this application.

The foregoing describes the image display method in the embodiments of this application. The following describes an apparatus for performing the methods provided in the embodiments of this application. Referring to FIG. 17, FIG. 17 is a schematic structural diagram of a recording apparatus according to an embodiment of this application. The recording apparatus may be a terminal device in the embodiments of this application, or may be a chip or a chip system in the terminal device.

As shown in FIG. 17, a recording apparatus 2100 may be applied to a communication device, a circuit, a hardware component, or a chip, and the recording apparatus includes: a display unit 2101 and a processing unit 2102. The display unit 2101 is configured to support display steps performed by the recording apparatus 2100; and the processing unit 2102 is configured to support information processing steps performed by the recording apparatus 2100.

In a possible implementation, the recording apparatus 2100 may further include a communication unit 2103. Specifically, the communication unit is configured to support data sending and data receiving steps performed by the recording apparatus 2100. The communication unit 2103 may be an input or output interface, a pin, or a circuit.

In a possible embodiment, the recording apparatus may further include: a storage unit 2104. The processing unit 2102 is connected to the storage unit 2104 through a line. The storage unit 2104 may include one or more memories. The memory may be one or more components configured to store a program or data in a device or a circuit. The storage unit 2104 may exist independently, and is connected to the processing unit 2102 included by the recording apparatus by using a communication line. The storage unit 2104 may alternatively be integrated with the processing unit 2102.

The storage unit 2104 may store computer-executable instructions of the method in the terminal device, so that the processing unit 2102 performs the method in the foregoing embodiments. The storage unit 2104 may be a register, a cache, a RAM, or the like, and the storage unit 2104 may be integrated with the processing unit 2102. The storage unit 2104 may be a read-only memory (read-only memory, ROM) or another type of static storage device that may store static information and instructions, and the storage unit 2104 may be independent of the processing unit 2102.

An embodiment of this application provides a terminal device. The terminal device may also be referred to as a terminal (terminal), user equipment (user equipment, UE), a mobile station (mobile station, MS), a mobile terminal (mobile terminal, MT), and the like. The terminal device may be a mobile phone (mobile phone), a smart television, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and the like.

The terminal device includes: a processor and a memory, where the memory is configured to store computer-executable instructions; and the processor executes the computer-executable instructions stored in the memory, to cause the terminal device to perform the foregoing method.

An embodiment of this application provides a terminal device, and a structure thereof is shown in FIG. 1. A memory of the terminal device may be configured to store at least one program instruction, and a processor is configured to execute the at least one program instruction to implement the technical solutions in the foregoing method embodiments. The implementation principles and technical effects are similar to those in the method-related embodiments, and details are not described herein again.

An embodiment of this application provides a chip. The chip includes a processor, and the processor is configured to invoke a computer program in a memory to execute the technical solutions in the foregoing embodiments. The implementation principles and technical effects are similar to those in the related embodiments, and details are not described herein again.

An embodiment of this application provides a computer program product. When the computer program product runs on an electronic device, a terminal device is caused to perform the technical solutions in the foregoing embodiments. The implementation principles and technical effects are similar to those in the related embodiments, and details are not described herein again.

An embodiment of this application provides a computer-readable storage medium storing program instructions. When the program instructions are executed by a terminal device, the terminal device is caused to perform the technical solutions in the foregoing embodiments. The implementation principles and technical effects are similar to those in the related embodiments, and details are not described herein again. All or some of the methods described in the foregoing embodiments may be implemented by using software, hardware, firmware, or any combination thereof. If the methods are implemented in software, the functions may be stored on or transmitted over a computer-readable medium as one or more instructions or code. The computer-readable medium may include a computer storage medium and a communication medium, and may further include any medium that can transfer the computer program from one place to another. The storage medium may be any target medium accessible to a computer.

The computer-readable medium may include a RAM, a ROM, a compact disc read-only memory (compact disc read-only memory, CD-ROM) or another optical disk memory, a magnetic disk memory or another magnetic storage device, or any other medium that is used to carry required program code in a form of instructions or a data structure and that can be accessed by a computer. In addition, any connection is appropriately referred to as a computer-readable medium. For example, if software is transmitted from a website, a server, or another remote source by using a coaxial cable, an optical fiber cable, a twisted pair, a digital subscriber line (Digital Subscriber Line, DSL) or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include an optical disc, a laser disc, an optical disc, a digital versatile disc (Digital Versatile Disc, DVD), a floppy disk, and a blue ray disc, where the magnetic disk generally reproduces data in a magnetic manner, and the optical disc reproduces data optically by using laser. The foregoing combination should also be included in the scope of the computer-readable medium.

The embodiments of this application are described with reference to the flowcharts and/or block diagrams of the method, the device (system), and the computer program product according to the embodiments of this application. It should be understood that computer program instructions can implement each procedure and/or block in the flowcharts and/or block diagrams and a combination of procedures and/or blocks in the flowcharts and/or block diagrams. The computer program instructions may be provided to a general-purpose computer, a dedicated computer, an embedded processor, or a processing unit of another programmable device to generate a machine, so that the instructions executed by a computer or a processing unit of another programmable device generate an apparatus for implementing a specific function in one or more procedures in the flowcharts and/or in one or more blocks in the block diagrams.

The foregoing specific implementations further describe in detail the objectives, technical solutions, and beneficial effects of the present disclosure. It should be understood that the foregoing descriptions are merely specific implementations of the present disclosure, but are not intended to limit the protection scope of the present disclosure. Any modification, equivalent replacement, or improvement made based on the technical solutions of the present disclosure should fall within the protection scope of the present disclosure.

What is claimed is:

1. A recording method, applied to a terminal device comprising a first camera, and the method comprising:

displaying, by the terminal device, a first interface of a camera application, wherein the first interface comprises a first window and a second window, the first interface is a video recording interface, the first window displays a first picture collected by the first camera, the second window displays a second picture and a first button, the first button is a small window video recording end button, and the second picture is a part of the first picture;

at a first moment, when the terminal device detects that a first position of the first picture comprises a first object, comprising the first object in the second picture;

at a second moment, when the terminal device detects that a second position of the first picture comprises the first object, comprising the first object in the second picture;

at a third moment, stopping, by the terminal device in response to a trigger operation of a user on the first button, displaying the second window, and continuing to display the first window, wherein the third moment is later than the second moment, and the second moment is later than the first moment; and displaying, by the terminal device, a third window on the first window, wherein the third window comprises a third picture, the third picture is a part of the first picture, and a position of the third window in the first window is the same as a position of the second window in the first window.

2. The method according to claim 1, wherein the first object is displayed in the center in the second picture.

3. The method according to claim 1, wherein the second window is floated on an upper layer of the first window, and the second window is smaller than the first window.

4. The method according to claim 1, wherein displaying, by the terminal device, the third window on the first window comprises:

displaying, by the terminal device, the third window on the first window when the terminal device detects a trigger operation of the user on a first tracking identifier of the first object in the first window.

5. The method according to claim 1, wherein displaying, by the terminal device, the third window on the first window comprises:

displaying, by the terminal device, the third window on the first window when the terminal device detects that a duration that the second window is not displayed is within a first time limit and/or a duration that the terminal device does not use a recording function is within a second time limit, wherein the position of the third window in the first window is the same as the position of the second window in the first window.

6. The method according to claim 1, wherein when the terminal device displays the third window on the first window, a horizontal and vertical screen state of the third window is the same as a horizontal and vertical screen state of the second window, and a size of the third window remains the same as a size of the second window.

7. The method according to claim 1, wherein the method further comprises:

detecting, by the terminal device, a scale or enlarge operation on the second window; and scaling or enlarging a size of the second window by the terminal device in response to the scale or enlarge operation on the second window;

wherein when the terminal device scales or enlarges the size of the second window, content in the second picture remains unchanged, or content in the second picture is in direct proportion to the size of the second window.

8. The method according to claim 7, wherein the second window further comprises a second button, and the terminal device further hides the first button and the second button in the second window in response to the scale or enlarge operation on the second window.

9. The method according to claim 1, wherein the method further comprises:

detecting, by the terminal device, a move operation on the second window; and moving, by the terminal device in response to the move operation on the second window, the second window along a movement track of the move operation.

10. The method according to claim 9, wherein the terminal device further hides the first button and a second button in the second window in response to the move operation on the second window.

11. The method according to claim 1, wherein the second window in the first interface further comprises a second button, and the method further comprises:

switching, in response to a trigger operation of the user on the second button, a display state of the second window in the first interface, wherein a window aspect ratio displayed in a display state before the switching of the second window is different from a window aspect ratio displayed in a display state after the switching.

12. The method according to claim 1, wherein the first window in the first interface further comprises a third button, and the method comprises:

adding and displaying, in response to a trigger operation of the user on the third button, a fourth button in the first window in the first interface; and switching, in response to a trigger operation of the user on the fourth button, the second window in the first interface from a display state corresponding to the third button to a display state corresponding to the fourth button, wherein a window aspect ratio displayed in the display state corresponding to the third button of the second window is different from a window aspect ratio displayed in the display state corresponding to the fourth button.

13. The method according to claim 1, wherein before displaying, by the terminal device, the first interface of the camera application, the method further comprises:

displaying, by the terminal device, a second interface of the camera application, wherein the second interface comprises the first window and the second window, the first window displays a fourth picture collected by the first camera and a fifth button, and the second window displays a part of the fourth picture; and detecting, by the terminal device, a trigger operation of the user on the fifth button; and wherein displaying, by the terminal device, the first interface of the camera application comprises:

displaying the first interface by the terminal device in response to a trigger operation of the user on a fourth button, wherein the first window further comprises first recording duration information of the first window, the second window further comprises second recording duration information of the second window, and the second recording duration information of the second window is the same as the first recording duration information of the first window.

14. The method according to claim 13, further comprising:

pausing recording in the second window when the terminal device detects that the first window does not comprise the first object, wherein the first recording duration information of the first window is continuously updated during recording in the second window, and updating of the second recording duration information of the second window is paused while the recording in the second window is paused.

15. The method according to claim 14, wherein when the recording in the second window is paused, the second window further comprises a recording pause identifier and a sixth button, and after the pausing recording in the second window, the method further comprises:

detecting, by the terminal device, a trigger operation of the user on the sixth button; and stopping, in response to the trigger operation of the user on the sixth button, displaying the second window, and continuing to display the first window, wherein the first recording duration information of the first window is continuously updated.

16. The method according to claim 1, wherein before displaying, by the terminal device, the first interface of the camera application, the method further comprises:

displaying, by the terminal device, a third interface of the camera application, wherein the third interface comprises the first window but does not comprise the second window, and the first window displays a fifth picture collected by the first camera and a fifth button;

detecting, by the terminal device, a trigger operation of the user on the fifth button;

displaying, by the terminal device in response to the trigger operation of the user on the fifth button, a fourth interface of the camera application, wherein the fourth interface comprises the first window, and the first window displays a sixth picture recorded by the first camera and first recording duration information of the first window;

displaying, when the terminal device detects that the first window in the fourth interface comprises the first object, a first tracking identifier associated with the first object in the first window; and detecting, by the terminal device, a trigger operation of the user on the first tracking identifier; and wherein displaying, by the terminal device, the first interface of the camera application comprises:

displaying the first interface by the terminal device in response to the trigger operation of the user on the first tracking identifier, wherein the second window in the first interface further comprises second recording duration information of the second window, and the second recording duration information of the second window is different from the first recording duration information of the first window.

17. The method according to claim 1, wherein the first window in the first interface further comprises a seventh button, and the method further comprises:

detecting, by the terminal device, a trigger operation of the user on the seventh button; and storing, by the terminal device in response to the trigger operation of the user on the seventh button, a first video and a second video, wherein the first video is associated with the first window, and the second video is associated with the second window.

18. The method according to claim 17, wherein when a display state of the second window during recording is switched, the stored second video also comprises pictures in different display states.

19. A terminal device, comprising a processor and a memory, wherein the memory stores computer-executable instructions; and the processor executes the computer-executable instructions stored in the memory, to cause the terminal device to perform the following steps:

displaying a first interface of a camera application, wherein the first interface comprises a first window and a second window, the first interface is a video recording interface, the first window displays a first picture collected by a camera, the second window displays a second picture and a first button, the first button is a small window video recording end button, and the second picture is a part of the first picture;

at a first moment, when the terminal device detects that a first position of the first picture comprises a first object, comprising the first object in the second picture;

at a second moment, when the terminal device detects that a second position of the first picture comprises the first object, comprising the first object in the second picture; and at a third moment, stopping, in response to a trigger operation of a user on the first button, displaying the second window, and continuing to display the first window, wherein the third moment is later than the second moment, and the second moment is later than the first moment; and displaying, a third window on the first window, wherein the third window comprises a third picture, the third picture is a part of the first picture, and a position of the third window in the first window is the same as a position of the second window in the first window.

20. A non-transitory computer-readable storage medium, wherein the non-transitory computer-readable storage medium stores computer instructions, and when the computer instructions are run on a terminal device, the terminal device is caused to perform the following steps:

displaying, a first interface of a camera application, wherein the first interface comprises a first window and a second window, the first interface is a video recording interface, the first window displays a first picture collected by a camera, the second window displays a second picture and a first button, the first button is a small window video recording end button, and the second picture is a part of the first picture;

at a first moment, when the terminal device detects that a first position of the first picture comprises a first object, comprising the first object in the second picture;

at a second moment, when the terminal device detects that a second position of the first picture comprises the first object, comprising the first object in the second picture; and at a third moment, stopping, in response to a trigger operation of a user on the first button, displaying the second window, and continuing to display the first window, wherein the third moment is later than the second moment, and the second moment is later than the first moment;

displaying, a third window on the first window, wherein the third window comprises a third picture, the third picture is a part of the first picture, and a position of the third window in the first window is the same as a position of the second window in the first window.

* * * * *